(12) United States Patent
Hwang et al.

(10) Patent No.: US 11,900,813 B2
(45) Date of Patent: Feb. 13, 2024

(54) METHOD FOR PROVIDING SAFETY SERVICE IN WIRELESS COMMUNICATION SYSTEM AND VEHICLE FOR SAME

(71) Applicant: LG ELECTRONICS INC., Seoul (KR)

(72) Inventors: Jaeho Hwang, Seoul (KR); Myoungseob Kim, Seoul (KR); Jongseob Baek, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 61 days.

(21) Appl. No.: 17/753,203

(22) PCT Filed: Sep. 4, 2019

(86) PCT No.: PCT/KR2019/011398
§ 371 (c)(1),
(2) Date: Feb. 23, 2022

(87) PCT Pub. No.: WO2021/045250
PCT Pub. Date: Mar. 11, 2021

(65) Prior Publication Data
US 2022/0284815 A1 Sep. 8, 2022

(51) Int. Cl.
*G08G 1/16* (2006.01)
*G06F 3/14* (2006.01)
*G06V 20/56* (2022.01)

(52) U.S. Cl.
CPC ............... *G08G 1/166* (2013.01); *G06F 3/14* (2013.01); *G06V 20/56* (2022.01)

(58) Field of Classification Search
CPC ........ G08G 1/166; G06V 20/56; G06V 20/58; G06F 3/14; G06F 3/147; G06F 3/1454; G09G 2380/10; G09G 2370/16; H04W 4/40; H04W 92/18
See application file for complete search history.

(56) References Cited

U.S. PATENT DOCUMENTS

| | | | |
|---|---|---|---|
| 2018/0257549 A1* | 9/2018 | Suzuki | B60Q 1/04 |
| 2020/0001774 A1* | 1/2020 | Kim | B60Q 1/143 |
| 2020/0111363 A1* | 4/2020 | Maeda | G08G 1/0145 |
| 2021/0197846 A1* | 7/2021 | Thakur | G01S 17/931 |

FOREIGN PATENT DOCUMENTS

| | | |
|---|---|---|
| JP | 2002-087188 | 3/2002 |
| JP | 2008-007079 | 1/2008 |
| KR | 10-1881487 | 7/2018 |
| KR | 2019-0096868 | 8/2019 |

OTHER PUBLICATIONS

PCT International Application No. PCT/KR2019/011398, International Search Report dated May 29, 2020, 3 pages.

* cited by examiner

*Primary Examiner* — Sisay Yacob
(74) *Attorney, Agent, or Firm* — LEE, HONG, DEGERMAN, KANG & WAIMEY

(57) ABSTRACT

Provided is a method for providing a safety service in a wireless communication system via a host vehicle. The method may include: detecting an object outside the host vehicle through an object detection device; transmitting a first message providing notification of the detection of the object through a transmitter and a receiver; and outputting an image, for providing the object with the safety service, through an image output device to a prescribed area outside the host vehicle.

14 Claims, 42 Drawing Sheets

[Fig 1]
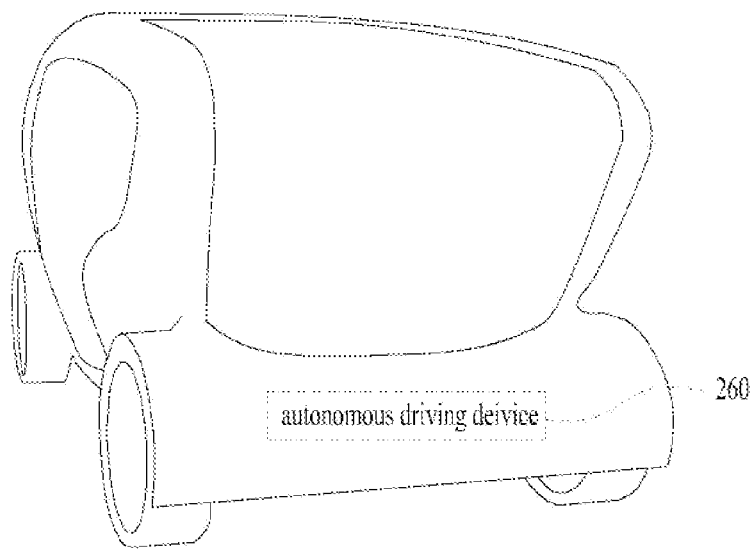
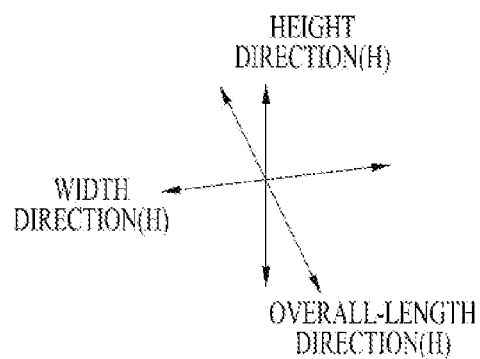

[Fig 2]
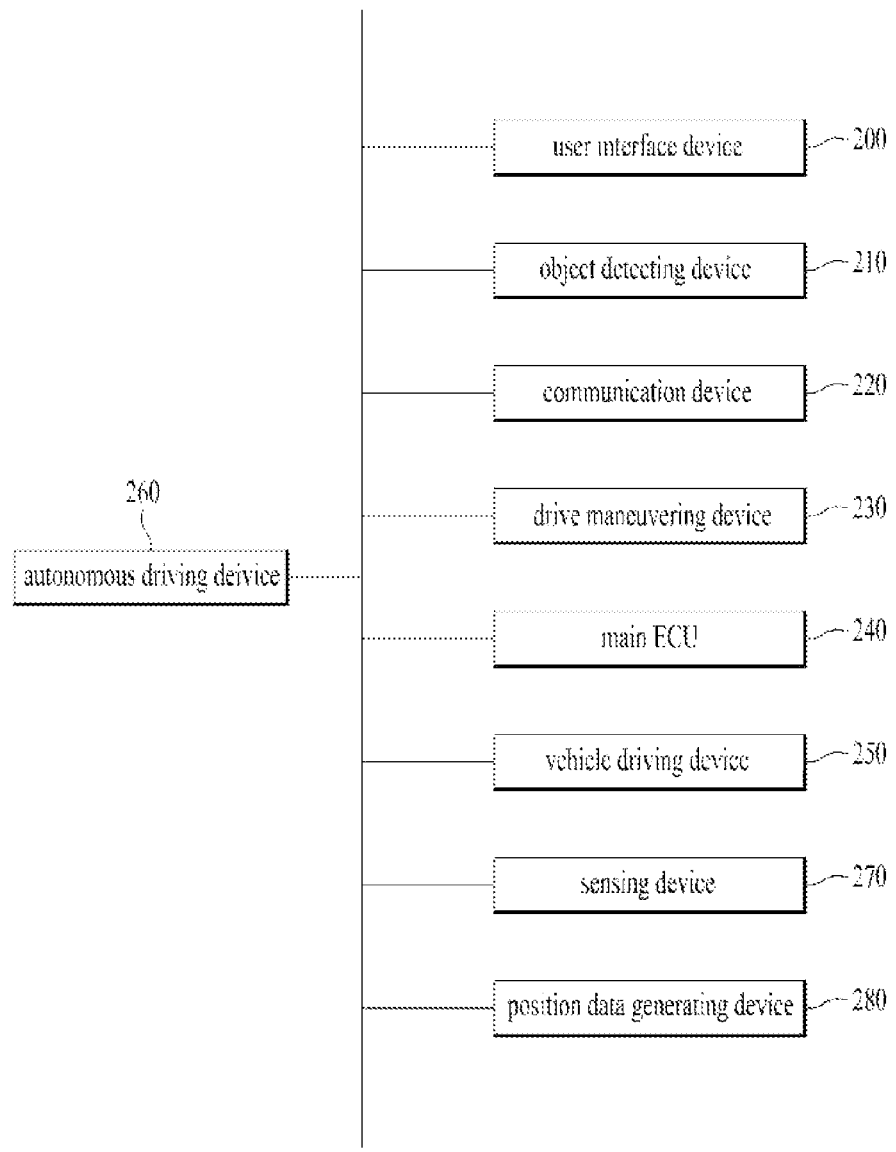

[Fig 3]
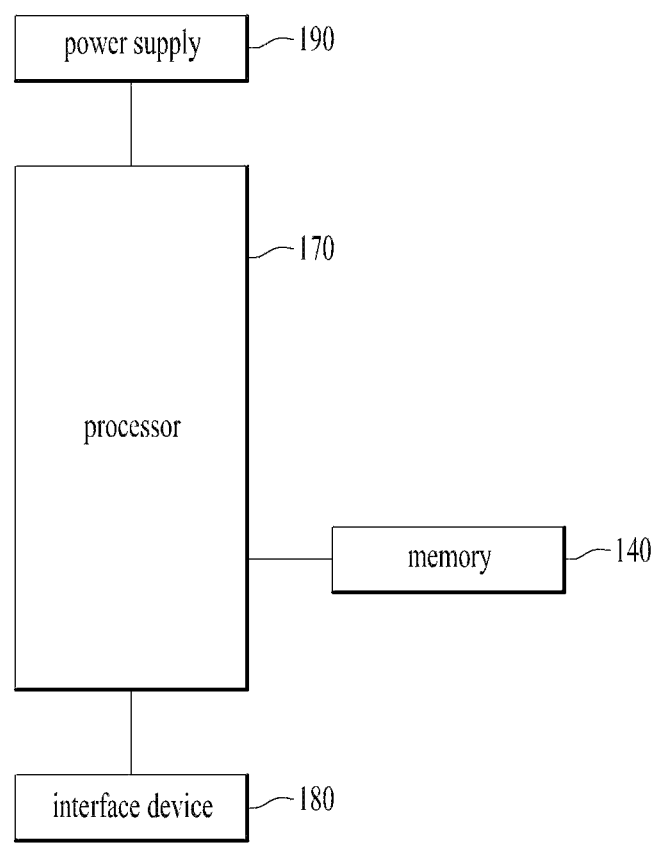

[Fig 4]
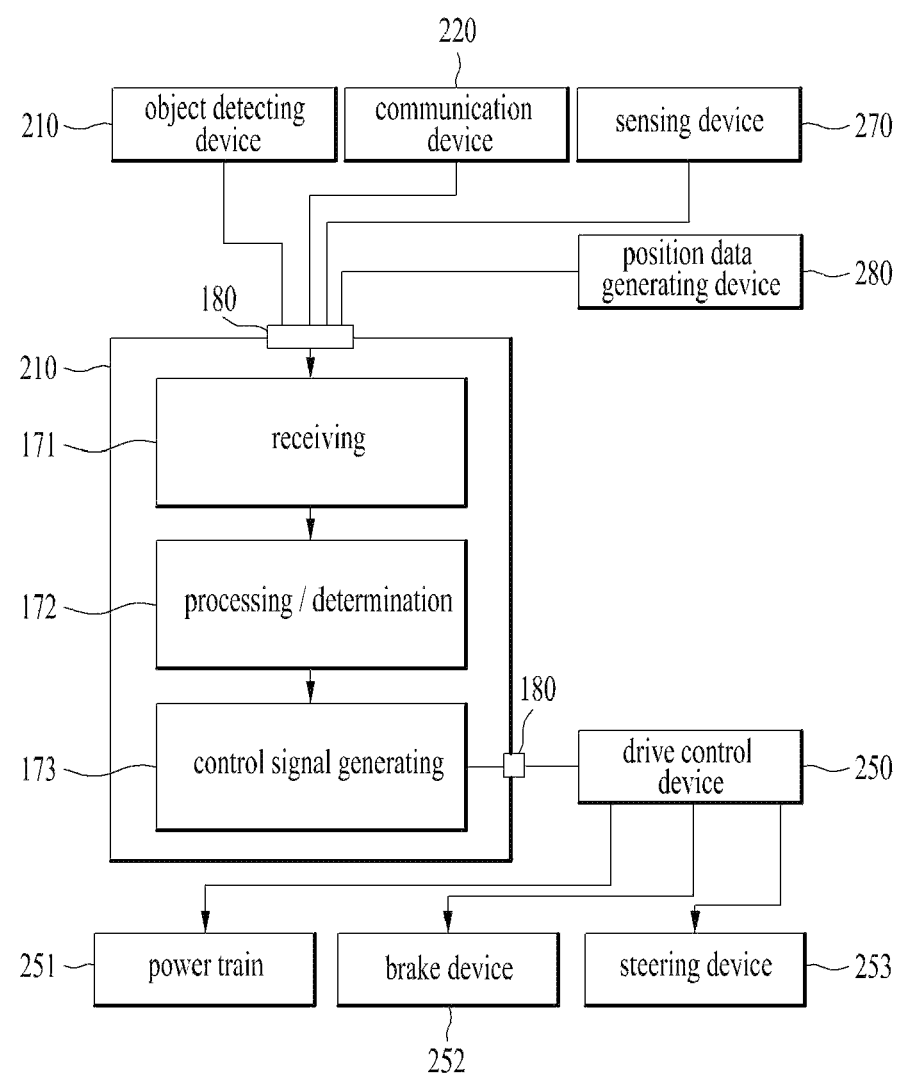

[Fig 5]
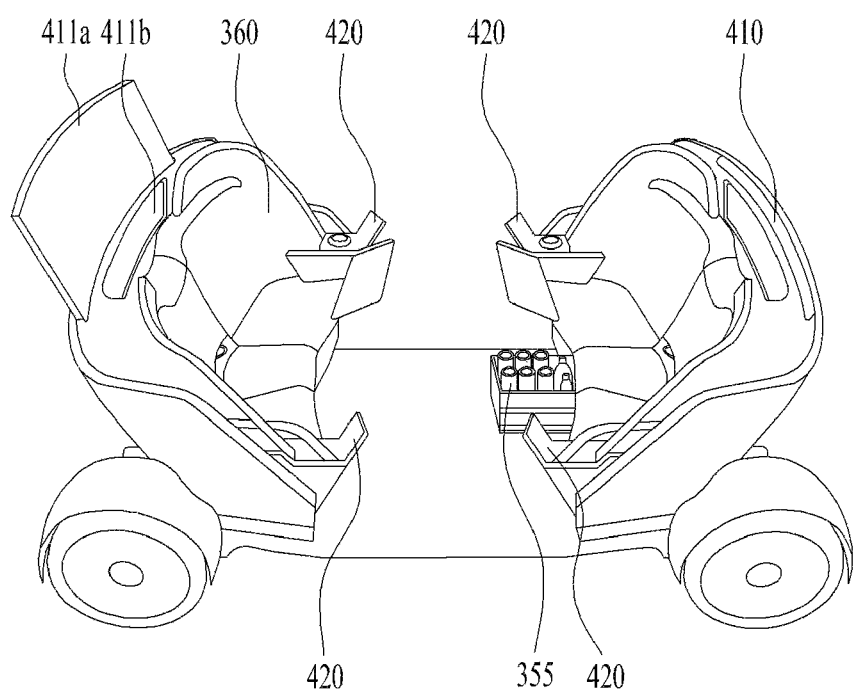

[Fig 6]
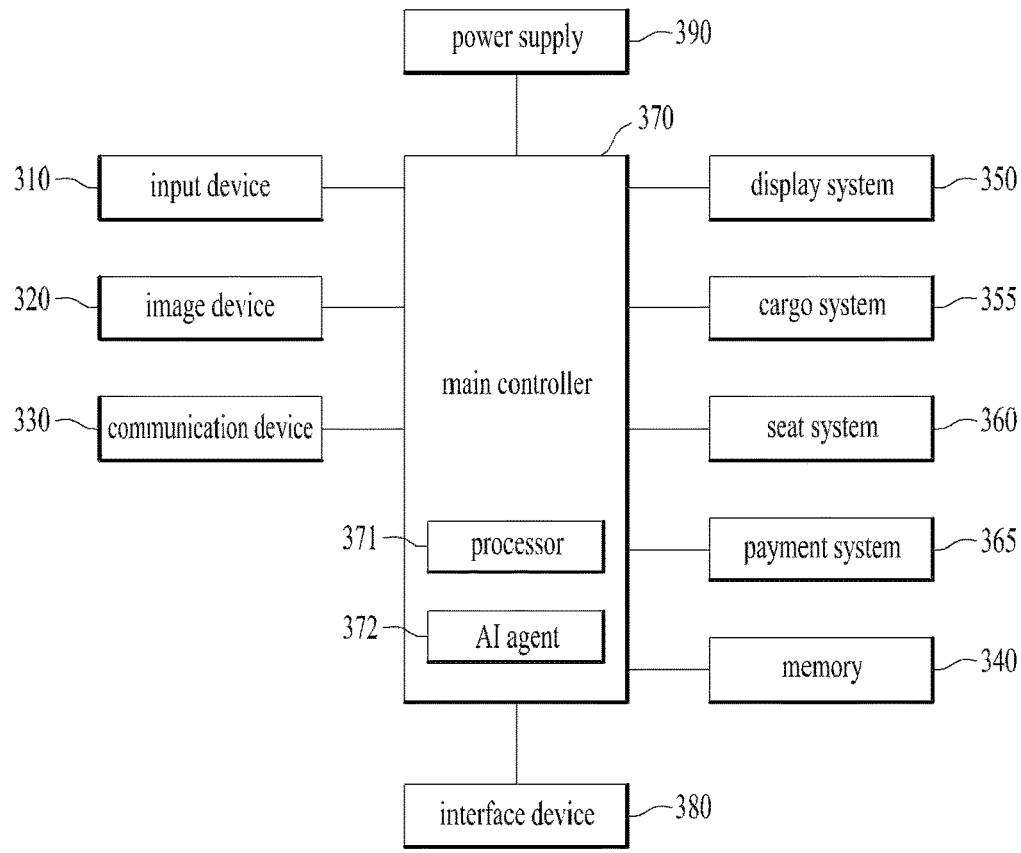
[Fig 7]
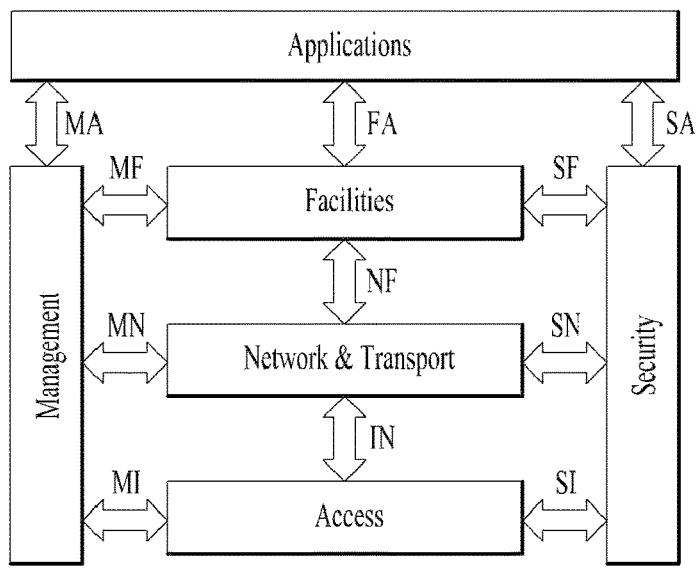

[Fig 8]
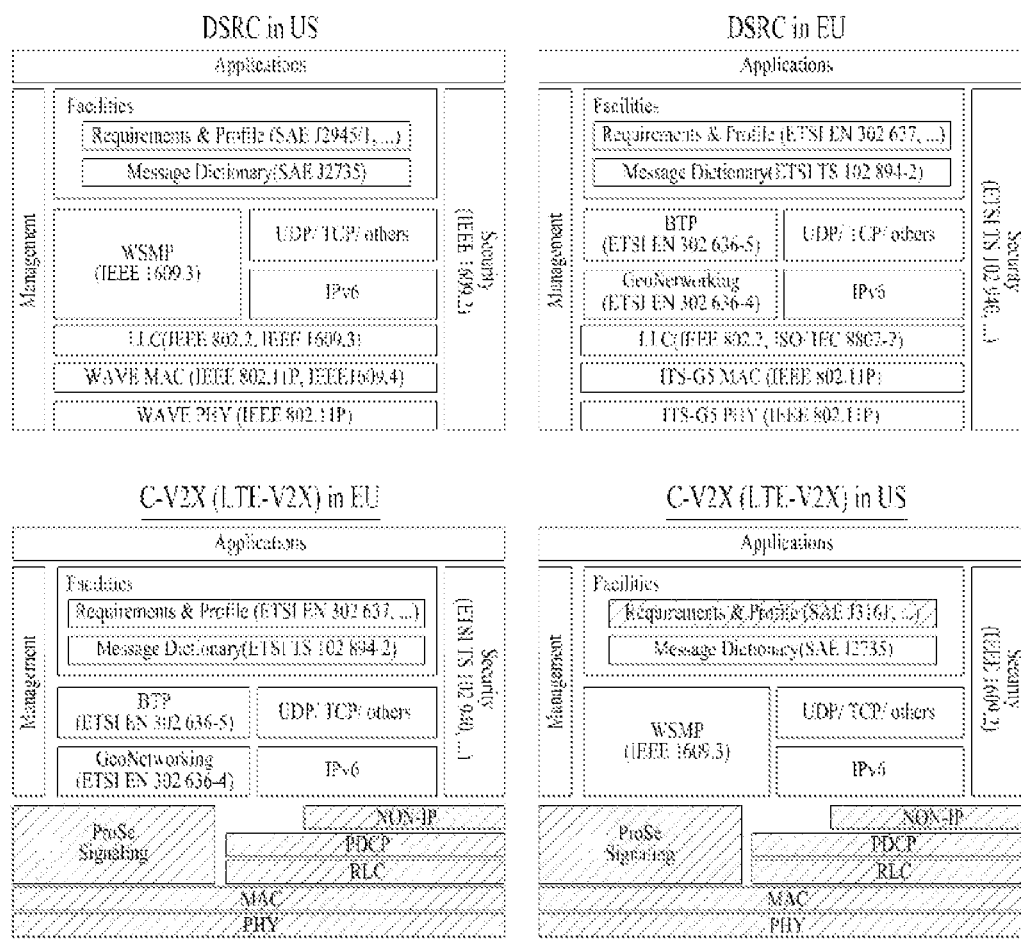

[Fig 9]

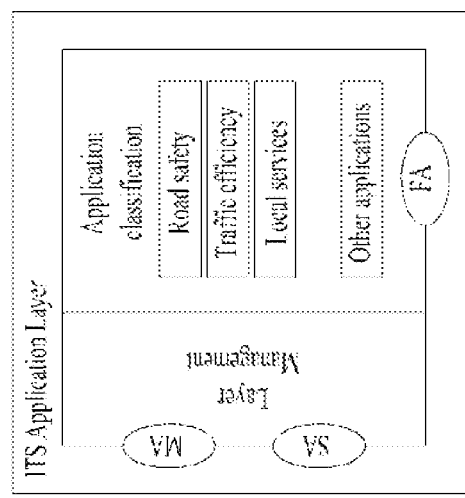

| Application classification | Application | Use case |
|---|---|---|
| Road safety | Driving assistance-Cooperative Awareness | - Emergency vehicle warning<br>- Slow vehicle indication<br>- Intersection collision warning<br>- Motorcycle approaching indication<br>assistance - Road<br>Warning (RHW)<br>- Emergency electronic brake lights<br>- Wrong way driving warning<br>- Stationary vehicle - accident<br>- Stationary vehicle - vehicle problem<br>- Traffic condition warning<br>- Signal violation warning<br>- Roadwork warning<br>- Collision risk warning |
| Traffic efficiency | Speed Management | - Regulatory contextual speed limits notification<br>- Traffic light optimal speed advisory |
| | Co-operative Navigation | - Traffic information and recommended itinerary<br>- Enhanced route guidance and navigation<br>- Limited access warning and detour notification<br>- In-vehicle signage |
| Local services | Location Based Services | - Point of Interest notification<br>- Automatic access control and parking management<br>- ITS local electronic commerce<br>- Media downloading |

[Fig 10]
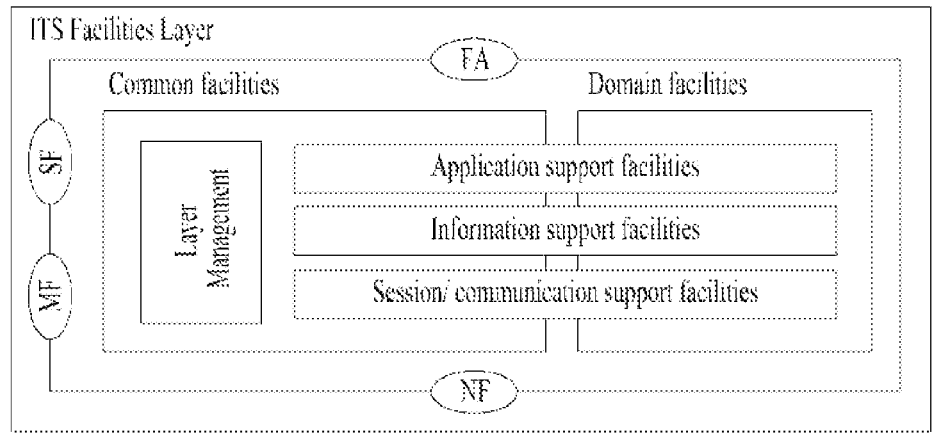
[Fig 11]
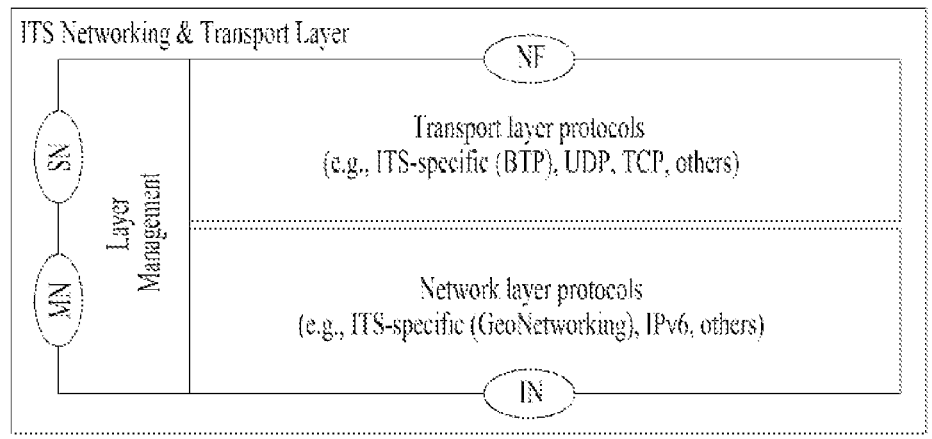
[Fig 12]
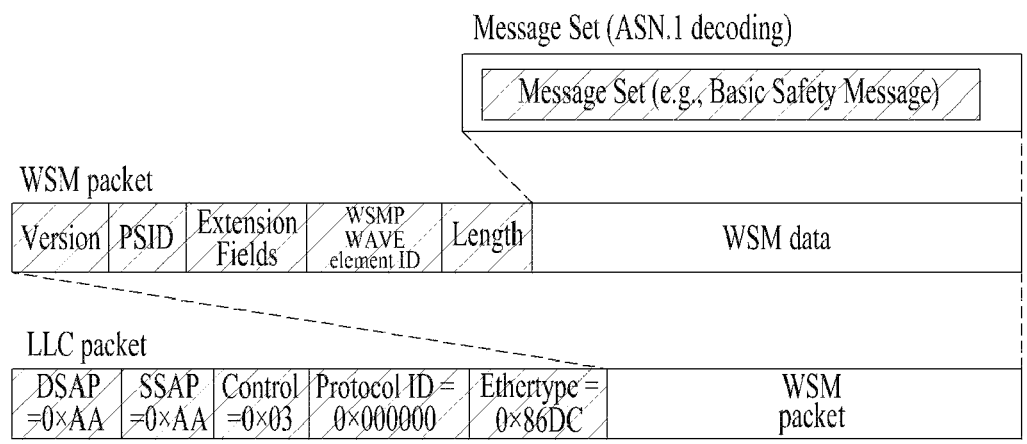

[Fig 13]
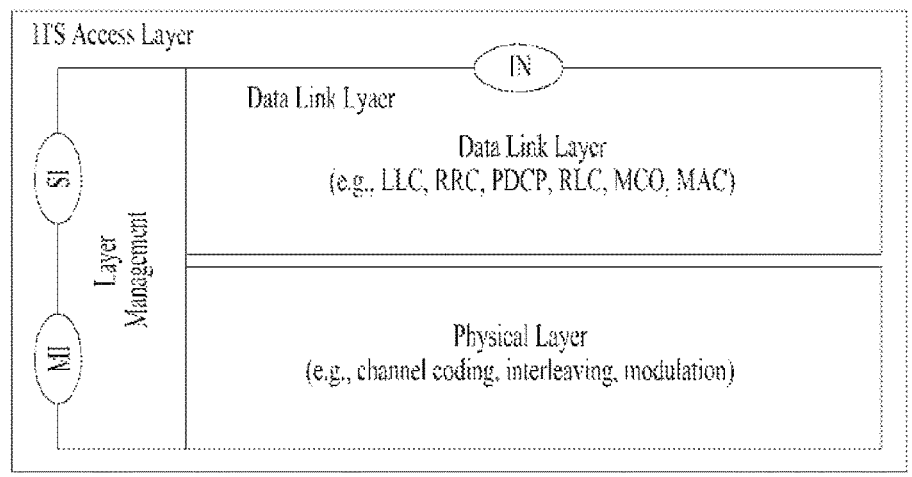
[Fig 14]
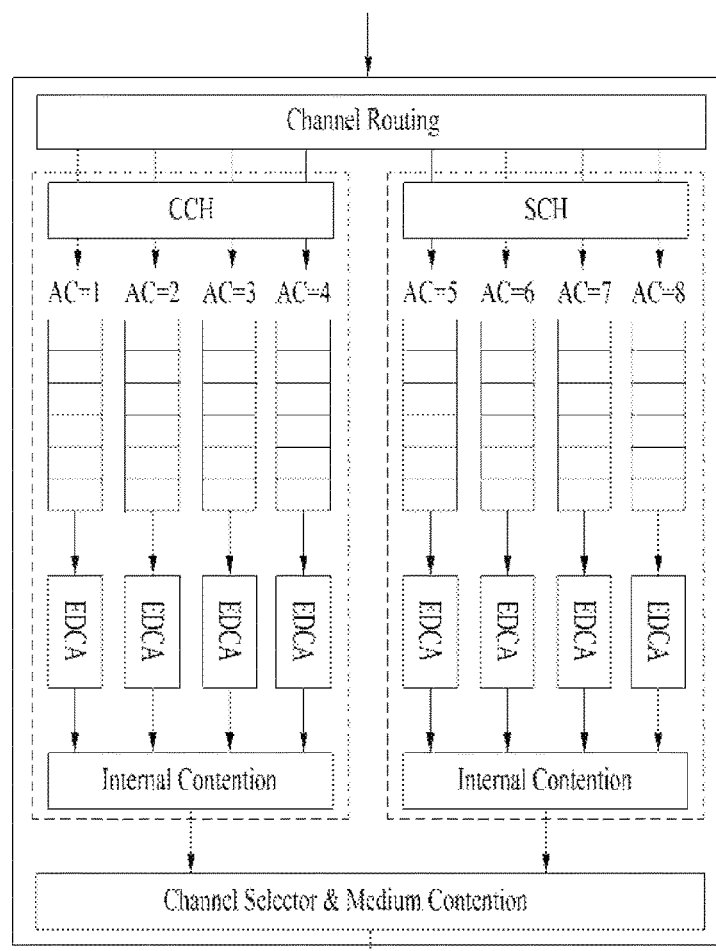

[Fig 15]
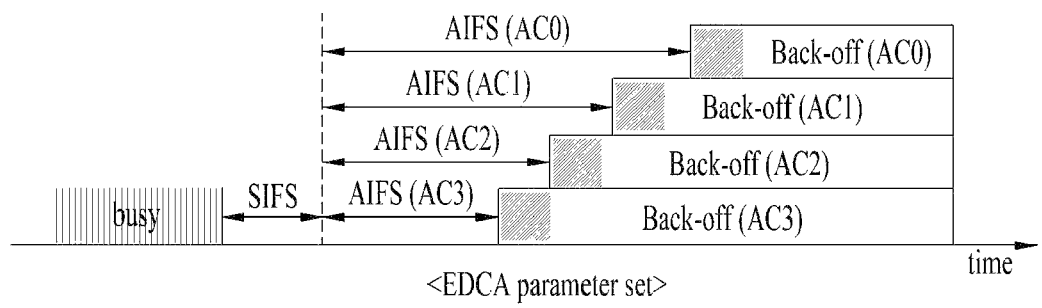

[Fig 16]
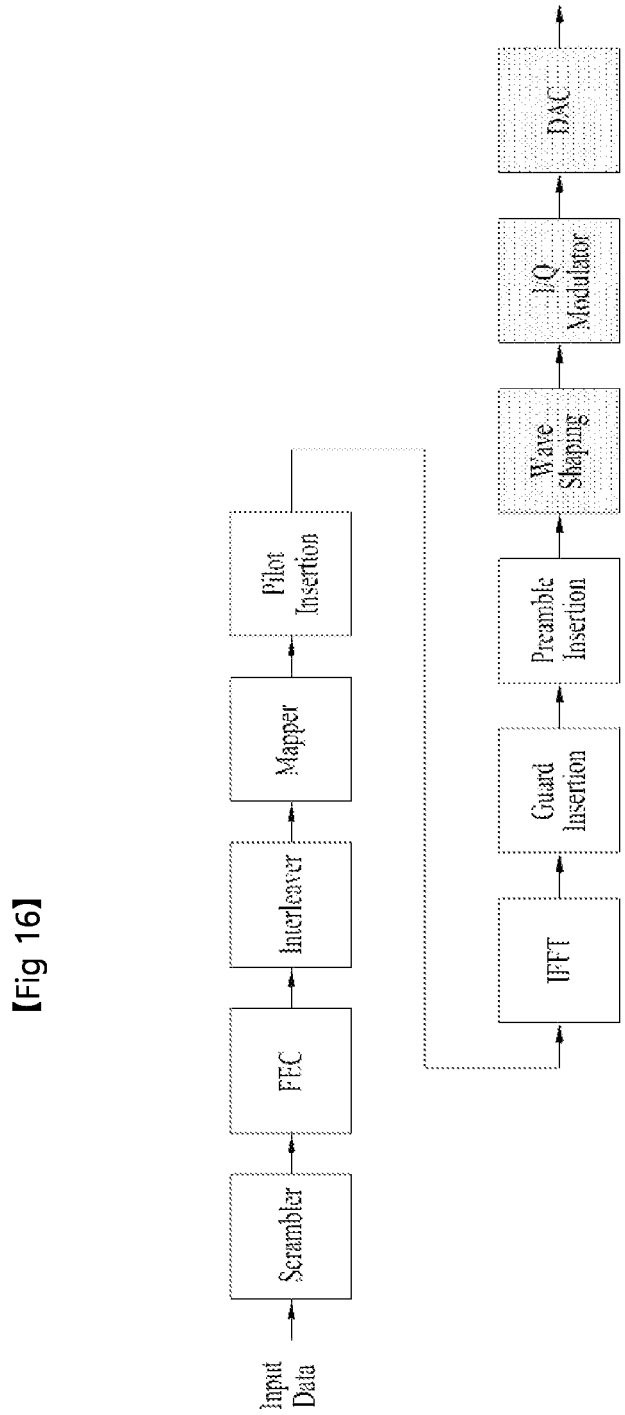

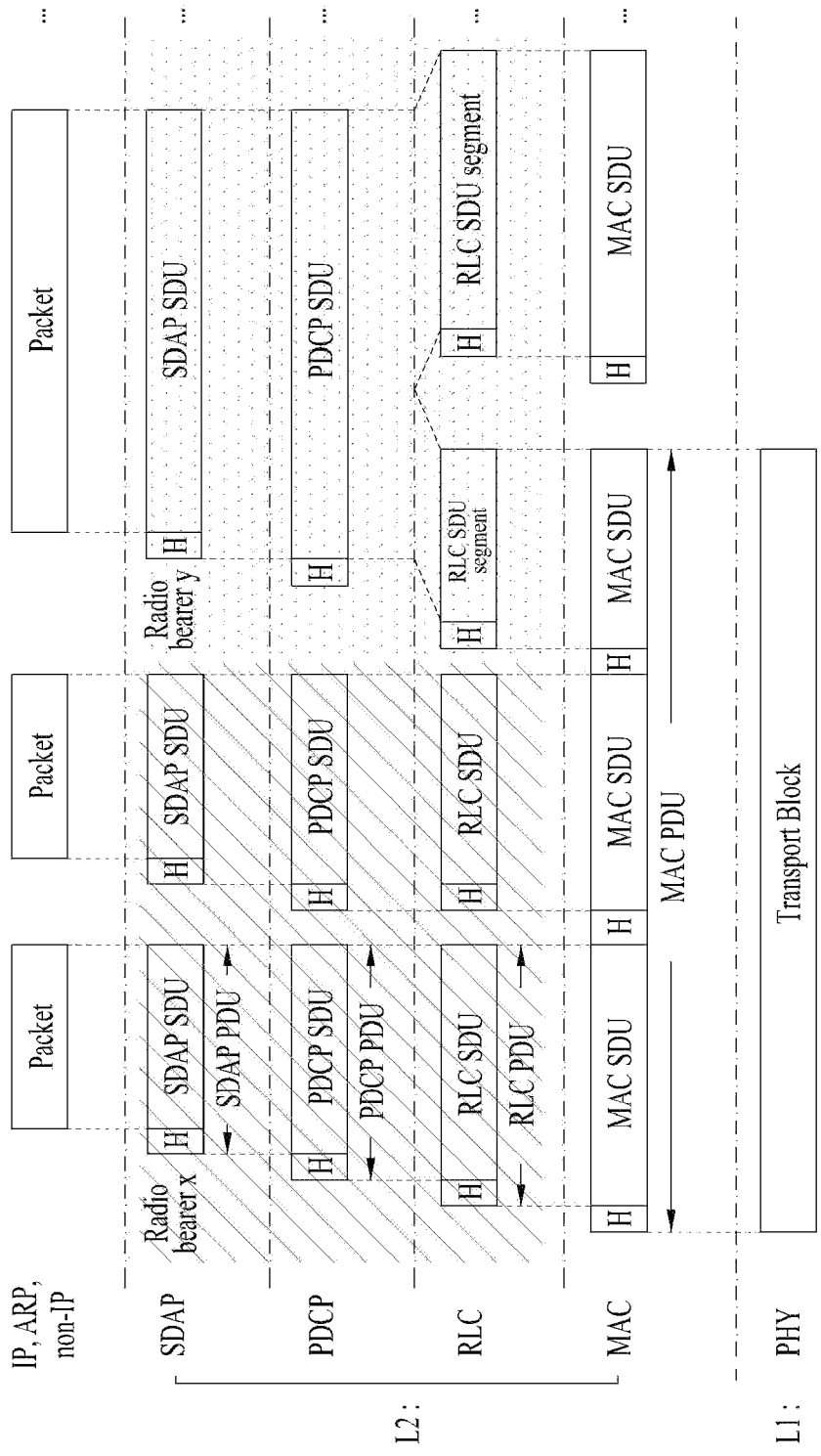
[Fig 17]

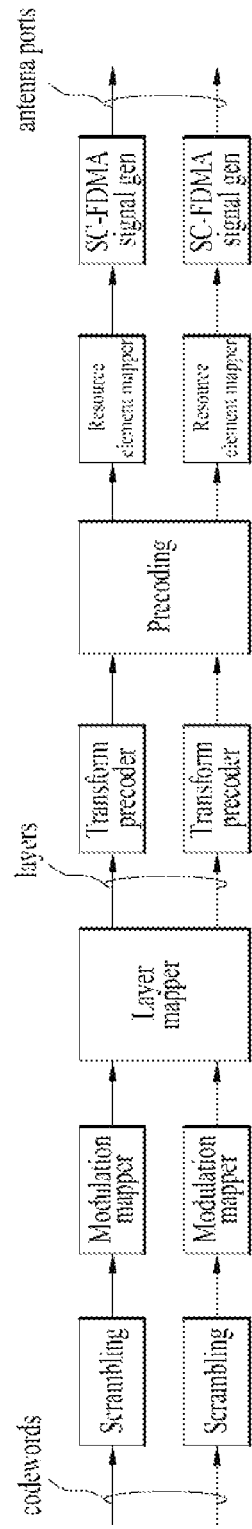
[Fig 18]

[Fig 19]
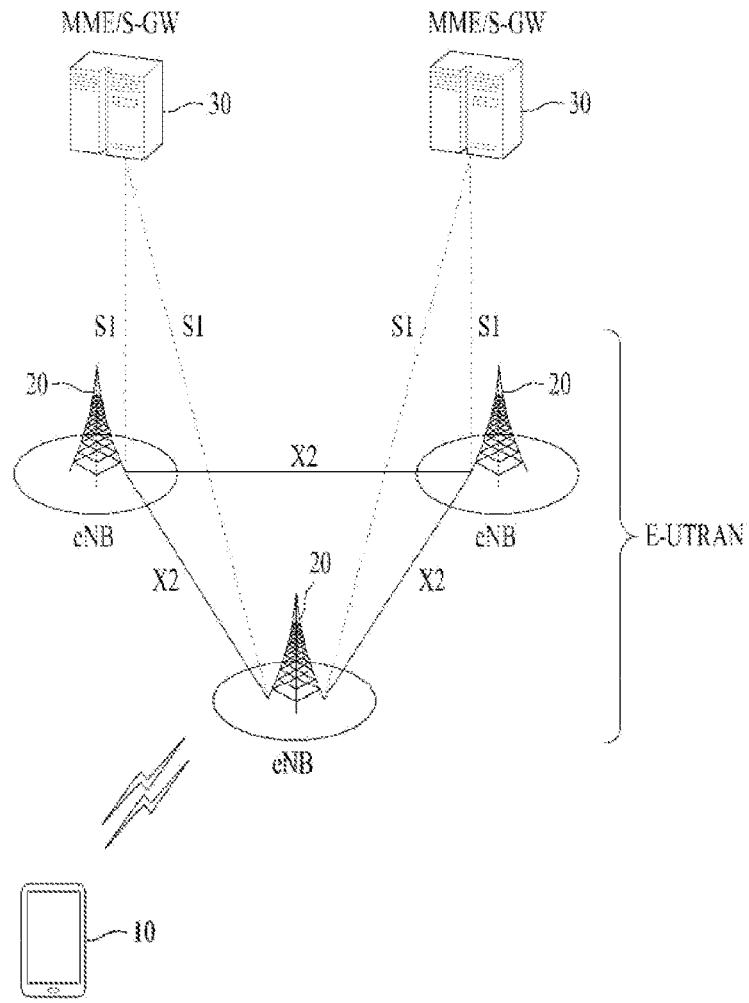
[Fig 20]
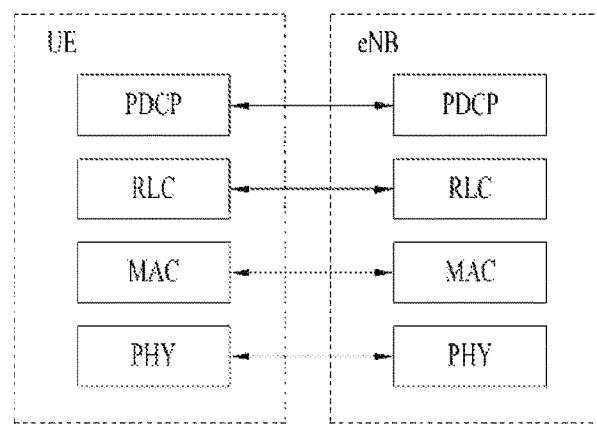

[Fig 21]
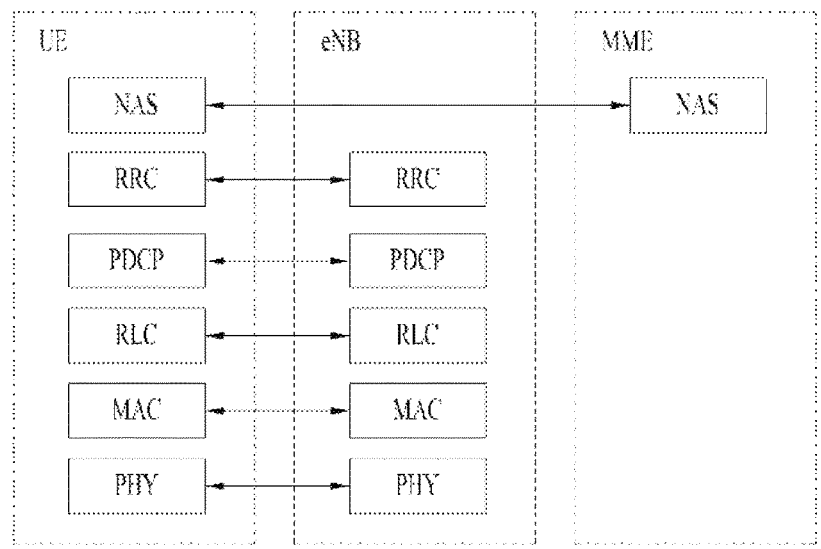
[Fig 22]
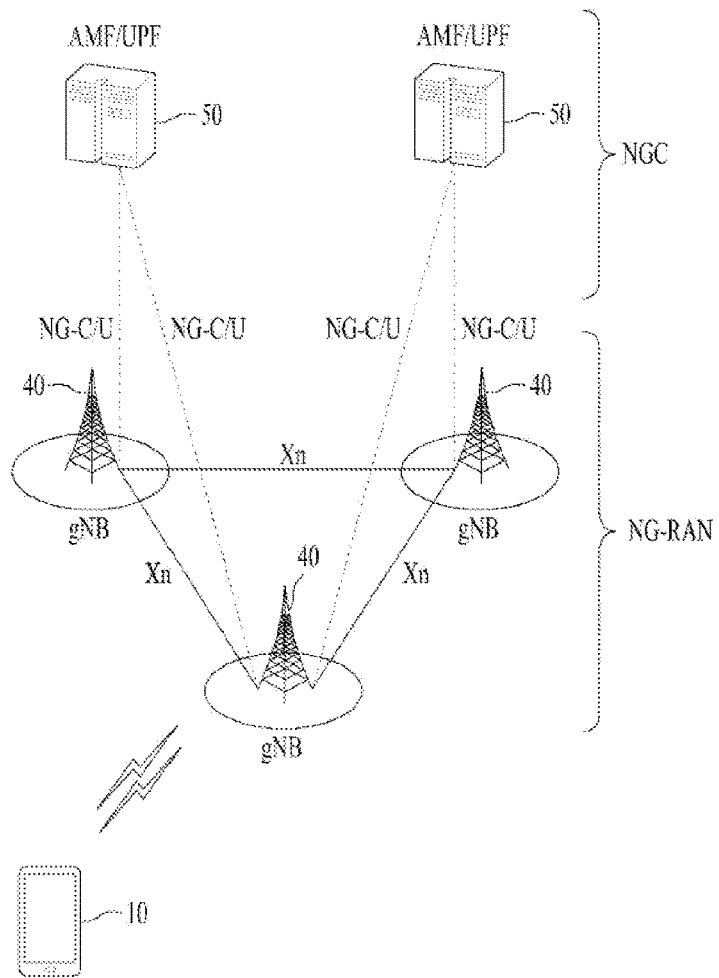

[Fig 23]
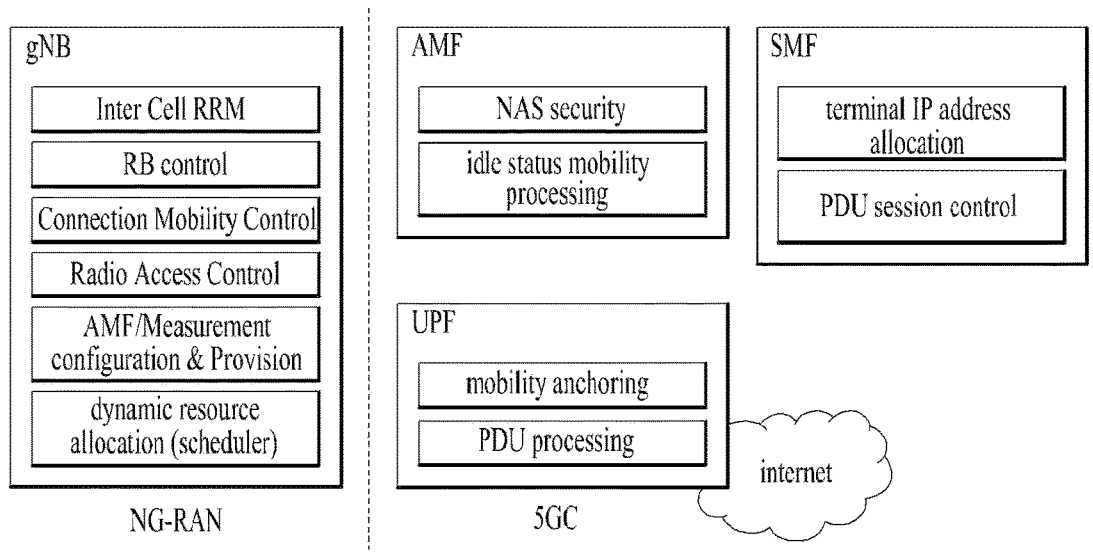

[Fig 24]
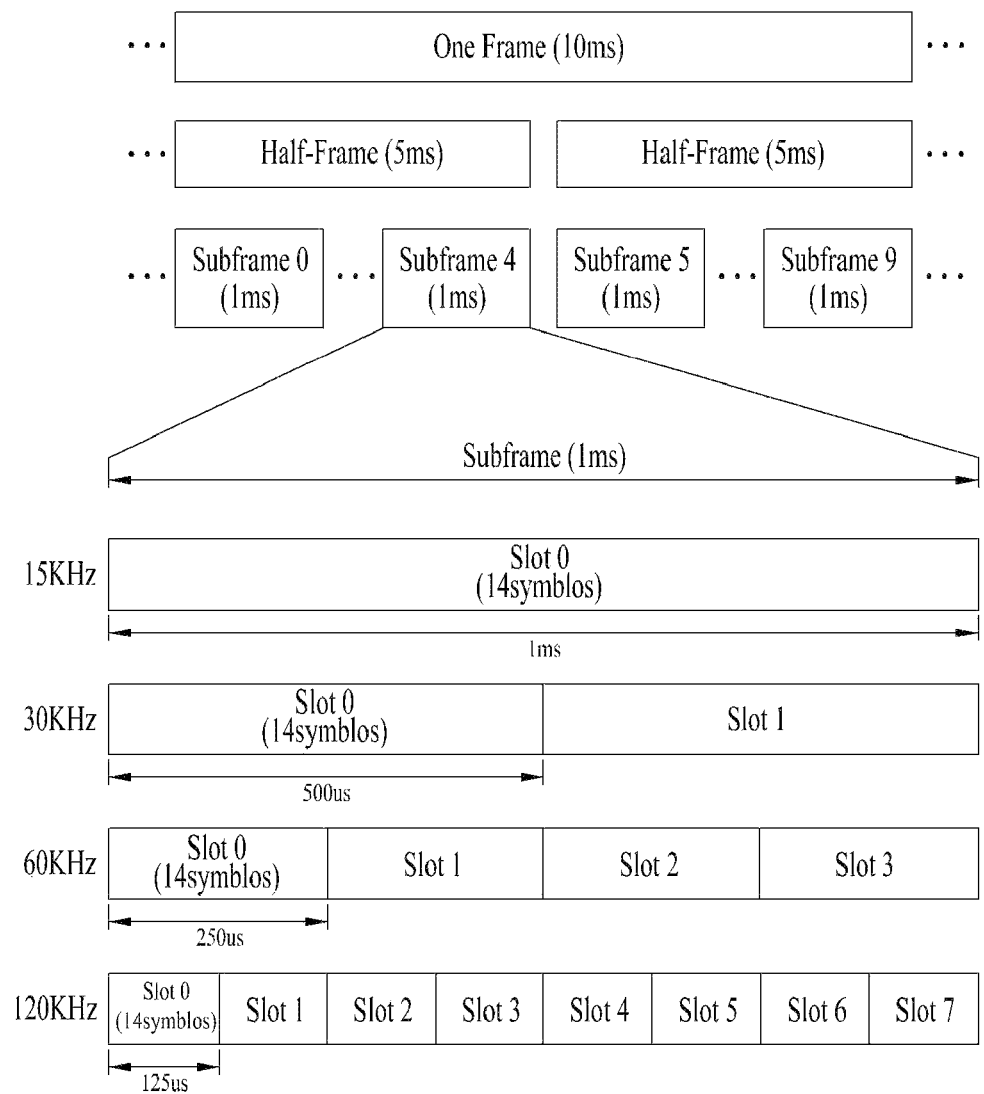

[Fig 25]
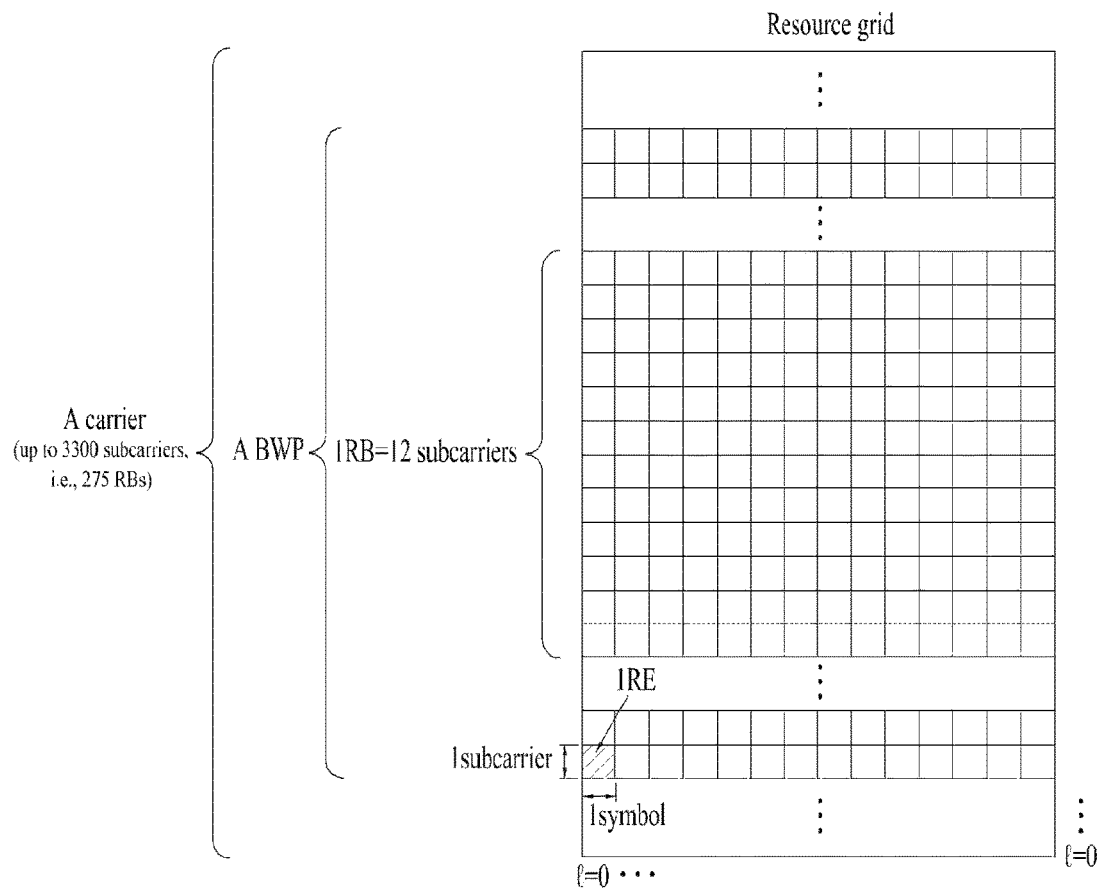
[Fig 26]
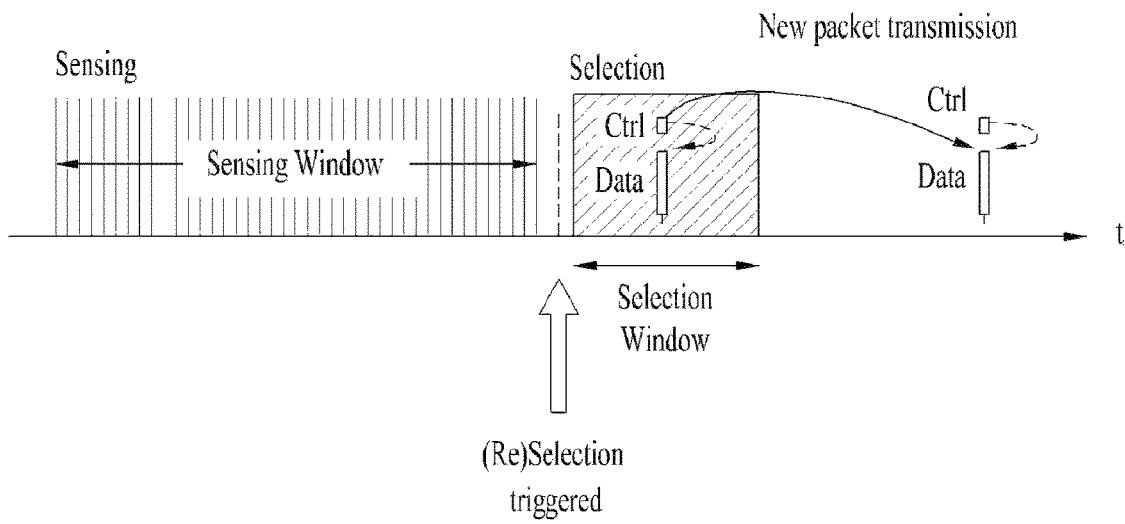

[Fig 27]
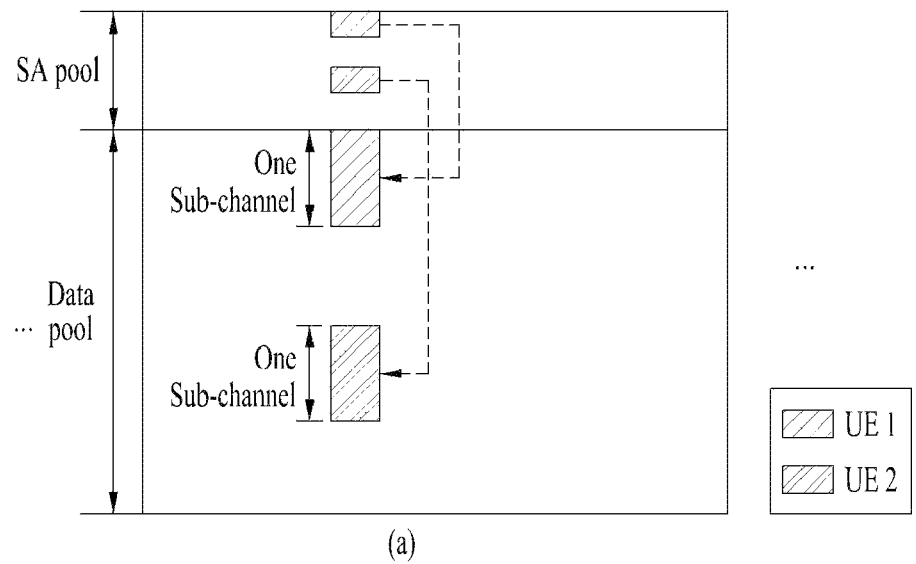
(a)
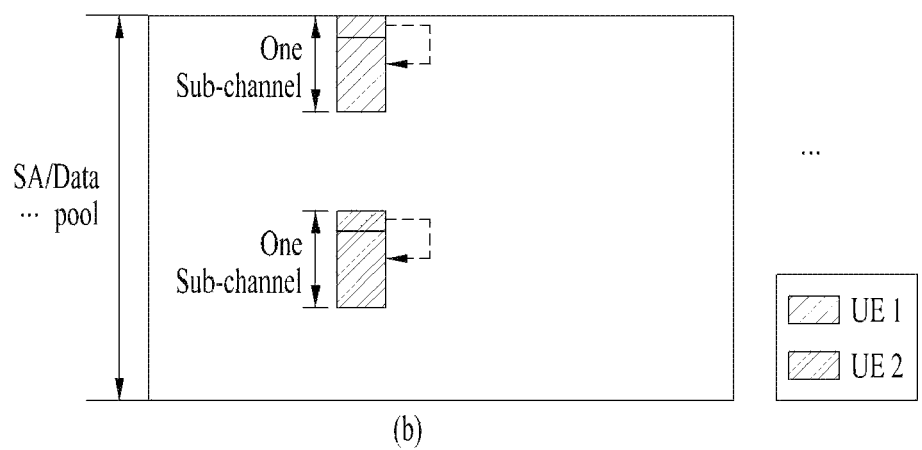
(b)

[Fig 28]
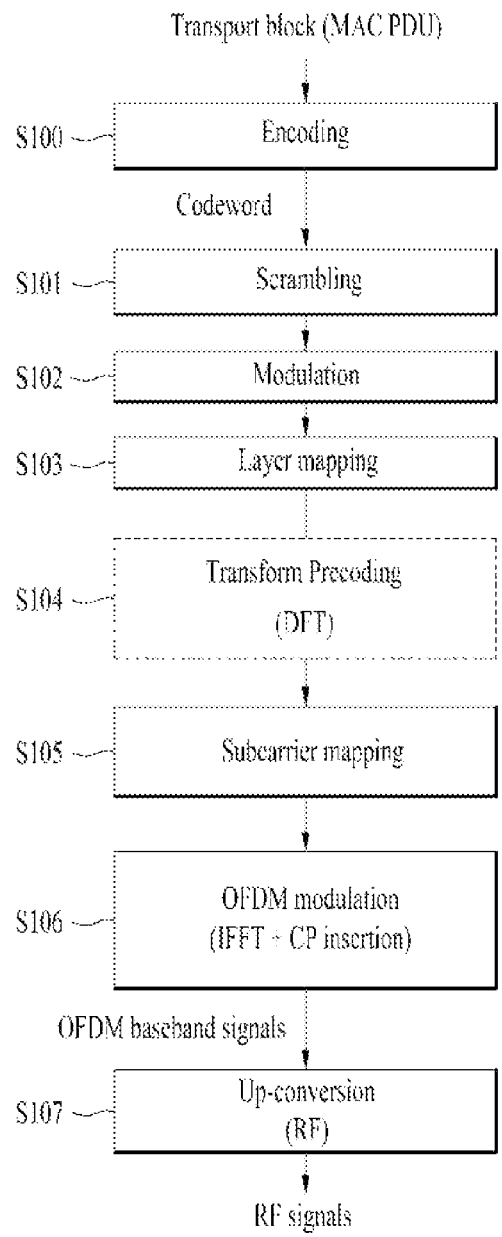

[Fig 29]
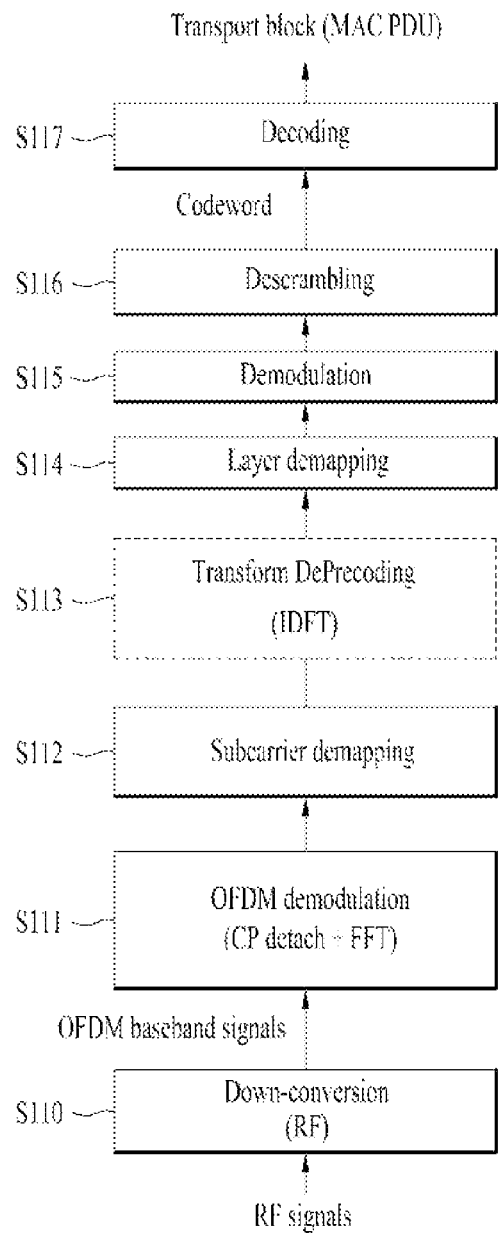

[Fig. 30]
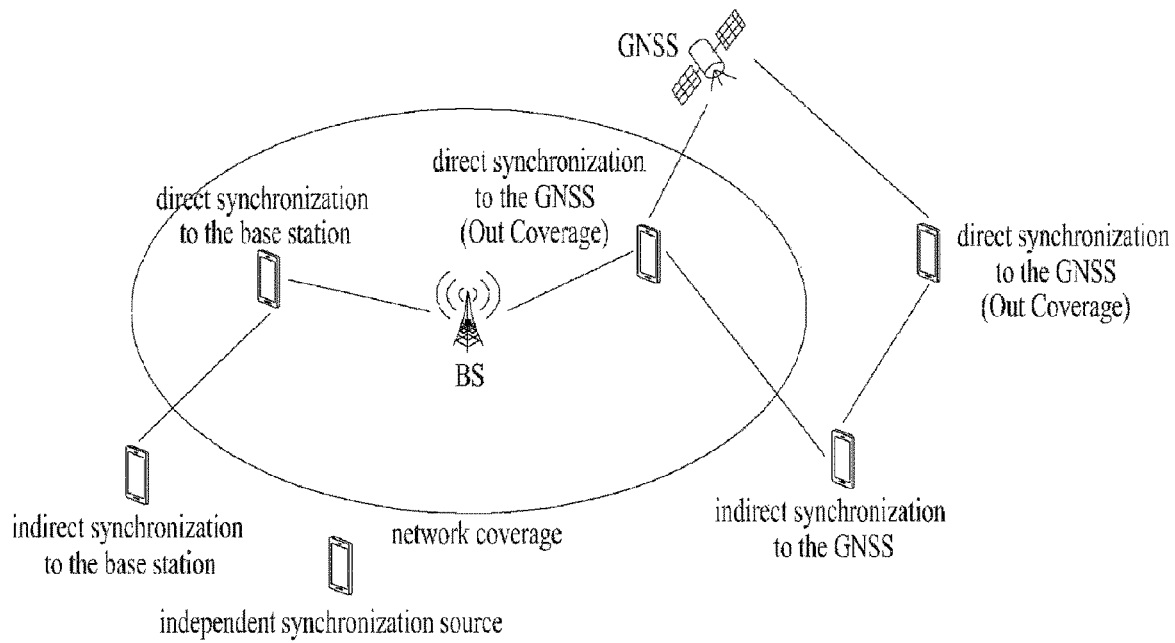
[Fig. 31]
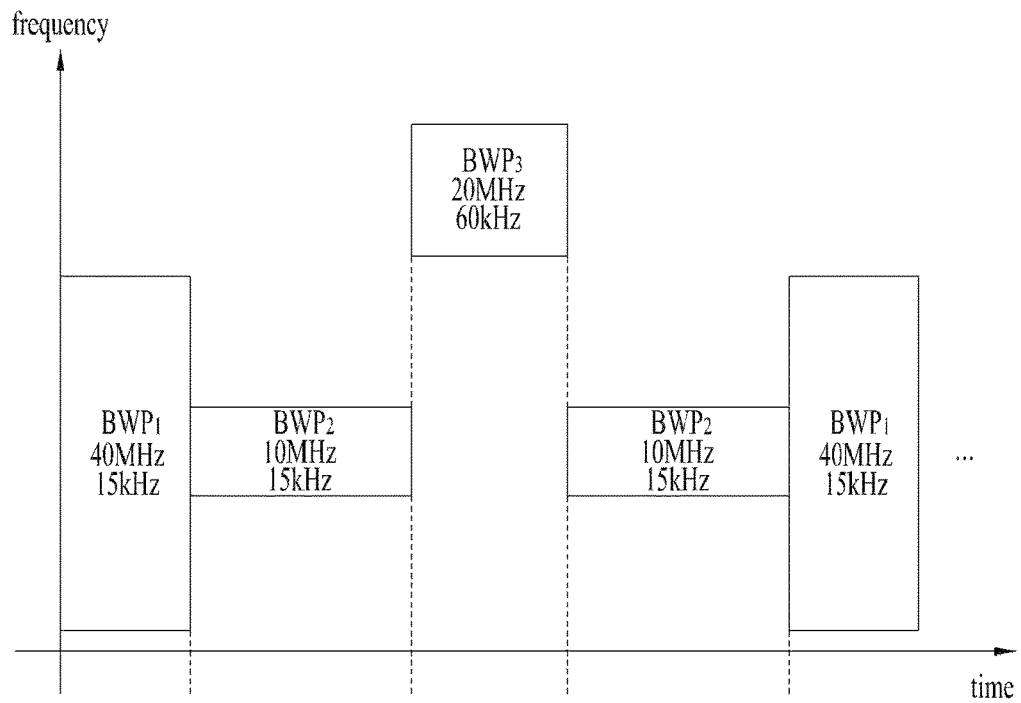

[Fig 32]
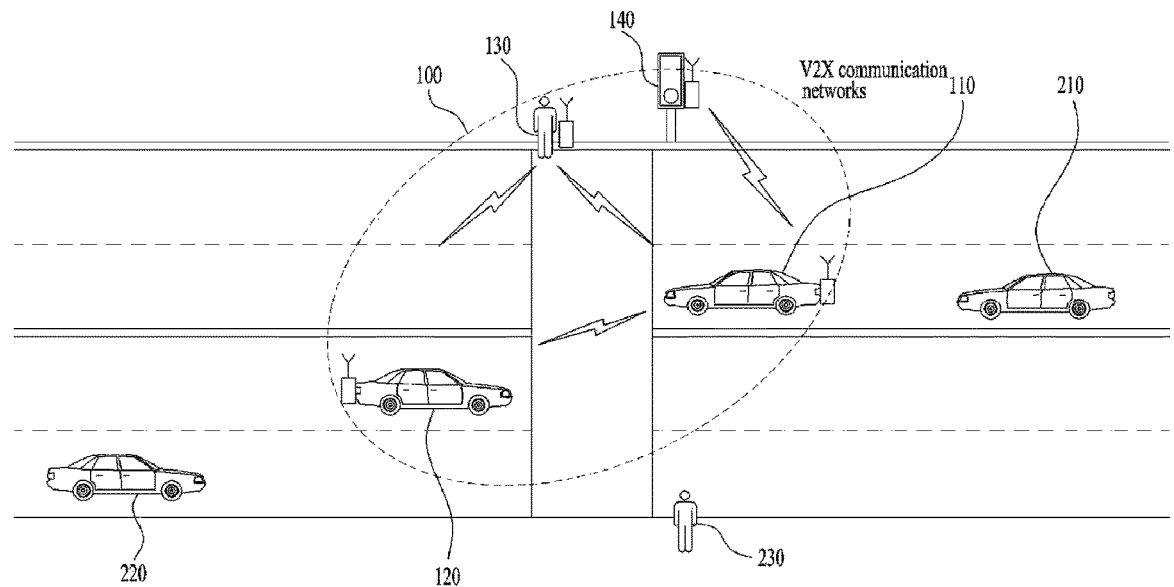
[Fig 33]
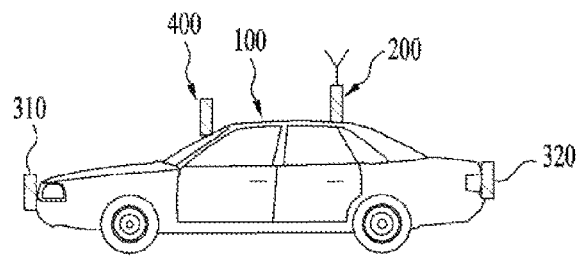
[Fig 34]
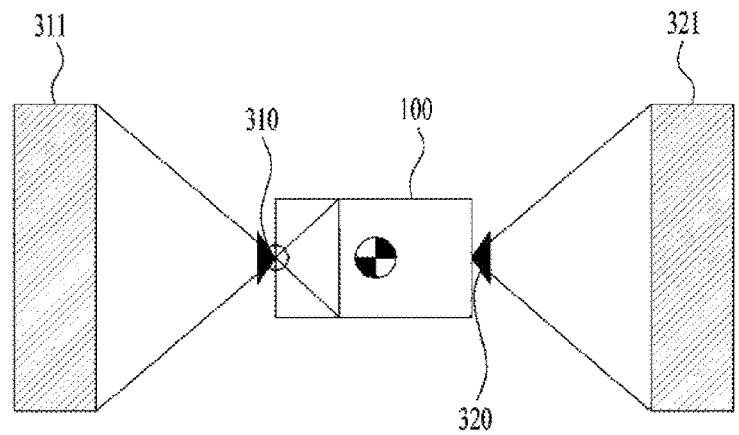

[Fig 35]
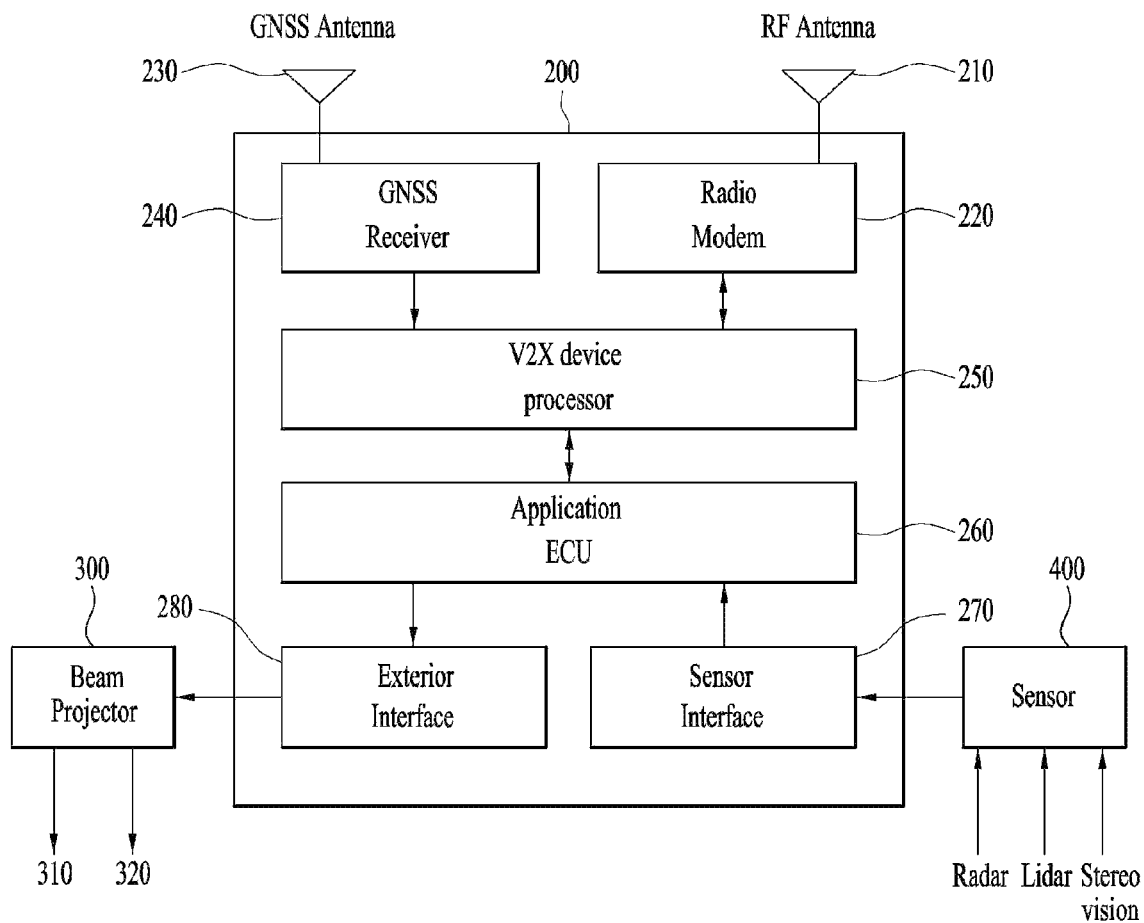
[Fig 36]
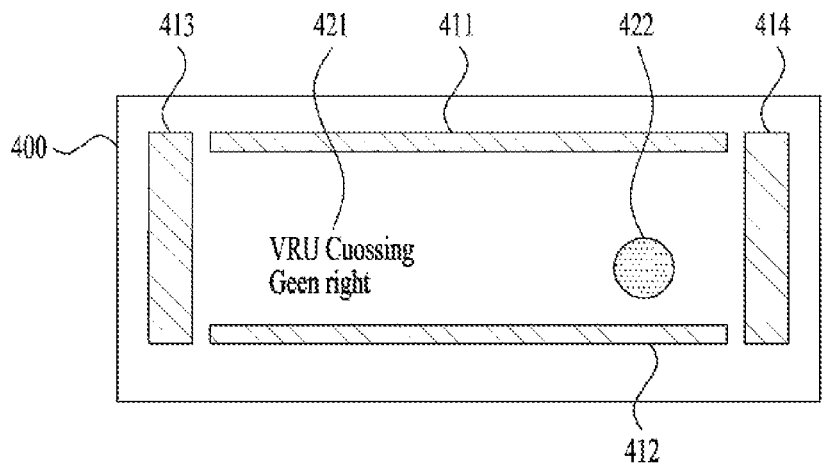

[Fig 37]
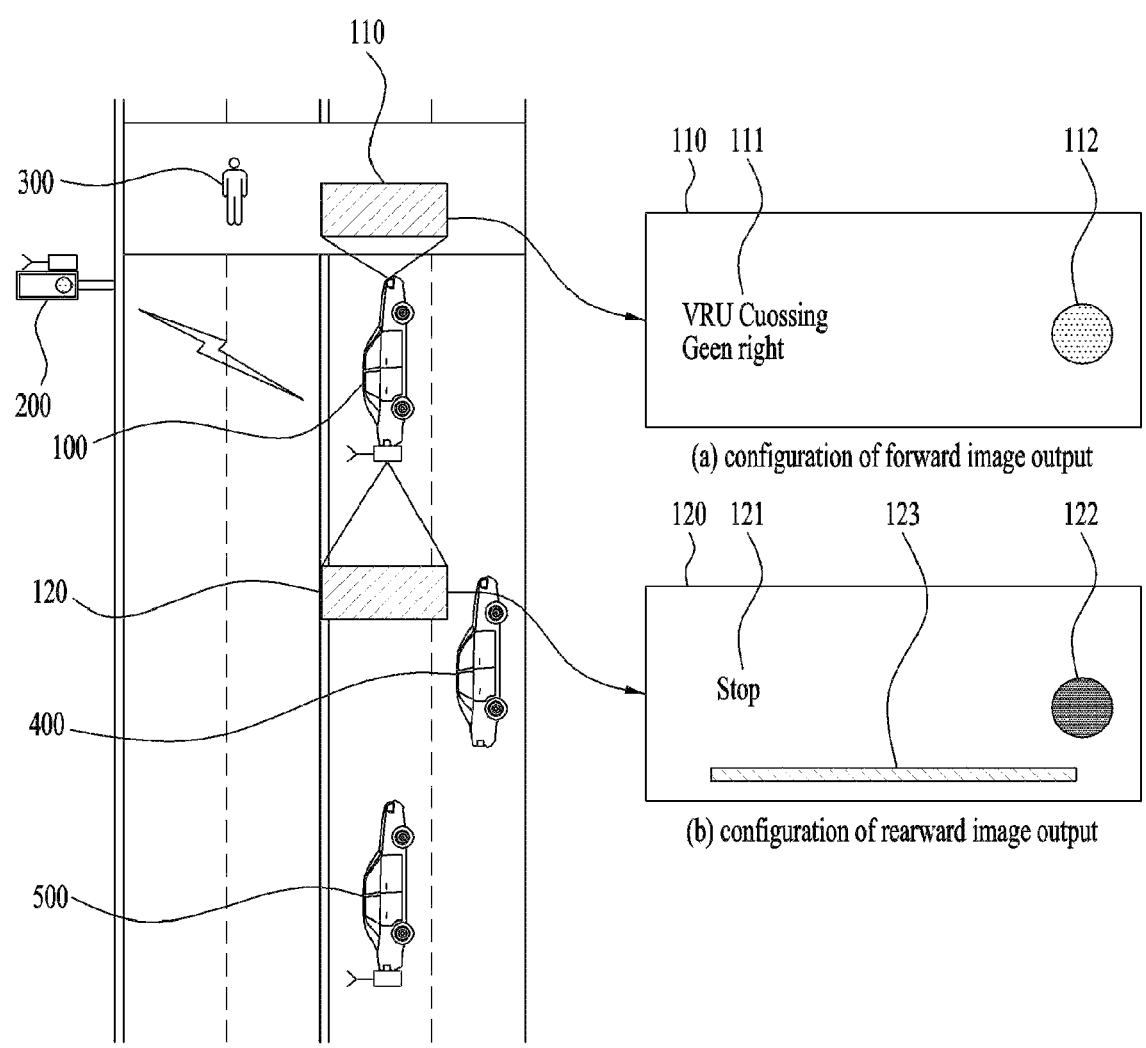

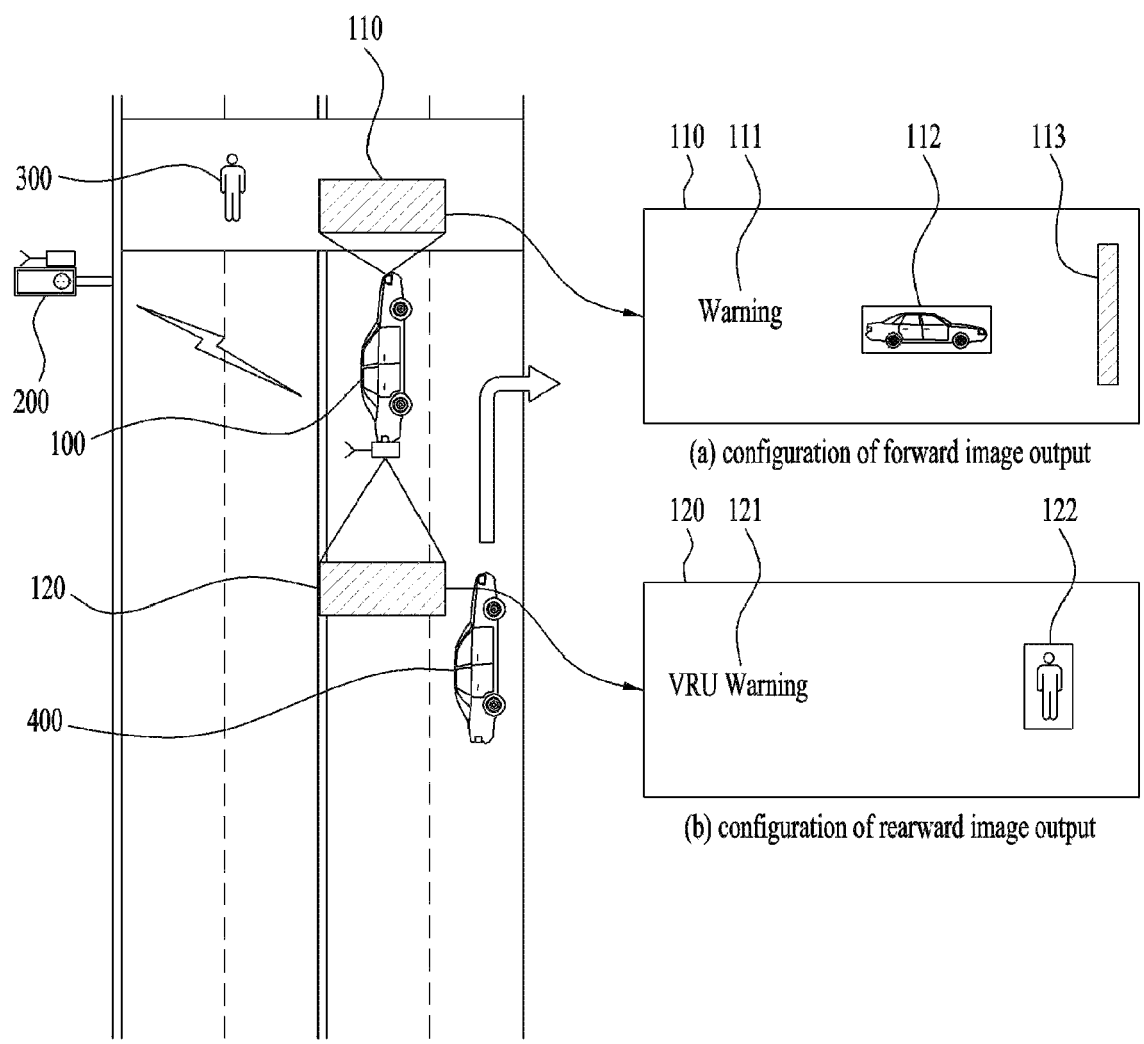
[Fig 38]

[Fig 39]
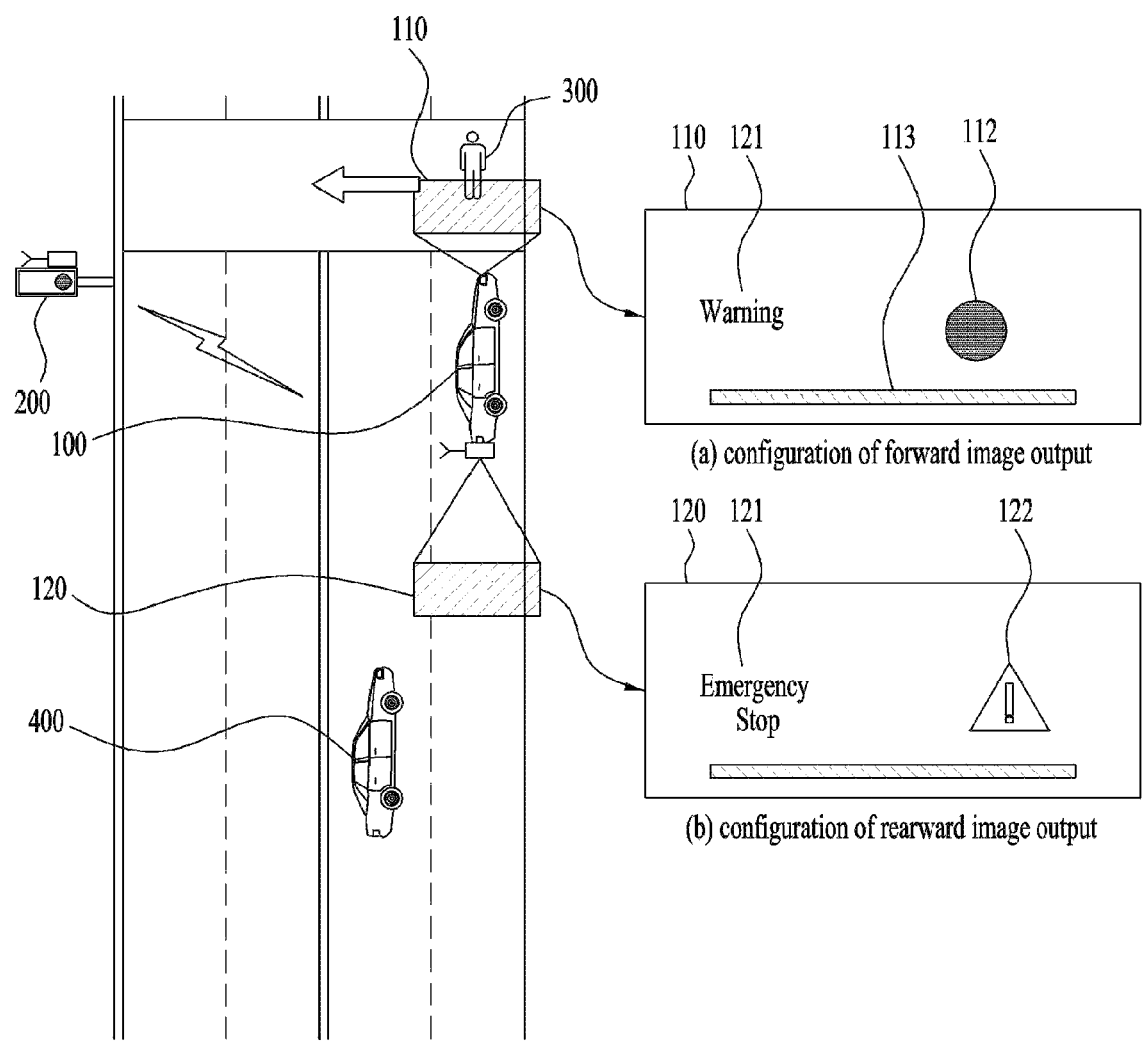
(a) configuration of forward image output
(b) configuration of rearward image output

[Fig 40]
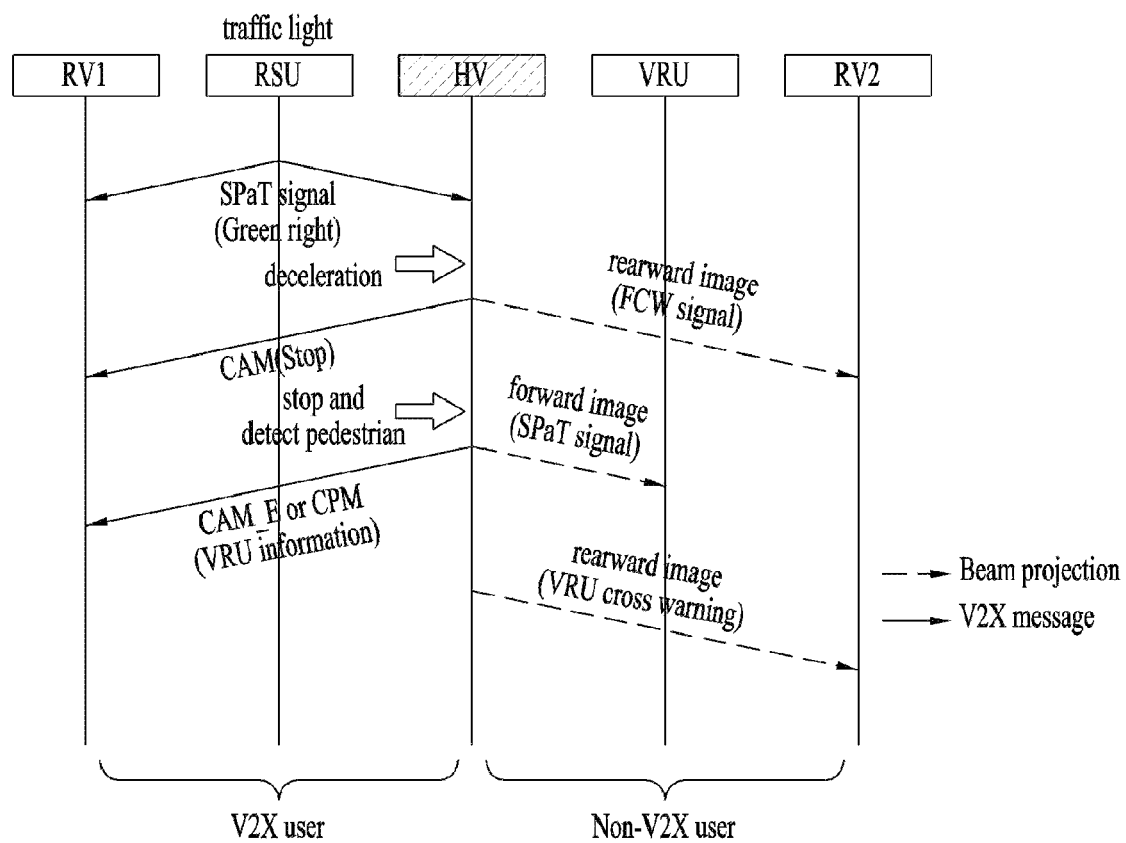

[Fig 41]
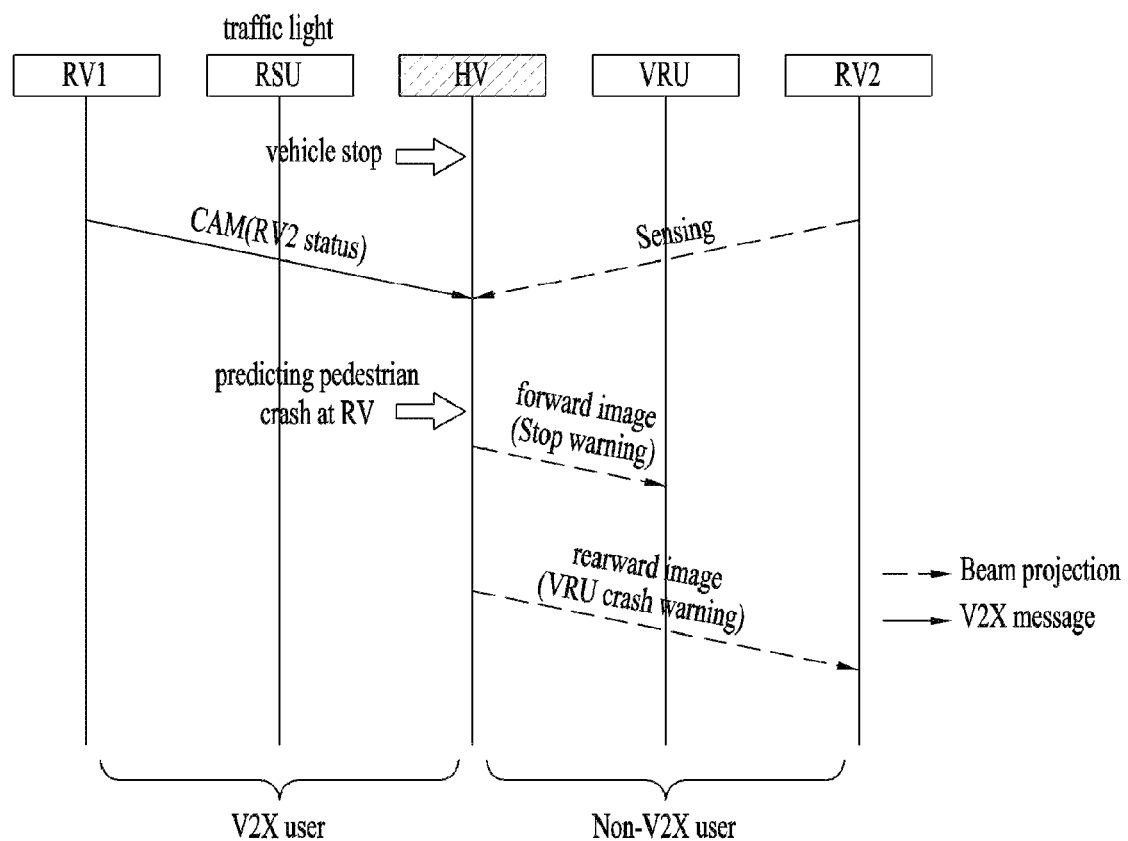

[Fig 42]
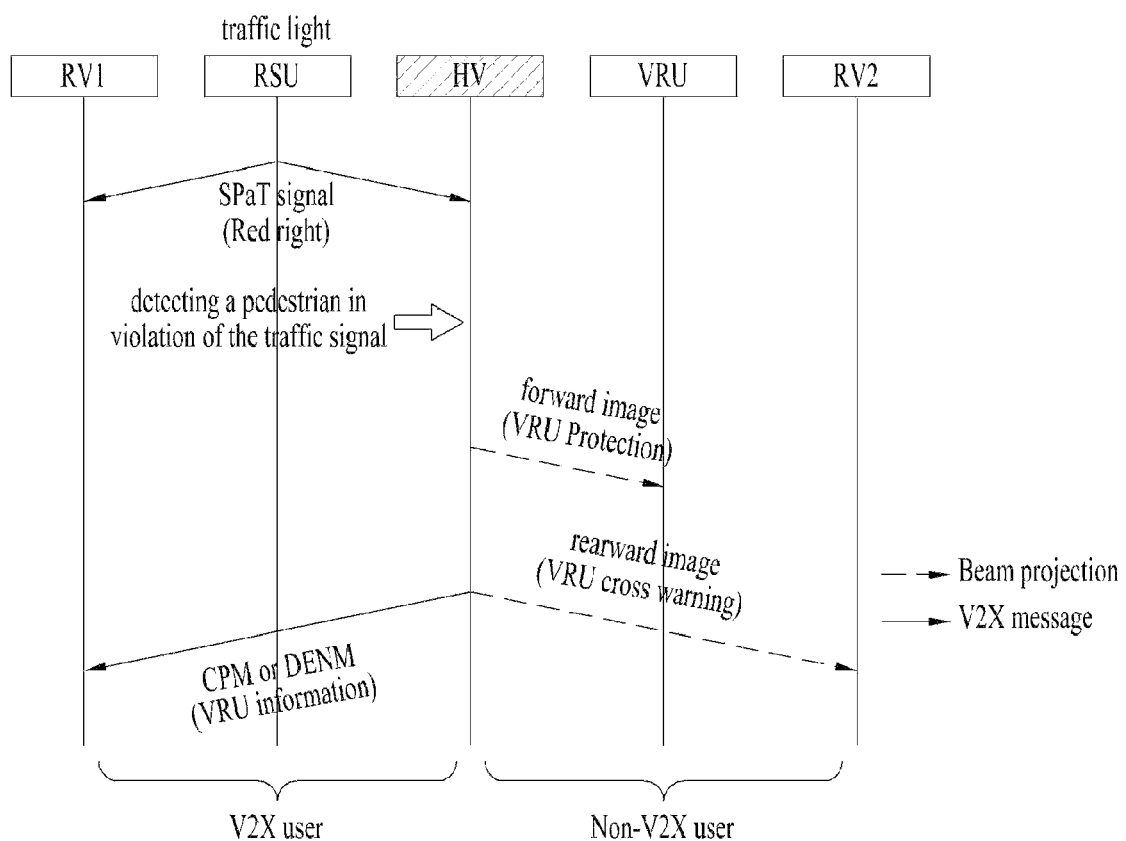

[Fig 43]
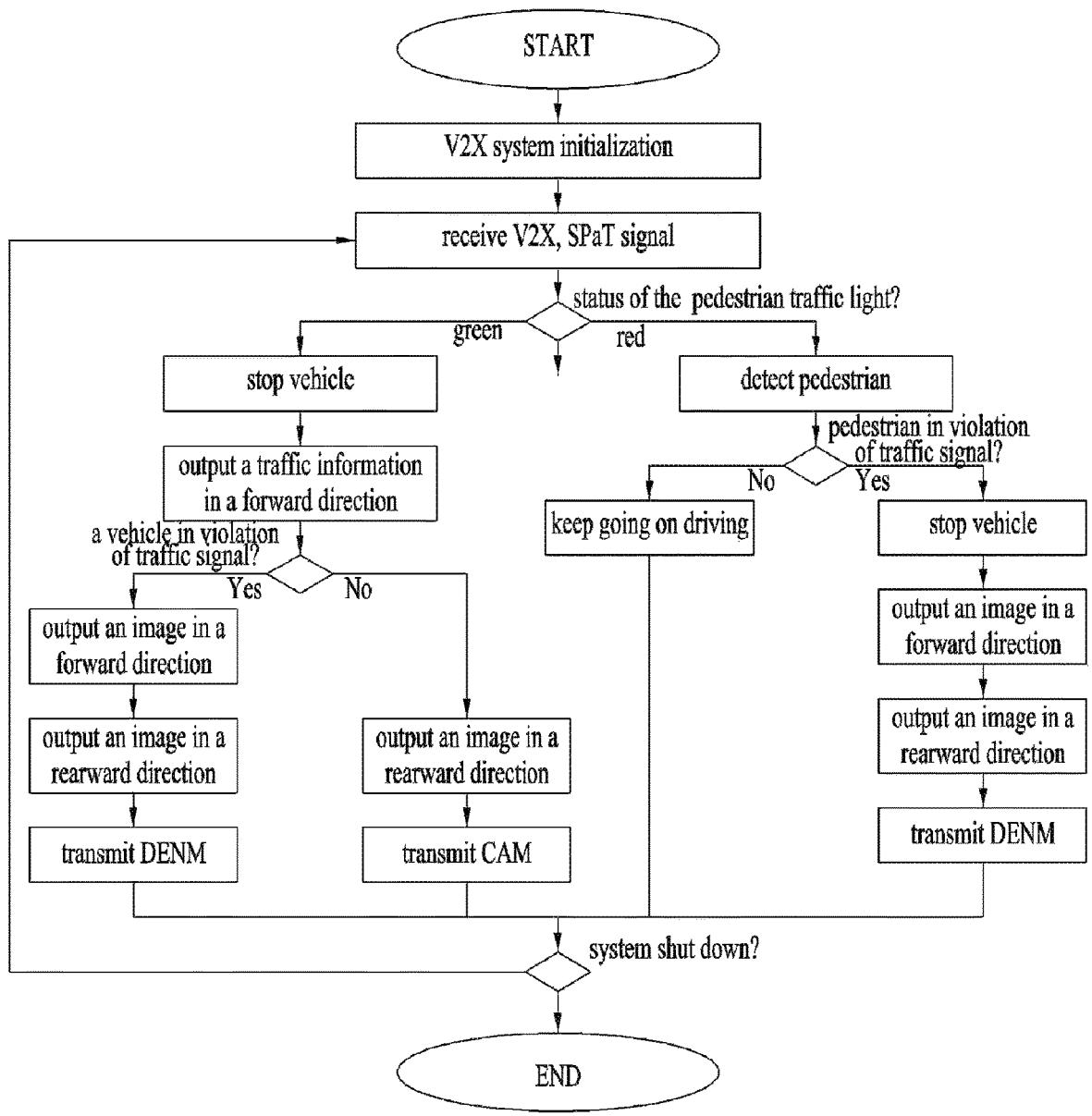

[Fig 44]
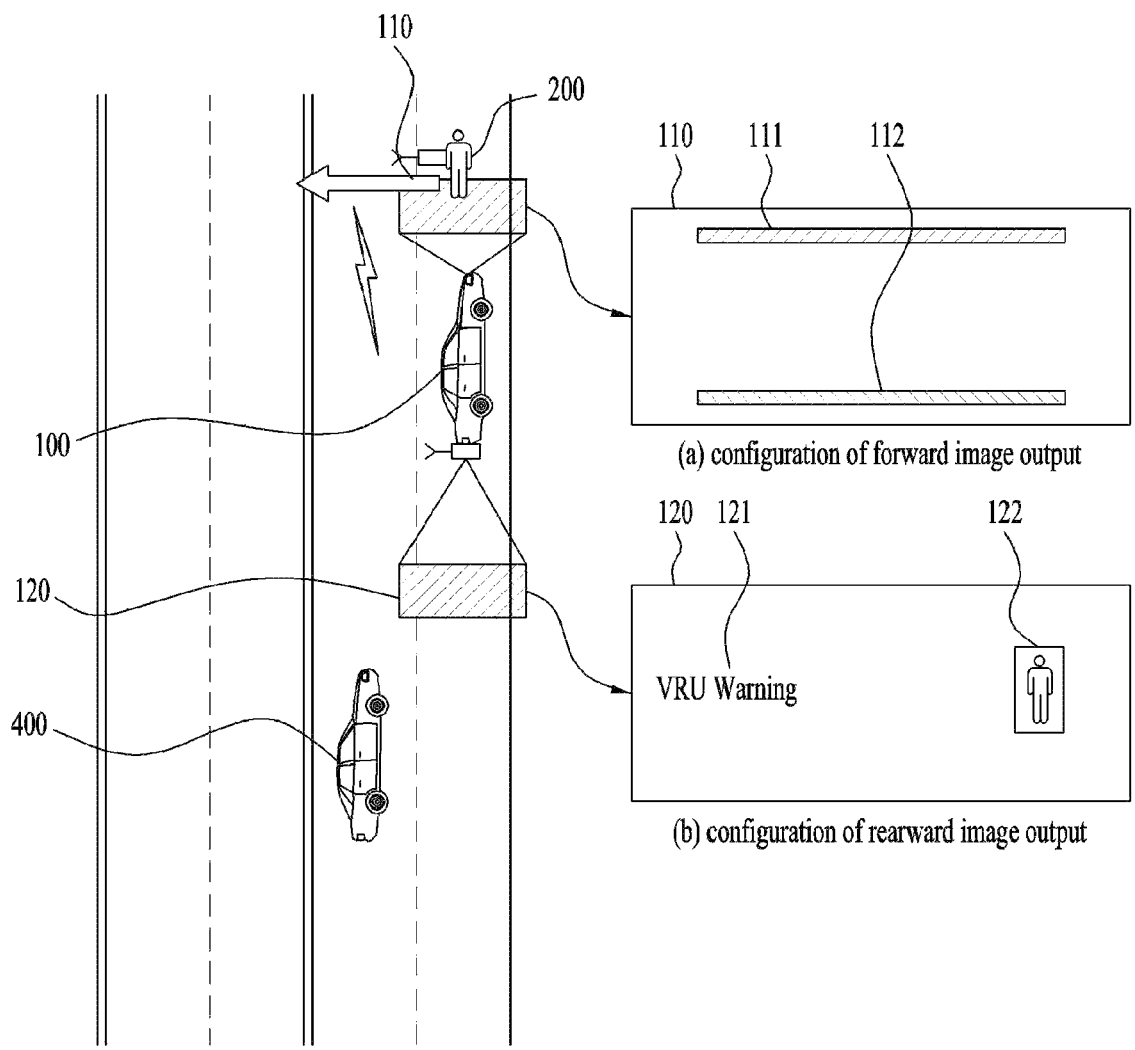

[Fig 45]
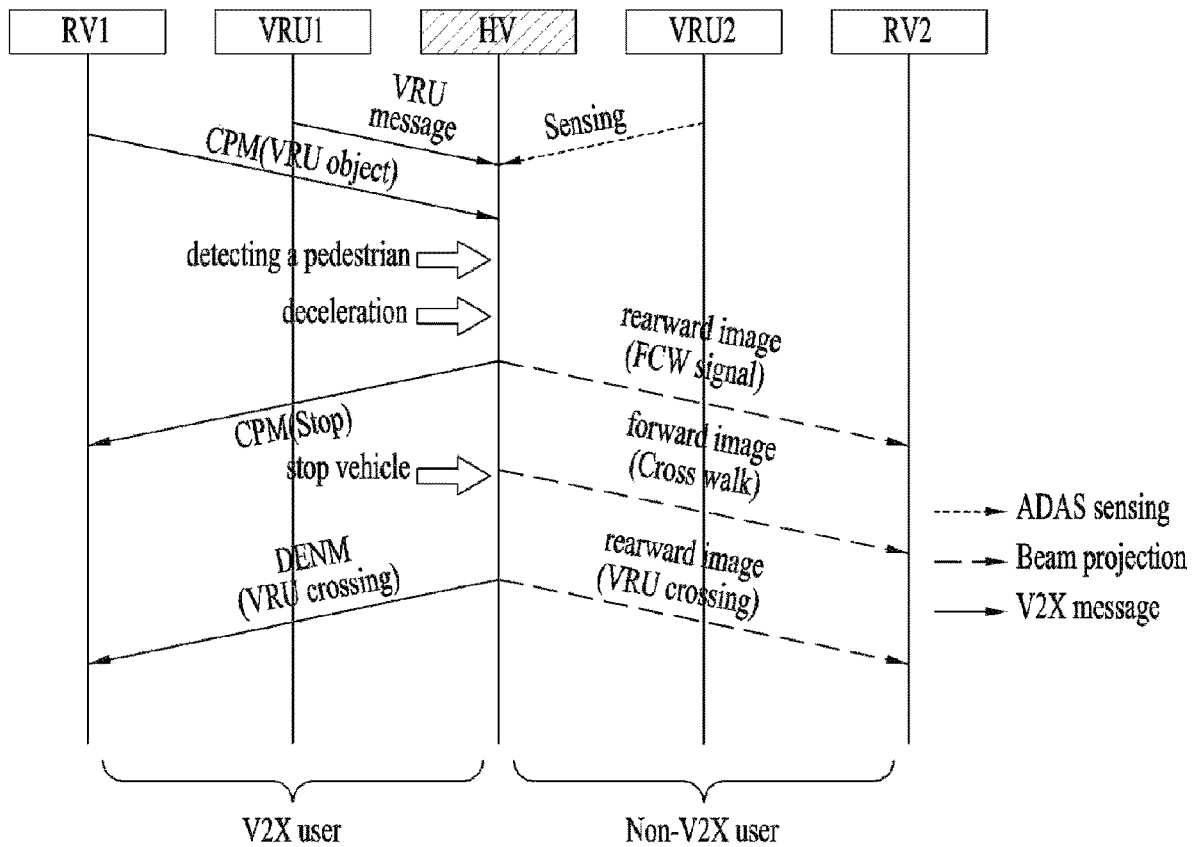

[Fig 46]
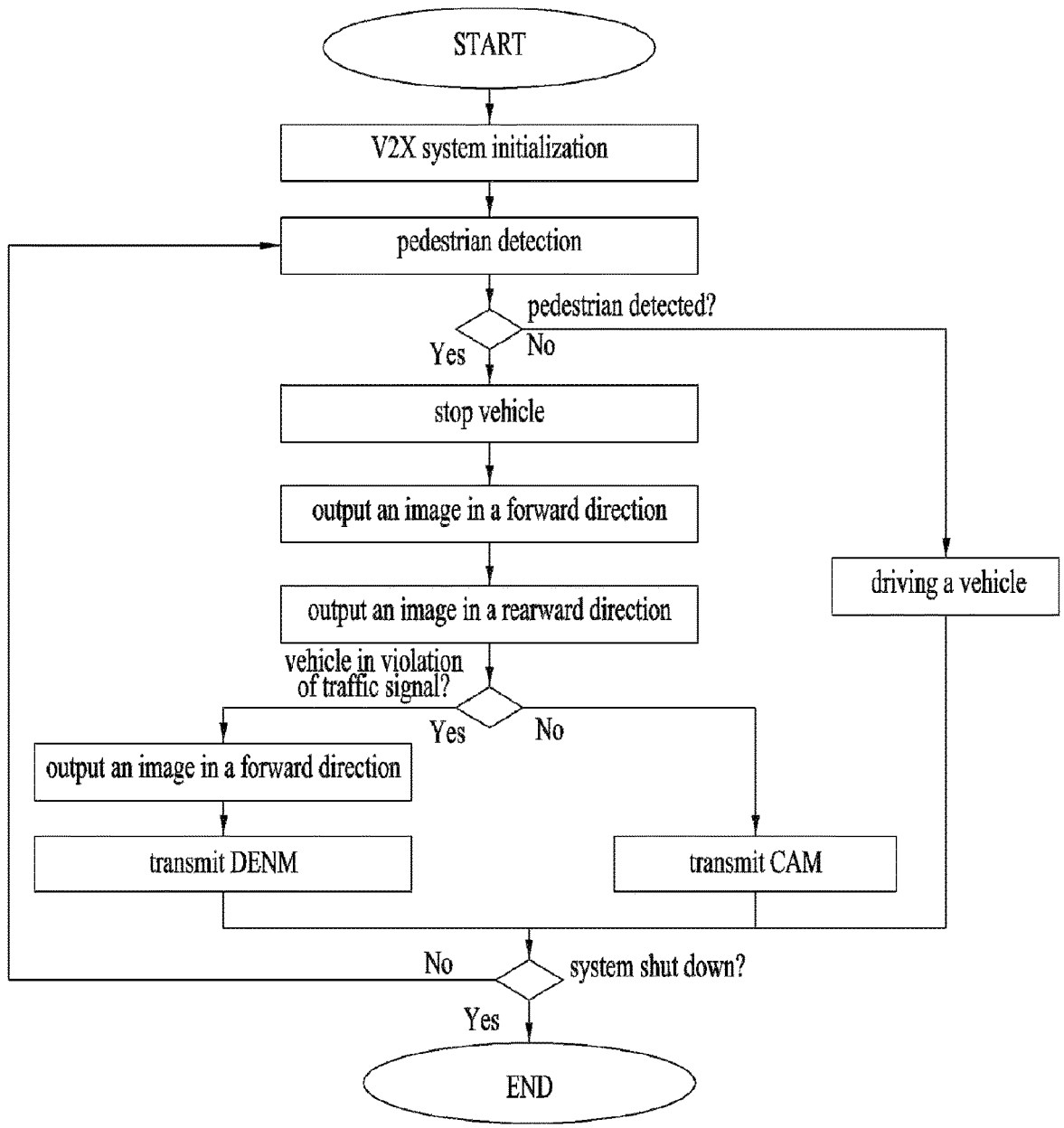

[Fig 47]
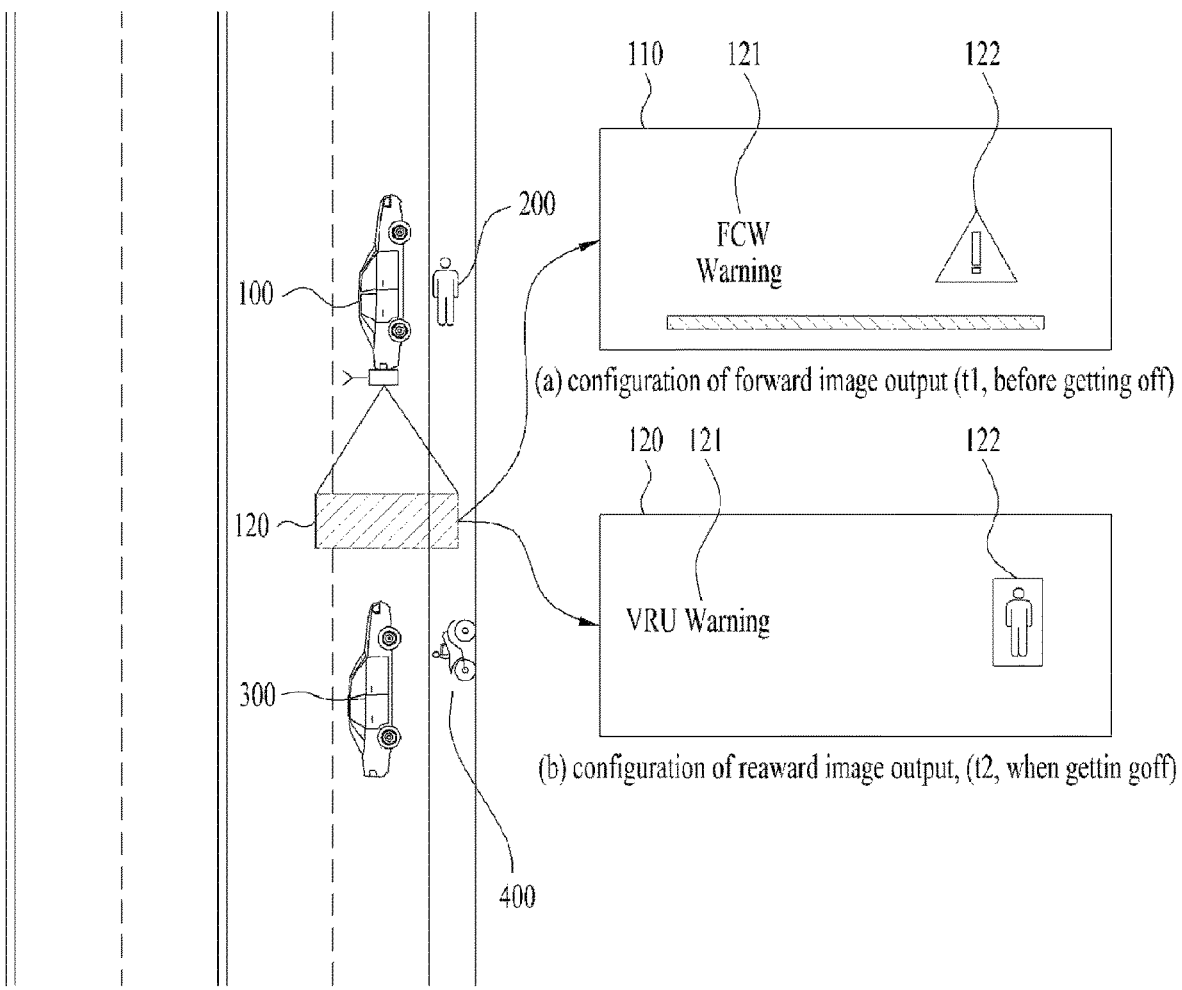

[Fig 48]
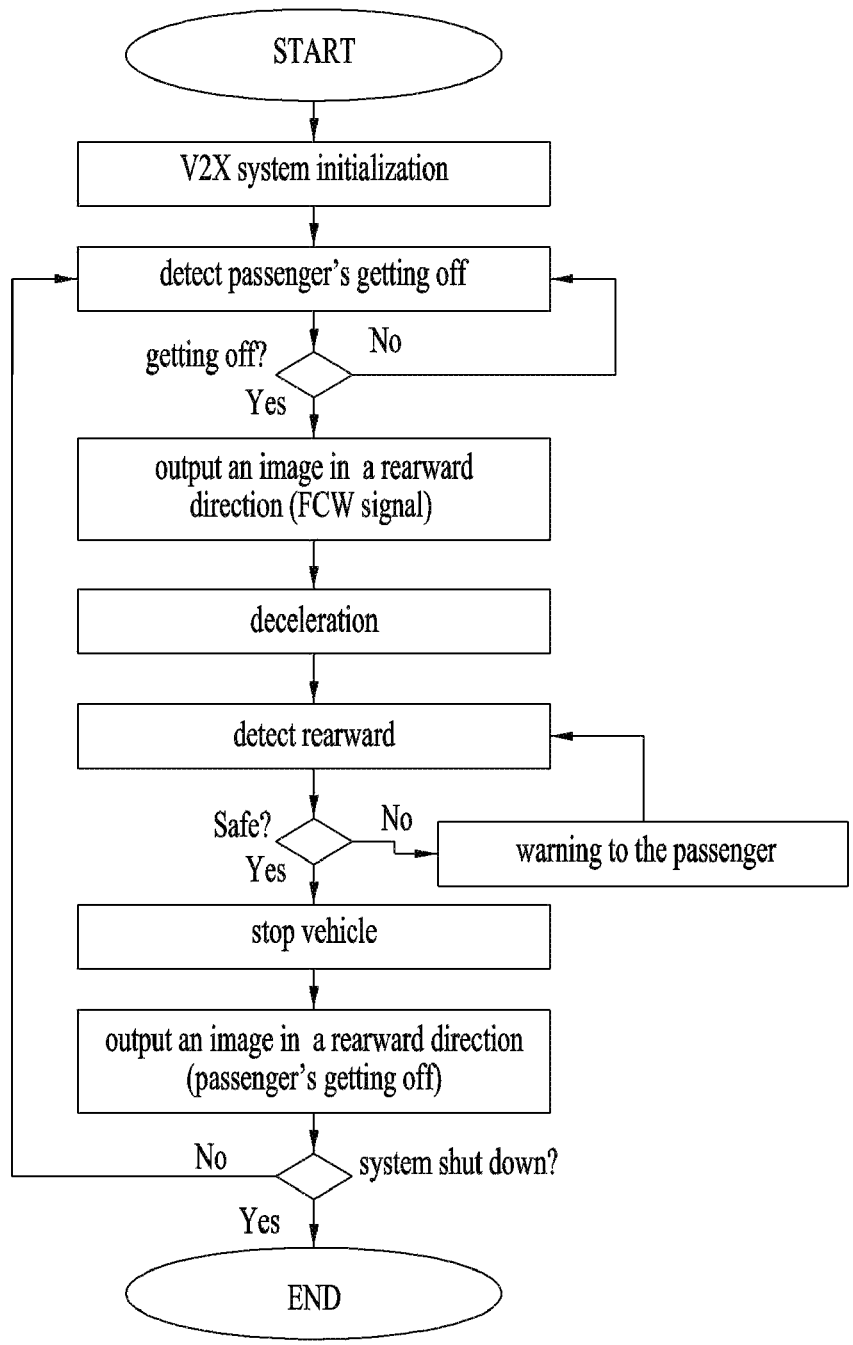

[Fig 49]
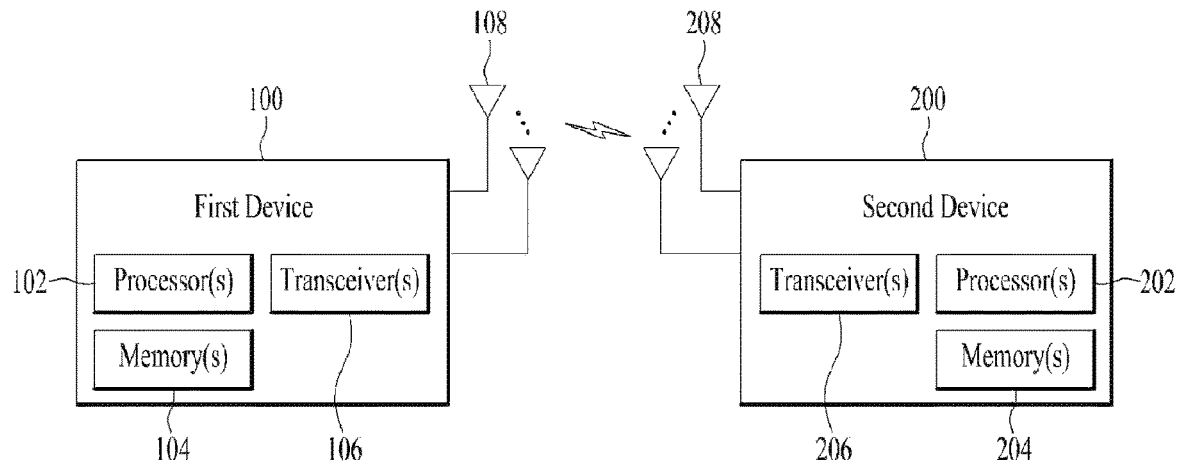
[Fig 50]
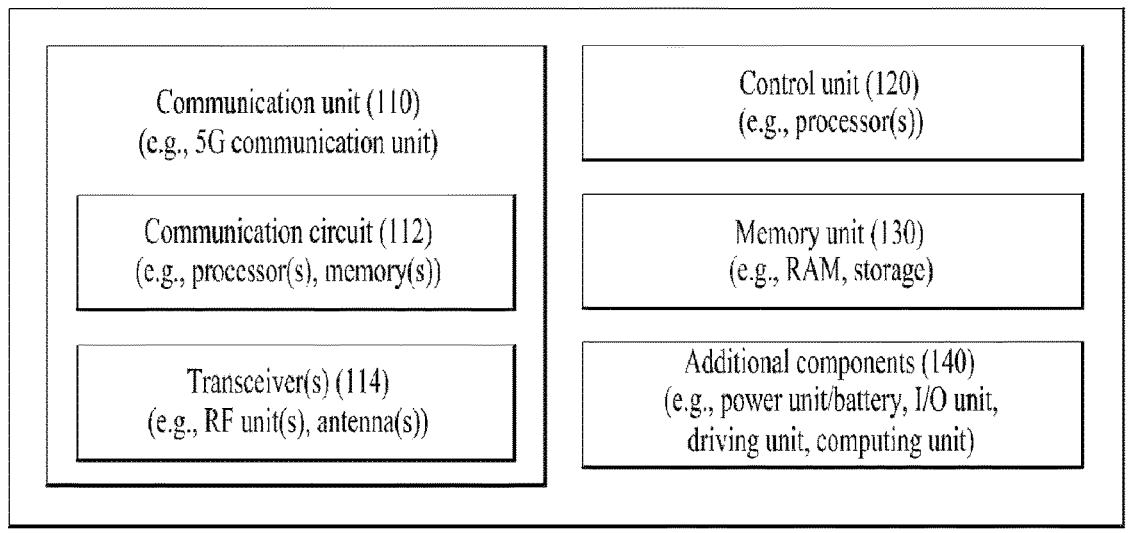

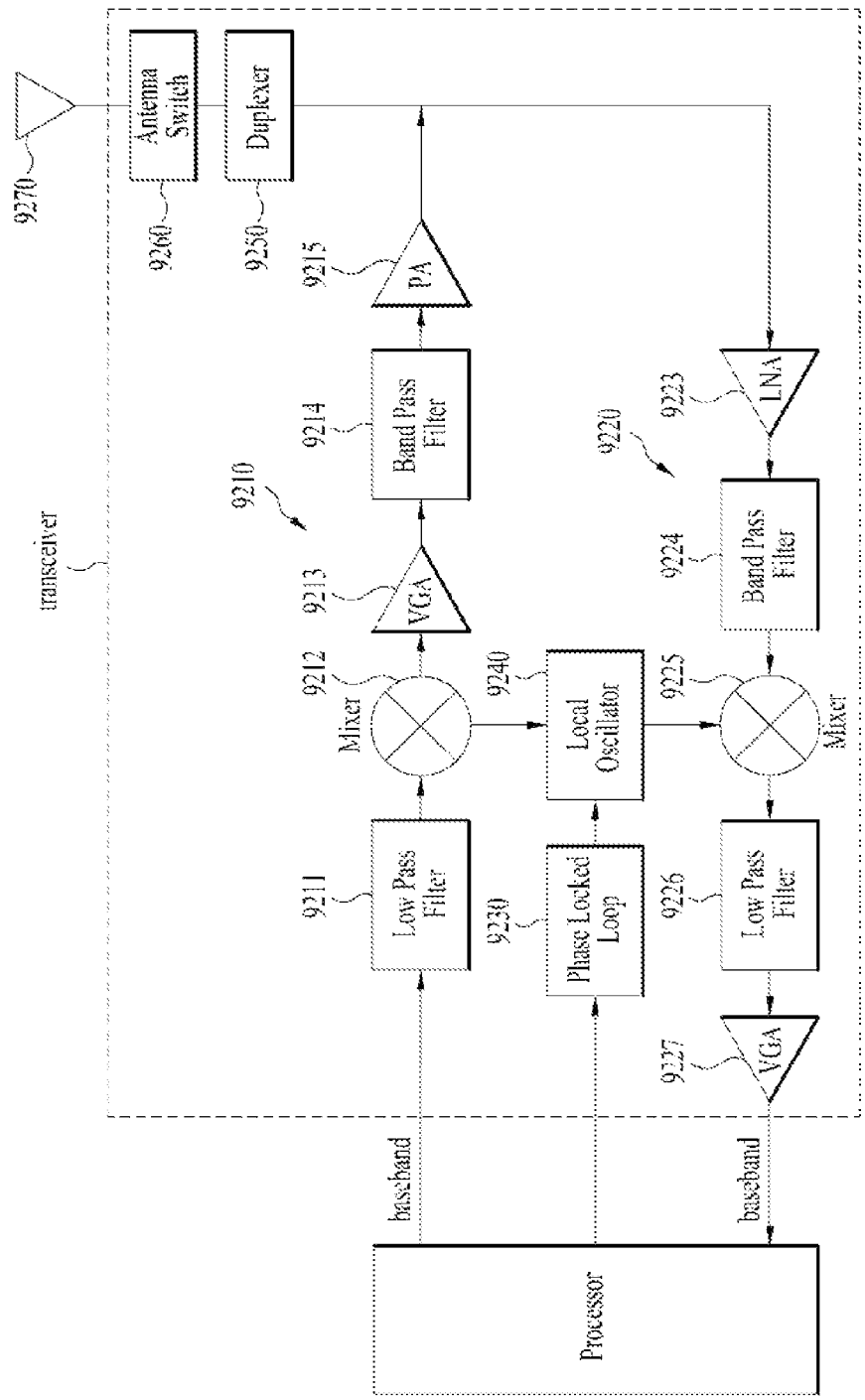
[Fig 51]

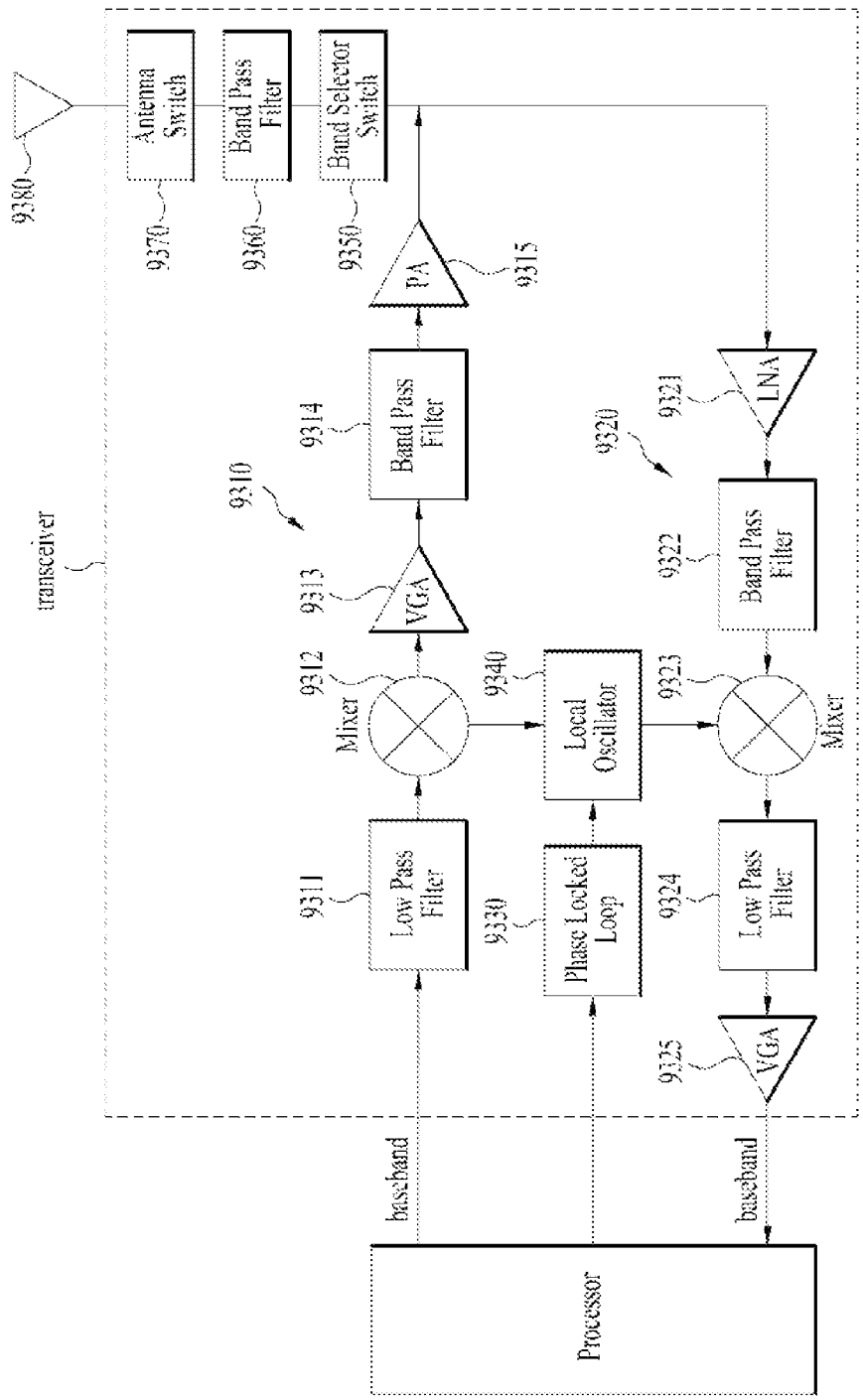
[Fig 52]

[Fig 53]
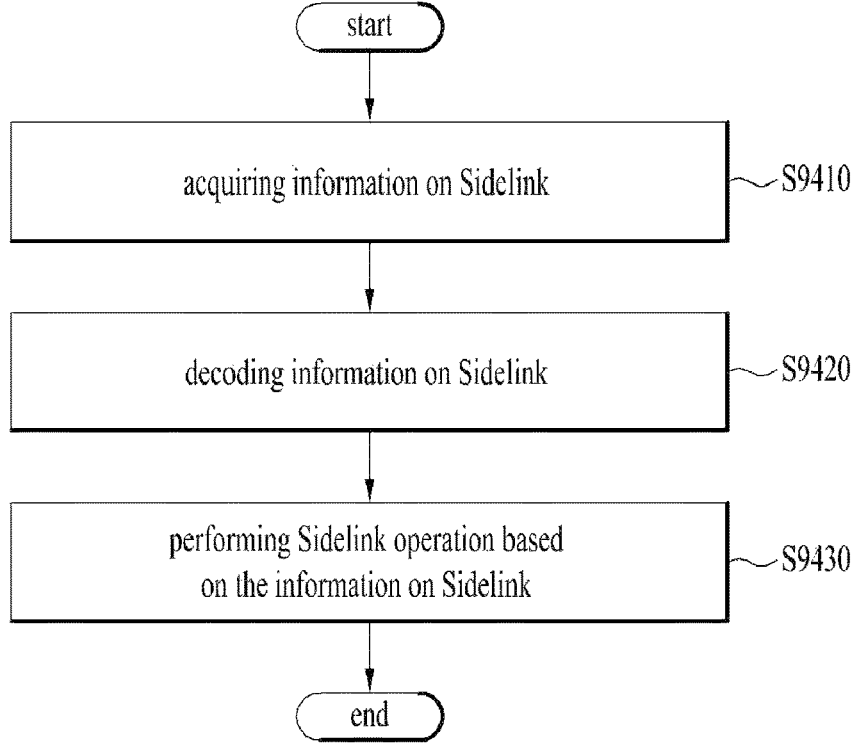
[Fig 54]
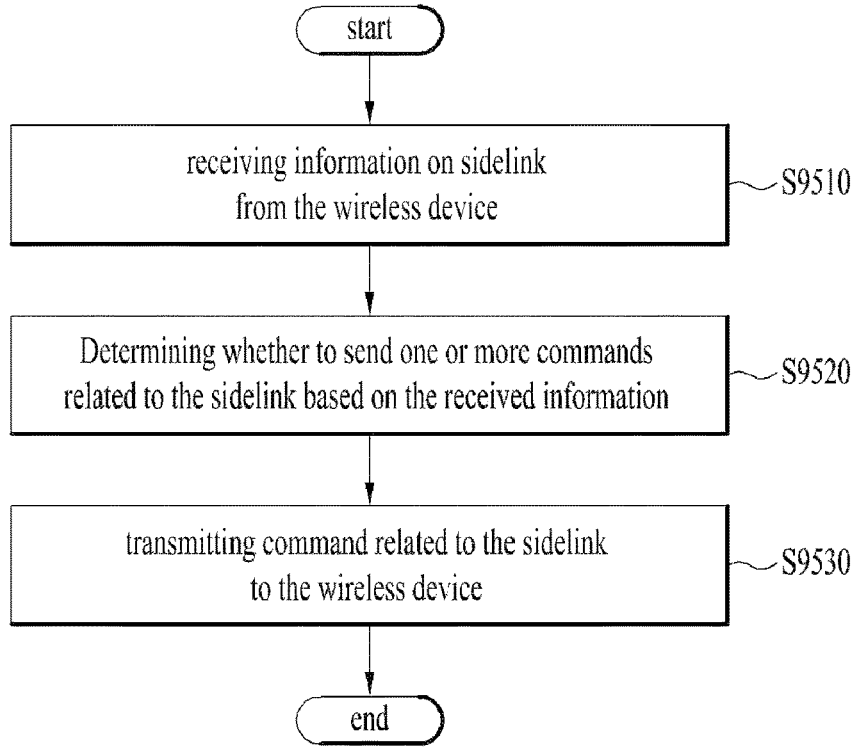

[Fig 55]
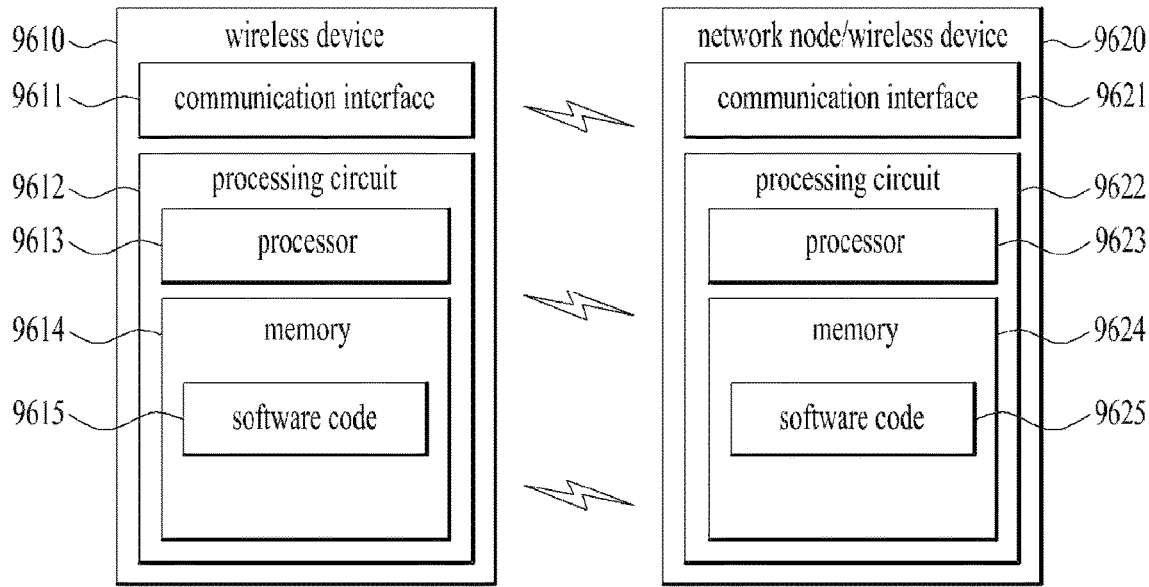
[Fig 56]
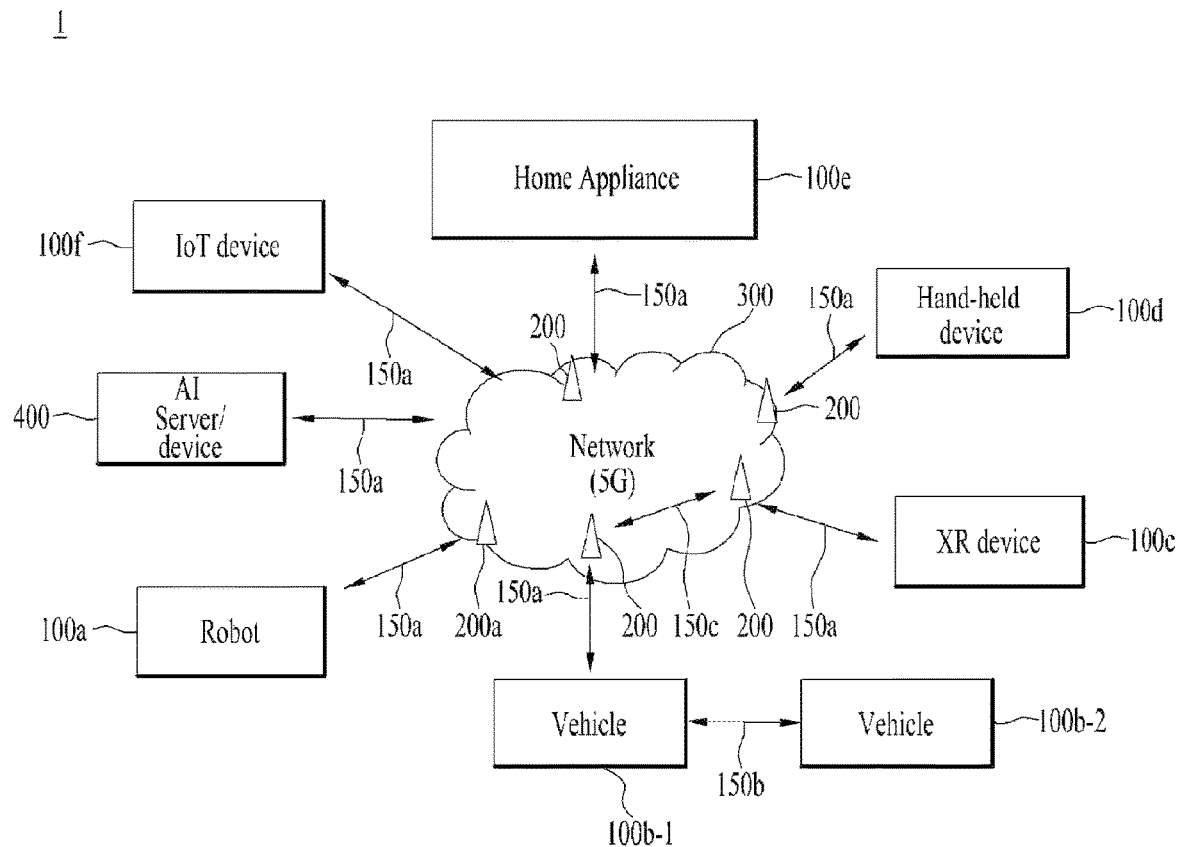

METHOD FOR PROVIDING SAFETY SERVICE IN WIRELESS COMMUNICATION SYSTEM AND VEHICLE FOR SAME

CROSS-REFERENCE TO RELATED APPLICATIONS

This application is the National Stage filing under 35 U.S.C. 371 of International Application No. PCT/KR2019/011398, filed on Sep. 4, 2019, the contents of which is hereby incorporated by reference herein in its entirety.

TECHNICAL FIELD

The present disclosure relates to a method for providing a safety service in a wireless communication system, and more specifically, to a method for providing a safety service to pedestrians using an image output device of a vehicle.

BACKGROUND ART

Conventional V2X technology provides safety services through communication between devices capable of V2X communication. For example, US Patent Application Publication No. US20170060130A1 discloses a method in which a vehicle broadcasts a beacon signal and detects states of surrounding vehicles and pedestrians through a reply thereto.

In addition, US Patent Application Publication No. US20180162388A1 discloses a method of calculating a time to collision (TTC) with a vehicle by measuring the movement of a pedestrian, the direction and speed of the movement of the pedestrian, and warning the pedestrian and a driver. Further, US Patent Application Publication No. US20130154852A1 discloses a method of detecting a pedestrian position around a vehicle and outputting a warning sound through a speaker. Meanwhile, Korean Patent Laid-Open Publication No. KR20180154796A discloses a method of producing a warning by adjusting a direction and volume to match the position and direction of a pedestrian using a directional speaker. Further, Korean Patent Laid-Open Publication No. KR20180135033A discloses a method of recognizing and warning about a collision based on the state and behavior of a pedestrian.

However, the above-described conventional technologies cannot provide an appropriate safety service to a vehicle or a pedestrian that is not provided with a V2X device.

DISCLOSURE

Technical Task

To solve the above-described problem, a technical task of the present disclosure is to provide a method of displaying an image related to a safety service outside a vehicle using an image output device of a V2X vehicle to provide a V2X safety service even to a non-V2X vehicle, and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

To accomplish the technical task, a method of providing a safety service by a host vehicle in a wireless communication system includes detecting an object outside the host vehicle through an object detecting device, transmitting a first message indicating detection of the object through a transceiver, and outputting an image for providing the safety service to the object to a predetermined area outside the host vehicle through an image output device.

Further, the method of providing a safety service may further include receiving a second message including signal information from a network node through the transceiver. The predetermined area may include i) a first area in which the signal information is displayed and ii) a second area in which information related to braking of the host vehicle is displayed.

Further, the second area may be displayed rearward of the host vehicle, and a first indicator for guiding a remote vehicle following the host vehicle to stop may be further displayed in the second area. The position at which the first indicator is displayed may be determined based on a deceleration amount of the host vehicle.

Further, the method of providing a safety service may further include receiving, through the transceiver, a third message including i) state information of the remote vehicle or ii) state information of the object. The predetermined area may include i) a third area in which the state information of the remote vehicle is displayed or ii) a fourth area in which the state information of the object is displayed.

Further, a second indicator for guiding the object to stop may be further displayed in the third area. The position at which the second indicator is displayed may be determined based on relative positions of the host vehicle and the remote vehicle.

The method of providing a safety service may further include detecting a stop of the host vehicle and alighting of a passenger from the host vehicle, and transmitting, through the transceiver, a fourth message indicating the stop of the host vehicle and alighting of the passenger from the host vehicle. The image for providing the safety service may include an image of a passenger alighting from the host vehicle.

Further, the first message may be transmitted through a PC5 interface based on 3rd Generation Partnership Project (3GPP).

Advantageous Effects

According to the method of providing a safety service by a host vehicle in a wireless communication system according to an aspect of the present disclosure, it is possible to achieve technical effects of preventing accidents at crosswalks by providing a V2X safety service to pedestrians and non-V2X vehicles using an image output device of a V2X vehicle.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included as part of the detailed description to help understand an example or an implementation example, provide the example or the implementation example, and explain the technical idea of the example or the implementation example together with the detailed description.

FIG. 1 is a diagram illustrating a vehicle according to embodiment(s).

FIG. 2 is a control block diagram of the vehicle according to embodiment(s).

FIG. 3 is a control block diagram of an autonomous device according to embodiment(s).

FIG. 4 is a diagram showing the signal flow of the autonomous device according to embodiment(s).

FIG. 5 is a diagram showing the interior of the vehicle according to embodiment(s).

FIG. 6 is a block diagram referred to in description of a cabin system for the vehicle according to embodiment(s).

FIG. 7 is a diagram illustrating a reference architecture of an intelligent transport system (ITS) station.

FIG. 8 illustrates an exemplary ITS station structure capable of being designed and applied based on the ITS station reference architecture shown in FIG. 7.

FIG. 9 illustrates an exemplary structure of an application layer.

FIG. 10 illustrates an exemplary structure of a facilities layer.

FIG. 11 illustrates functions of the European ITS network & transport layer.

FIG. 12 illustrates the structure of a wireless access for vehicular environments (WAVE) short message (WSM) packet generated according to a WAVE short message protocol (WSMP).

FIG. 13 illustrates an ITS access layer applied to the Institute of Electrical and Electronics Engineers (IEEE) 802.11p and cellular vehicle-to-everything (V2X) (LTE-V2X, NR-V2X, etc.)

FIG. 14 illustrates the structure of main features of a medium access control (MAC) sub-layer and a physical (PHY) layer of IEEE 802.11p.

FIG. 15 illustrates the structure of enhanced dedicated channel access (EDCA).

FIG. 16 illustrates a transmitter structure of a physical layer.

FIG. 17 illustrates a data flow between MAC and PHY layers in cellular-V2X.

FIG. 18 illustrates an example of processing for uplink transmission.

FIG. 19 illustrates the structure of an LTE system to which embodiment(s) are applicable.

FIG. 20 illustrates a radio protocol architecture for a user plane to which embodiment(s) are applicable.

FIG. 21 illustrates a radio protocol architecture for a control plane to which embodiment(s) are applicable.

FIG. 22 illustrates the structure of an NR system to which embodiment(s) are applicable.

FIG. 23 illustrates functional split between an NG-RAN and a 5GC to which embodiment(s) are applicable.

FIG. 24 illustrates the structure of an NR radio frame to which embodiment(s) are applicable.

FIG. 25 illustrates the structure of a slot of an NR frame to which embodiment(s) are applicable.

FIG. 26 illustrates an example of selecting a transmission resource to which embodiments(s) are applicable.

FIG. 26 illustrates an example of selecting a transmission resource to which embodiments(s) are applicable.

FIG. 27 illustrates an example of transmitting a PSCCH in sidelink transmission mode 3 or 4 to which embodiment(s) are applicable.

FIG. 28 illustrates an example of physical processing at a transmitting side to which embodiment(s) are applicable.

FIG. 29 illustrates an example of physical layer processing at a receiving side to which embodiment(s) are applicable.

FIG. 30 illustrates a synchronization source or synchronization reference in V2X to which embodiment(s) are applicable.

FIG. 31 illustrates an exemplary scenario of configuring bandwidth parts (BWPs) to which an example or implementation example is applicable.

FIG. 32 is a diagram illustrating provision of a safety service according to conventional V2X technology.

FIG. 33 and FIG. 34 illustrate a vehicle in which an image output device is implemented.

FIG. 35 shows a V2X module including a V2X image output device.

FIG. 36 shows an image displayed on a road through the image output device.

FIG. 37 shows a specific example of an image displayed on a road through the image output device.

FIG. 38 and FIG. 39 show a method of providing a safety service through the image output device.

FIG. 40 to FIG. 43 show a method for a V2X vehicle equipped with an image output device to perform V2X communication and external image output.

FIG. 44 is a diagram illustrating a method of providing a safety service through an image output device.

FIG. 45 and FIG. 46 show a method for a V2X vehicle equipped with the image output device to perform V2X communication and external image output.

FIG. 47 and FIG. 48 are diagrams illustrating a safe passenger alighting service using an image output device.

FIG. 49 and FIG. 50 illustrate wireless devices applicable to the present disclosure.

FIG. 51 and FIG. 52 illustrate a transceiver of a wireless communication device according to an embodiment.

FIG. 53 illustrates an operation of a wireless device related to sidelink communication, according to an embodiment.

FIG. 54 illustrates an operation of a network node related to sidelink according to an embodiment.

FIG. 55 illustrates implementation of a wireless device and a network node according to one embodiment.

FIG. 56 illustrates a communication system applied to the present disclosure.

BEST MODE FOR DISCLOSURE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

1. Driving (1) Exterior of Vehicle

FIG. 1 is a diagram illustrating a vehicle according to embodiment(s). Referring to FIG. 1, a vehicle 10 according to embodiment(s) is defined as a transportation means traveling on roads or railroads. The vehicle 10 includes a car, a train, and a motorcycle. The vehicle 10 may include an internal combustion engine vehicle having an engine as a power source, a hybrid vehicle having an engine and a motor as a power source, and an electric vehicle having an electric motor as a power source. The vehicle 10 may be a privately owned vehicle. The vehicle 10 may be a shared vehicle. The vehicle 10 may be an autonomous driving vehicle.

(2) Components of Vehicle

FIG. 2 is a control block diagram of the vehicle according to embodiment(s). Referring to FIG. 2, the vehicle 10 may include a user interface device 200, an object detection device 210, a communication device 220, a driving operation device 230, a main electronic control unit (ECU) 240, a driving control device 250, an autonomous driving device 260, a sensing unit 270, and a position data generation device 280. The object detection device 210, the communication device 220, the driving operation device 230, the main ECU 240, the driving control device 250, the autonomous driving device 260, the sensing unit 270 and the position data generation device 280 may be implemented by electronic devices which generate electric signals and exchange the electric signals with one another.

1) User Interface Device

The user interface device 200 is a device for communication between the vehicle 10 and a user. The user interface device 200 may receive user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about objects outside the vehicle 10. Information about an object may include at least one of information about presence or absence of the object, information about the position of the object, information about a distance between the vehicle 10 and the object, or information about a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor, or an infrared sensor. The object detection device 210 may provide data about an object generated based on a sensing signal generated from a sensor to at least one electronic device included in the vehicle.

2.1) Camera

The camera may generate information about objects outside the vehicle 10 using images. The camera may include at least one lens, at least one image sensor, and at least one processor which is electrically connected to the image sensor, processes received signals, and generates data about objects based on the processed signals.

The camera may be at least one of a mono camera, a stereoscopic camera, or an around view monitoring (AVM) camera. The camera may acquire information about the position of an object, information about a distance to the object, or information about a relative speed with respect to the object using various image processing algorithms. For example, the camera may acquire information about a distance to an object and information about a relative speed with respect to the object from an acquired image based on change in the size of the object over time. For example, the camera may acquire information about a distance to an object and information about a relative speed with respect to the object through a pin-hole model, road profiling, or the like. For example, the camera may acquire information about a distance to an object and information about a relative speed with respect to the object from a stereoscopic image acquired from a stereoscopic camera based on disparity information.

The camera may be mounted in a portion of the vehicle at which field of view (FOV) may be secured in order to capture the outside of the vehicle. The camera may be disposed in proximity to a front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk, or a tail gate. The camera may be disposed in proximity to at least one of side windows inside the vehicle in order to acquire side view images of the vehicle. Alternatively, the camera may be disposed near a side mirror, a fender, or a door.

2.2) Radar

The radar may generate information about an object outside the vehicle 10 using electromagnetic waves. The radar may include an electromagnetic wave transmitter, an electromagnetic wave receiver, and at least one processor which is electrically connected to the electromagnetic wave transmitter and the electromagnetic wave receiver, processes received signals, and generates data about an object based on the processed signals. The radar may be implemented as a pulse radar or a continuous wave radar in terms of electromagnetic wave emission. The continuous wave radar may be implemented as a frequency modulated continuous wave (FMCW) radar or a frequency shift keying (FSK) radar according to signal waveform. The radar may detect an object through electromagnetic waves based on time of flight (TOF) or phase shift and detect the position of the detected object, a distance to the detected object, and a relative speed with respect to the detected object. The radar may be disposed at an appropriate position outside the vehicle in order to detect objects positioned in front of, behind, or on the side of the vehicle.

2.3) Lidar

The lidar may generate information about an object outside the vehicle 10 using a laser beam. The lidar may include a light transmitter, a light receiver, and at least one processor which is electrically connected to the light transmitter and the light receiver, processes received signals, and generates data about an object based on the processed signals. The lidar may be implemented as a TOF type or a phase shift type. The lidar may be implemented as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-driven type lidars. The lidar may detect an object through a laser beam based on the TOF type or the phase shift type and detect the position of the detected object, a distance to the detected object, and a relative speed with respect to the detected object. The lidar may be disposed at an appropriate position outside the vehicle in order to detect objects positioned in front of, behind, or on the side of the vehicle.

3) Communication Device

The communication device 220 may exchange signals with devices disposed outside the vehicle 10. The communication device 220 may exchange signals with at least one of infrastructure (e.g., a server and a broadcast station), another vehicle, or a terminal. The communication device 220 may include at least one of a transmission antenna, a reception antenna, or a radio frequency (RF) circuit or an RF element which may implement various communication protocols, in order to perform communication.

For example, the communication device may exchange signals with external devices based on cellular V2X (C-V2X). For example, C-V2X may include side-link communication based on Long-Term Evolution (LTE) and/or sidelink communication based on NR. Details related to C-V2X will be described later.

For example, the communication device may exchange signals with external devices based on dedicated short range communications (DSRC) or wireless access in vehicular environment (WAVE) based on IEEE 802.11p physical (PHY)/media access control (MAC layer technology and IEEE 1609 network/transport layer technology. DSRC (or WAVE) is communication specification for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transmission rate in the range of 3 Mbps to 27 Mbps. IEEE 802.11p may be combined with IEEE 1609 to support DSRC (or WAVE).

The communication device of embodiment(s) may exchange signals with external devices using only one of C-V2X and DSRC. Alternatively, the communication device of embodiment(s) may exchange signals with external devices using a hybrid of C-V2X and DSRC.

4) Driving Operation Device

The driving operation device 230 may be a device for receiving user input for driving. In the case of a manual mode, the vehicle 10 may be driven based on a signal provided by the driving operation device 230. The driving operation device 230 may include a steering input device (e.g., a steering wheel), an acceleration input device (e.g., an accelerator pedal), and a brake input device (e.g., a brake pedal).

5) Main ECU

The main ECU 240 may control the overall operation of at least one electronic device included in the vehicle 10.

6) Driving Control Device

The driving control device 250 is a device for electrically controlling various vehicle driving devices included in the vehicle 10. The driving control device 250 may include a powertrain driving control device, a chassis driving control device, a door/window driving control device, a safety device driving control device, a lamp driving control device, and an air-conditioner driving control device. The powertrain driving control device may include a power source driving control device and a transmission driving control device. The chassis driving control device may include a steering driving control device, a brake driving control device, and a suspension driving control device. Meanwhile, the safety device driving control device may include a seat belt driving control device for seat belt control.

The driving control device 250 includes at least one electronic control device (e.g., an ECU).

The driving control device 250 may control vehicle driving devices based on signals received by the autonomous device 260. For example, the driving control device 250 may control a powertrain, a steering device, and a brake device based on signals received by the autonomous device 260.

7) Autonomous Driving Device

The autonomous driving device 260 may generate a route for self-driving based on acquired data. The autonomous driving device 260 may generate a driving plan for traveling along the generated route. The autonomous driving device 260 may generate a signal for controlling movement of the vehicle according to the driving plan. The autonomous device 260 may provide the generated signal to the driving control device 250.

The autonomous driving device 260 may implement at least one advanced driver assistance system (ADAS) function. The ADAS may implement at least one of adaptive cruise control (ACC), autonomous emergency braking (AEB), forward collision warning (FCW), lane keeping assist (LKA), lane change assist (LCA), target following assist (TFA), blind spot detection (BSD), adaptive high beam assist (HBA), automated parking system (APS), a pedestrian collision warning system, traffic sign recognition (TSR), traffic sign assist (TSA), night vision (NV), driver status monitoring (DSM), or traffic jam assist (TJA).

The autonomous driving device 260 may perform switching from a self-driving mode to a manual driving mode or switching from the manual driving mode to the self-driving mode. For example, the autonomous driving device 260 may switch the mode of the vehicle 10 from the self-driving mode to the manual driving mode or from the manual driving mode to the self-driving mode, based on a signal received from the user interface device 200.

8) Sensing Unit

The sensing unit 270 may detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, or a pedal position sensor. Further, the IMU sensor may include one or more of an acceleration sensor, a gyro sensor, and a magnetic sensor.

The sensing unit 270 may generate vehicle state data based on a signal generated from at least one sensor. The vehicle state data may be information generated based on data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake pedal, etc.

9) Position Data Generation Device

The position data generation device 280 may generate position data of the vehicle 10. The position data generation device 280 may include at least one of a global positioning system (GPS) or a differential global positioning system (DGPS). The position data generation device 280 may generate position data of the vehicle 10 based on a signal generated from at least one of the GPS or the DGPS. According to an embodiment, the position data generation device 280 may correct position data based on at least one of the IMU sensor of the sensing unit 270 or the camera of the object detection device 210. The position data generation device 280 may also be called a global navigation satellite system (GNSS).

The vehicle 10 may include an internal communication system 50. A plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Driving Device

FIG. 3 is a control block diagram of the autonomous driving device according to embodiment(s). Referring to FIG. 3, the autonomous driving device 260 may include a memory 140, a processor 170, an interface 180, and a power supply 190.

The memory 140 is electrically connected to the processor 170. The memory 140 may store basic data with respect to units, control data for operation control of units, and input/output data. The memory 140 may store data processed in the processor 170. Hardware-wise, the memory 140 may be configured as at least one of a ROM, a RAM, an EPROM, a flash drive, or a hard drive. The memory 140 may store various types of data for overall operation of the autonomous driving device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 by wire or wirelessly. The interface 180 may exchange signals with at least one of the object detection device 210, the communication device 220, the driving operation device 230, the main ECU 240, the driving control device 250, the sensing unit 270, or the position data generation device 280 in a wired or wireless manner. The interface 180 may be configured using at least one of a communication module, a terminal, a pin, a cable, a port, a circuit, an element, or a device.

The power supply 190 may provide power to the autonomous driving device 260. The power supply 190 may be provided with power from a power source (e.g., a battery) included in the vehicle 10 and supply the power to each unit of the autonomous driving device 260. The power supply 190 may operate according to a control signal supplied from the main ECU 240. The power supply 190 may include a switched-mode power supply (SMPS).

The processor 170 may be electrically connected to the memory 140, the interface 180, and the power supply 190 and exchange signals with these components. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units for executing other functions.

The processor 170 may be operated by power supplied from the power supply 190. The processor 170 may receive data, process the data, generate a signal, and provide the signal while power is being supplied thereto.

The processor 170 may receive information from other electronic devices included in the vehicle 10 through the interface 180. The processor 170 may provide control signals to other electronic devices in the vehicle 10 through the interface 180.

The autonomous driving device 260 may include at least one printed circuit board (PCB). The memory 140, the interface 180, the power supply 190, and the processor 170 may be electrically connected to the PCB.

(4) Operation of Autonomous Driving Device

FIG. 4 is a diagram showing the signal flow of the autonomous device according to embodiments.

1) Reception Operation

Referring to FIG. 4, the processor 170 may perform a reception operation. The processor 170 may receive data from at least one of the object detection device 210, the communication device 220, the sensing unit 270, or the position data generation device 280 through the interface 180. The processor 170 may receive object data from the object detection device 210. The processor 170 may receive HD map data from the communication device 220. The processor 170 may receive vehicle state data from the sensing unit 270. The processor 170 may receive position data from the position data generation device 280.

2) Processing/Determination Operation

The processor 170 may perform a processing/determination operation. The processor 170 may perform the processing/determination operation based on traveling situation information. The processor 170 may perform the processing/determination operation based on at least one of the object data, the HD map data, the vehicle state data, or the position data.

2.1) Driving Plan Data Generation Operation

The processor 170 may generate driving plan data. For example, the processor 170 may generate electronic horizon data. The electronic horizon data may be understood as driving plan data in a range from a position at which the vehicle 10 is located to a horizon. The horizon may be understood as a point a predetermined distance before the position at which the vehicle 10 is located based on a predetermined traveling route. The horizon may refer to a point at which the vehicle may arrive after a predetermined time from the position at which the vehicle 10 is located along a predetermined traveling route.

The electronic horizon data may include horizon map data and horizon path data.

2.1.1) Horizon Map Data

The horizon map data may include at least one of topology data, road data, HD map data, or dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated based on data received from an external server through the communication device 220. The topology data may be based on data stored in at least one memory included in the vehicle 10.

The road data may include at least one of road slope data, road curvature data, or road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which may be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 may provide map data in a range from a position at which the vehicle 10 is located to the horizon.

2.1.2) Horizon Path Data

The horizon path data may be explained as a trajectory through which the vehicle 10 may travel in a range from a position at which the vehicle 10 is located to the horizon. The horizon path data may include data indicating a relative probability of selecting a road at a decision point (e.g., a fork, a junction, a crossroad, or the like). The relative probability may be calculated based on a time taken to arrive at a final destination. For example, if a time taken to arrive at a final destination is shorter when a first road is selected at a decision point than that when a second road is selected, a probability of selecting the first road may be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at least one decision point on the main path.

3) Control Signal Generation Operation

The processor 170 may perform a control signal generation operation. The processor 170 may generate a control signal based on the electronic horizon data. For example, the processor 170 may generate at least one of a powertrain control signal, a brake device control signal, or a steering device control signal based on the electronic horizon data.

The processor 170 may transmit the generated control signal to the driving control device 250 through the interface 180. The driving control device 250 may transmit the control signal to at least one of a powertrain 251, a brake device 252, or a steering device 253.

2. Cabin

FIG. 5 is a diagram showing the interior of the vehicle according to embodiment(s). FIG. 6 is a block diagram referred to in description of a cabin system for a vehicle according to embodiment(s).

Referring to FIGS. 5 and 6, a cabin system 300 for a vehicle (hereinafter, a cabin system) may be defined as a convenience system for a user who uses the vehicle 10. The cabin system 300 may be explained as a high-end system including a display system 350, a cargo system 355, a seat system 360, and a payment system 365. The cabin system 300 may include a main controller 370, a memory 340, an interface 380, a power supply 390, an input device 310, an imaging device 320, a communication device 330, the display system 350, the cargo system 355, the seat system 360, and the payment system 365. According to embodiments, the cabin system 300 may further include components in addition to the components described in this specification or may not include some of the components described in this specification.

1) Main Controller

The main controller 370 may be electrically connected to the input device 310, the communication device 330, the display system 350, the cargo system 355, the seat system 360, and the payment system 365 and exchange signals with these components. The main controller 370 may control the input device 310, the communication device 330, the display system 350, the cargo system 355, the seat system 360, and the payment system 365. The main controller 370 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units for executing other functions.

The main controller 370 may be configured as at least one sub-controller. The main controller 370 may include a plurality of sub-controllers according to an embodiment. Each of the sub-controllers may individually control grouped devices and systems included in the cabin system 300. The devices and systems included in the cabin system 300 may be grouped by functions or grouped based on seats on which a user may sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 may receive signals, information, or data from a user terminal through the communication device 330. The user terminal may transmit signals, information, or data to the cabin system 300.

The processor 371 may identify a user based on image data received from at least one of an internal camera or an external camera included in the imaging device. The processor 371 may identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information, or use history information of a user.

The main controller 370 may include an artificial intelligence (AI) agent 372. The AI agent 372 may perform machine learning based on data acquired through the input device 310. The AI agent 371 may control at least one of the display system 350, the cargo system 355, the seat system 360, or the payment system 365 based on machine learning results.

2) Essential Components

The memory 340 is electrically connected to the main controller 370. The memory 340 may store basic data about units, control data for operation control of units, and input/output data. The memory 340 may store data processed in the main controller 370. Hardware-wise, the memory 340 may be configured using at least one of a ROM, a RAM, an EPROM, a flash drive, or a hard drive. The memory 340 may store various types of data for the overall operation of the cabin system 300, such as a program for processing or control of the main controller 370. The memory 340 may be integrated with the main controller 370.

The interface 380 may exchange signals with at least one electronic device included in the vehicle 10 by wire or wirelessly. The interface 380 may be configured using at least one of a communication module, a terminal, a pin, a cable, a port, a circuit, an element, or a device.

The power supply 390 may provide power to the cabin system 300. The power supply 390 may be provided with power from a power source (e.g., a battery) included in the vehicle 10 and supply the power to each unit of the cabin system 300. The power supply 390 may operate according to a control signal supplied from the main controller 370. For example, the power supply 390 may be implemented as a switched-mode power supply (SMPS).

The cabin system 300 may include at least one PCB. The main controller 370, the memory 340, the interface 380, and the power supply 390 may be mounted on at least one PCB.

3) Input Device

The input device 310 may receive user input. The input device 310 may convert the user input into an electrical signal. The electrical signal converted by the input device 310 may be converted into a control signal and provided to at least one of the display system 350, the cargo system 355, the seat system 360, or the payment system 365. The main controller 370 or at least one processor included in the cabin system 300 may generate a control signal based on the electrical signal received from the input device 310.

The input device 310 may include at least one of a touch input unit, a gesture input unit, a mechanical input unit, or a voice input unit. The touch input unit may convert a user's touch input into an electrical signal. The touch input unit may include at least one touch sensor for detecting a user's touch input. According to an embodiment, the touch input unit may realize a touchscreen through integration with at least one display included in the display system 350. Such a touchscreen may provide both an input interface and an output interface between the cabin system 300 and a user. The gesture input unit may convert a user's gesture input into an electrical signal. The gesture input unit may include at least one of an infrared sensor or an image sensor to sense a user's gesture input. According to an embodiment, the gesture input unit may detect a user's three-dimensional gesture input. To this end, the gesture input unit may include a plurality of light output units for outputting infrared light or a plurality of image sensors. The gesture input unit may detect a user's three-dimensional gesture input using TOF, structured light, or disparity. The mechanical input unit may convert a user's physical input (e.g., press or rotation) through a mechanical device into an electrical signal. The mechanical input unit may include at least one of a button, a dome switch, a jog wheel, or a jog switch. Meanwhile, the gesture input unit and the mechanical input unit may be integrated. For example, the input device 310 may include a jog dial device that includes a gesture sensor and is formed such that it may be inserted into/ejected from a part of a surrounding structure (e.g., at least one of a seat, an armrest, or a door). When the jog dial device is parallel to the surrounding structure, the jog dial device may serve as a gesture input unit. When the jog dial device is protruded from the surrounding structure, the jog dial device may serve as a mechanical input unit. The voice input unit may convert a user's voice input into an electrical signal. The voice input unit may include at least one microphone. The voice input unit may include a beam forming microphone.

4) Imaging Device

The imaging device 320 may include at least one camera. The imaging device 320 may include at least one of an internal camera or an external camera. The internal camera may capture an image of the inside of the cabin. The external camera may capture an image of the outside of the vehicle. The internal camera may acquire an image of the inside of the cabin. The imaging device 320 may include at least one internal camera. It is desirable that the imaging device 320 include as many cameras as the number of passengers who can be accommodated in the vehicle. The imaging device 320 may provide an image acquired by the internal camera. The main controller 370 or at least one processor included in the cabin system 300 may detect a motion of a user based on an image acquired by the internal camera, generate a signal based on the detected motion, and provide the signal to at least one of the display system 350, the cargo system 355, the seat system 360, or the payment system 365. The external camera may acquire an image of the outside of the vehicle. The imaging device 320 may include at least one external camera. It is desirable that the imaging device 320 include as many cameras as the number of doors through which passengers can enter the vehicle. The imaging device 320 may provide an image acquired by the external camera. The main controller 370 or at least one processor included in the cabin system 300 may acquire user information based on the image acquired by the external camera. The main controller 370 or at least one processor included in the cabin system 300 may authenticate a user or acquire body information (e.g., height information, weight information, etc.) of a user, fellow passenger information of a user, and baggage information of a user based on the user information.

5) Communication Device

The communication device 330 may wirelessly exchange signals with external devices. The communication device 330 may exchange signals with external devices through a network or directly exchange signals with external devices. External devices may include at least one of a server, a mobile terminal, or another vehicle. The communication device 330 may exchange signals with at least one user terminal. The communication device 330 may include an antenna and at least one of an RF circuit or an RF element which may implement at least one communication protocol in order to perform communication. According to an embodiment, the communication device 330 may use a plurality of communication protocols. The communication device 330 may switch communication protocols according to a distance to a mobile terminal.

For example, the communication device may exchange signals with external devices based on cellular V2X (C-V2X). For example, C-V2X may include LTE based sidelink communication and/or NR based sidelink communication. Details related to C-V2X will be described later.

For example, the communication device may exchange signals with external devices based on dedicated short range communications (DSRC) or wireless access in vehicular environment (WAVE) based on IEEE 802.11p PHY/MAC layer technology and IEEE 1609 network/transport layer technology. DSRC (or WAVE) is communication specification for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE).

The communication device of embodiment(s) may exchange signals with external devices using only one of C-V2X and DSRC. Alternatively, the communication device of embodiment(s) may exchange signals with external devices using a hybrid of C-V2X and DSRC.

6) Display System

The display system 350 may display graphical objects. The display system 350 may include at least one display device. For example, the display system 350 may include a first display device 410 for common use and a second display device 420 for individual use.

6.1) Display Device for Common Use

The first display device 410 may include at least one display 411 which outputs visual content. The display 411 included in the first display device 410 may be realized by at least one of a flat panel display, a curved display, a rollable display, or a flexible display. For example, the first display device 410 may include a first display 411 which is positioned behind a seat and formed to be inserted/ejected into/from the cabin, and a first mechanism for moving the first display 411. The first display 411 may be disposed so as to be inserted into/ejected from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images may be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 or the second display device 420. The processor included in the display system 350 may generate a control signal based on a signal received from at least one of the main controller 370, the input device 310, the imaging device 320, or the communication device 330.

A display area of a display included in the first display device 410 may be divided into a first area 411a and a second area 411b. The first area 411a may be defined as a content display area. For example, the first area 411 may display at least one of graphical objects corresponding to entertainment content (e.g., movies, sports, shopping, music, etc.), video conferences, food menus, or augmented reality screens. The first area 411a may display graphical objects corresponding to traveling situation information of the vehicle 10. The traveling situation information may include at least one of object information outside the vehicle, navigation information, or vehicle state information. The object information outside the vehicle may include information about presence or absence of an object, positional information of the object, information about a distance between the vehicle and the object, and information about a relative speed of the vehicle with respect to the object. The navigation information may include at least one of map information, information about a set destination, route information according to setting of the destination, information about various objects on a route, lane information, or information about the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b may be defined as a user interface area. For example, the second area 411b may display an AI agent screen. The second area 411b may be located in an area defined by a seat frame according to an embodiment. In this case, a user may view content displayed in the second area 411b between seats. The first display device 410 may provide hologram content according to an embodiment. For example, the first display device 410 may provide hologram content for each of a plurality of users such that only a user who requests the content may view the content.

6.2) Display Device for Individual Use

The second display device 420 may include at least one display 421. The second display device 420 may provide the display 421 at a position at which only an individual passenger may view display content. For example, the display 421 may be disposed on an armrest of a seat. The second display device 420 may display graphic objects corresponding to personal information of a user. The second display device 420 may include as many displays 421 as the number of passengers who may ride in the vehicle. The second display device 420 may realize a touchscreen by forming a layered structure along with a touch sensor or being integrated with the touch sensor. The second display device 420 may display graphical objects for receiving user input for seat adjustment or indoor temperature adjustment.

7) Cargo System

The cargo system 355 may provide items to a user at the request of the user. The cargo system 355 may operate based on an electrical signal generated by the input device 310 or the communication device 330. The cargo system 355 may include a cargo box. The cargo box may be hidden, with items being loaded in a part under a seat. When an electrical signal based on user input is received, the cargo box may be exposed to the cabin. The user may select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 may provide a user customized seat to a user. The seat system 360 may operate based on an electrical signal generated by the input device 310 or the communication device 330. The seat system 360 may adjust at least one element of a seat based on acquired user body data. The seat system 360 may include a user detection sensor (e.g., a pressure sensor) for determining whether a user sits on a seat. The seat system 360 may include a plurality of seats on which a plurality of users may sit. One of the plurality of seats may be disposed to face at least one other seat. At least two users may set facing each other inside the cabin.

9) Payment System

The payment system 365 may provide a payment service to a user. The payment system 365 may operate based on an electrical signal generated by the input device 310 or the communication device 330. The payment system 365 may calculate a price for at least one service used by the user and request the user to pay the calculated price.

3. Vehicular Communications for ITS

Overview

An intelligent transport system (ITS) based on vehicle-to-everything (V2X) communication (vehicle communication) is mainly composed of an access layer, a network & transport layer, a facilities layer, an application layer, a security entity, a management entity, and so on.

Vehicle communication may be applied to various scenarios such as vehicle-to-vehicle (V2V) communication, vehicle-to-BS (V2N or N2V) communication, vehicle-to-road side unit (RSU) (V2I or I2V) communication, RSU-to-RSU (I2I) communication, vehicle-to-pedestrian (V2P or P2V) communication, RSU-to-pedestrian (I2P or P2I) communication, and so on. A vehicle, a base station (BS), an RSU, a pedestrian, etc., which are subjects of vehicle communication, are referred to as an ITS station.

Architecture

FIG. 7 illustrates an ITS station reference architecture defined in ISO 21217/EN 302 665. The ITS station reference architecture is composed of the access layer, network & transport layer, facilities layer, entities for security and management, and application layer, which is located at the top. The ITS station reference architecture follows a layered OSI model.

The features of the ITS station reference architecture will be described based on the OSI model of FIG. 7. The access layer of the ITS station corresponds to OSI layer 1 (physical layer) and OSI layer 2 (data link layer). The network & transport layer of the ITS station corresponds to OSI layer 3 (network layer) and OSI layer 4 (transport layer). The facilities layer of the ITS station corresponds to OSI layer 5 (session layer), OSI layer 6 (presentation layer), and OSI layer 7 (application layer).

The application layer located at the top of the ITS station performs a function of actually implementing and supporting a use case, and the application layer may be selectively used depending on use cases. The management entity manages all layers including communication and operation of the ITS station. The security entity provides security services for all layers. Each layer of the ITS station exchanges data to be transmitted or received through vehicle communication and additional information for various purposes via interfaces therebetween. Various interfaces are abbreviated as follows.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

FIG. 8 illustrates an exemplary ITS station structure capable of being designed and applied based on the ITS station reference architecture shown in FIG. 7. The main concept of the structure of FIG. 7 is to allow each layer having a specific function to distribute and perform communication processing between two ends: vehicles/users configured in a communication network. That is, when a vehicle-to-vehicle message is generated, a vehicle and ITS system (or another ITS-related terminal/system) may transfer data through each layer down one layer at a time, and a vehicle or ITS system (or another ITS-related terminal/system) receiving the message may transfer data up one layer at a time when the message arrives.

The ITS based on vehicle and network communication is systematically designed in consideration of various access technologies, network protocols, communication interfaces, and so on to support various use cases. The roles and functions of each layer described below may vary according to circumstances. Hereinafter, the main functions of each layer will be briefly described.

Application Layer

The application layer actually implements and supports various use cases. For example, the application layer provides safety and traffic information and other entertainment information.

FIG. 9 illustrates an exemplary structure of the application layer. To provide services, the application layer provides controls the ITS station to which the application belongs in various ways or transfers service messages to end vehicles/users/infrastructure through vehicle communication via lower layers: access layer, network & transport layer, and facilities layer. In this case, the ITS application may support various use cases, and these use cases may be grouped into other applications such as road safety, traffic efficiency, local services, and infotainment. The application classifications and use cases of FIG. 9 may be updated when a new application scenario is defined. In FIG. 9, the layer management serves to manage and service information related to operation and security of the application layer, and related information is transferred and shared in two ways through MA (i.e., interface between management entity and application layer) and SA (i.e., interface between security entity and ITS-S applications) (or service access point (SAP) (e.g., MA-SAP, SA-SAP, etc.)). A request from the application layer to the facilities layer or a service message and related information from the facilities layer to the application layer may be transferred through FA (interface between facilities layer and ITS-S applications or FA-SAP).

Facilities Layer

The facilities layer supports to effectively implement various use cases defined in the upper application layer. For example, the facilities layer performs application support, information support, and/or session/communication support.

FIG. 10 illustrates an exemplary structure of the facilities layer. The facilities layer basically supports the functions of the upper three layers of the OSI model, for example, the session layer, presentation layer, and application layer. Specifically, as shown in FIG. 10, the facilities layer provides the following facilities for the ITS: application support, information support, session/communication support, etc. Here, the facilities mean components that provide functionality, information, and data.

[Application support facilities]: The application support facilities are facilities that support the operations of the ITS application (e.g., ITS message generation, transmission/reception with lower layers, and management thereof). Examples thereof include a cooperative awareness (CA) basic service, a decentralized environmental notification (DEN) basic service, and the like. In the future, facilities entities and related messages may be additionally defined for new services such as cooperative adaptive cruise control (CACC), platooning, a vulnerable roadside user (VRU), a collective perception service (CPS), etc.

[Information support facilities]: The information support facilities are facilities that provide common data information or databases used for various ITS applications. Examples thereof include a local dynamic map (LDM), etc.

[Session/communication support facilities]: The session/communication support facilities are facilities that provide services for communications and session management. Examples thereof include addressing mode, session support, etc.

The facilities may be divided into common facilities and domain facilities as shown in FIG. 10.

[Common facilities]: The common facilities are facilities that provide common services or functions required for various ITS applications and ITS station operations. Examples thereof include time management, position management, services management, etc.

[Domain facilities]: The domain facilities are facilities that provide special services or functions required only for some (one or more) ITS applications. Examples thereof include a DEN basic service for road hazard warning (RHW) applications. The domain facilities are optional functions. That is, the domain facilities are not used unless supported by the ITS station.

In FIG. 10, the layer management serves to manage and service information related to operation and security of the facilities layer, and related information is transferred and shared in two ways through MF (i.e., interface between management entity and facilities layer) and SF (i.e., interface between security entity and facilities layer) (or MF-SAP, SF-SAP, etc.). A request from the application layer to the facilities layer or a service message and related information from the facilities layer to the application layer may be transferred through FA (or FA-SAP). A service message and related information between the facilities layer and lower networking & transport layer may be transferred bidirectionally through NF (i.e., interface between networking & transport layer and facilities layer) (or NF-SAP).

Network & Transport Layer

The network & transport layer configures a network for vehicle communication between homogenous or heterogeneous networks by supporting various transport protocols and network protocols. For example, the network & transport layer may provide Internet access, routing, and a vehicle network based on Internet protocols such as TCP/UDP+IPv6. Specifically, the vehicle network may be formed based on a basic transport protocol (BTP) and a GeoNetworking-based protocol. In this case, networking based on geographic location information may also be supported. A vehicle network layer may be designed or configured in an access layer technology dependent manner. On the other hand, the vehicle network may be designed or configured in an access layer technology independent manner, i.e., in an access layer technology agnostic manner.

FIG. 11 illustrates the functions of the European ITS network & transport layer. Basically, the functions of the ITS network & transport layer are similar to or identical to those of the OSI 3 layer (network layer) and OSI 4 layer (transport layer). Hereinafter, the features of the functions of the ITS network & transport layer will be described.

[Transport layer]: The transport layer is a connection layer that transfers a service message and related information provided from upper layers (session layer, presentation layer, application layer, etc.) and lower layers (network layer, data link layer, physical layer, etc.). The transport layer controls data transmitted by the application of a transmitting ITS station to arrive at the application of a destination ITS station. For example, transport protocols considered in the European ITS include not only a TCP, a UDP, etc. which are currently used as Internet protocols as shown in FIG. 11 but also transport protocols only for the ITS such as a BTS.

[Network layer]: The network layer determines the logical address and packet transfer method/path of a destination and adds information such as the logical address and transfer path/method to a packet provided from the transport layer to the header of the network layer. As an example of the packet transfer method, unicast, broadcast, multicast, etc. may be considered between ITS stations. Various networking protocols may be considered for the ITS such as GeoNetworking, IPv6 networking with mobility support, and IPv6 over GeoNetworking. In addition to simple packet transmission, the GeoNetworking protocol may be applied to various transfer routes or ranges such as forwarding based on location information about stations including vehicles or forwarding based on the number of forwarding hops.

In FIG. 11, the layer management serves to manage and service information related to operation and security of the network & transport layer, and related information is transferred and shared in two ways through MN (i.e., interface between management entity and networking & transport layer) (or MN-SAP) and SN (i.e., interface between security entity and networking & transport layer) (or SN-SAP). A service message and related information between the facilities layer and networking & transport layer may be transferred bidirectionally through NF (or NF-SAP). A service message and related information between the networking & transport layer and access layer may be exchanged through IN (interface between access layer and networking & transport layer) (or IN-SAP).

The North American ITS network & transport layer supports IPv6 and TCP/UDP to support IP data as in Europe. A wireless access for vehicular environments (WAVE) short message protocol (WSMP) is defined as a protocol only for the ITS.

FIG. 12 illustrates the structure of a WAVE short message (WSM) packet generated according to the WSMP. The WSM packet is composed of a WSMP header and WSM data for transmitting a message, and the WSMP header consists of a version, a PSID, a WSMP header extension field, a WSM WAVE element ID, and a length.

The version is defined by a 4-bit WsmpVersion field indicating the actual WSMP version and a 4-bit reserved field.

The PSID is a provider service identifier, which is allocated by upper layers depending on applications, and assists the receiver in determining an appropriate upper layer.

The Extension fields are fields for extending the WSMP header, and information such as a channel number, a data rate, and used transmit power is inserted thereinto.

The WSMP WAVE element ID specifies the type of WSM to be transmitted.

The Length specifies the length of WSM data to be transmitted through a 12-bit WSMLength field in octets, and the remaining 4 bits are reserved.

A logical link control (LLC) header allows to transmit IP data and WSMP data separately, which are identified by the Ethertype of SNAP. The structures of LLC and SNAP headers are defined in IEEE 802.2. When IP data is transmitted, the Ethertype is set to 0x86DD to configure the LLC header. When WSMP data is transmitted, the Ethertype is set to 0x88DC to configure the LLC header. When the receiver checks that the Ethertype is 0x86DD, the receiver uploads a packet on an IP data path. If the Ethertype is 0x88DC, the receiver uploads a packet on a WSMP path.

Access Layer

The access layer transfers messages or data received from upper layers over physical channels. As access layer technologies, the following technologies may be applied: an ITS-G5 vehicle communication technology based on IEEE 802.11p, a satellite/broadband wireless mobile communication technology, a wireless cellular communication technology including 2G/3G/4G (LTE)/5G, a cellular-V2X communication technology such as LTE-V2X and NR-V2X, a broadband terrestrial digital broadcasting technology such as DVB-T/T2/ATSC3.0, a GPS technology, and so on.

FIG. 13 illustrates the configuration of an ITS access layer commonly applied to IEEE 802.11p, cellular-V2X (LTE-V2X, NR-V2X, etc.), etc. The functions of the ITS access layer are similar or equal to those of OSI 1 layer (physical layer) and OSI 2 layer (data link layer) and have the following characteristics.

Data Link Layer

The data link layer converts a physical line between adjacent nodes (or between vehicles) with noise into a communication channel with no transmission errors to allow upper network layers to use the communication channel. The data link layer performs the following functions: a function that transmits/carries/forwards a 3 layer protocol; a framing function that groups data to be transmitted by dividing the data into packets (or frames) as a transmission unit; a flow control function that compensates for the speed difference between the transmitter and receiver; and a function that detects and corrects a transmission error or detects a transmission error based on a timer and an ACK signal at the transmitter according to an automatic repeat request (ARQ) method and retransmits packets which are not correctly received (because it is expected that errors and noise randomly occur due to the characteristics of a physical transmission medium). In addition, the data link layer also performs the following functions: a function that assigns a sequence number (serial number) to a packet and an ACK signal to avoid confusing the packet and the ACK signal; and a function that controls the establishment, maintenance, and release of a data link between network entities and data transmission therebetween. The data link layer of FIG. 13 may be composed of the following sub-layers: logical link control (LLC), radio resource control (RRC), packet data convergence protocol (PDCP), radio link control (RLC), medium access control (MAC), multi-channel (MCO). Hereinafter, the main functions of the above sub-layers will be described.

LLC sub-layer: The LLC sub-layer allows to use several different lower MAC sub-layer protocols, thereby enabling communication regardless of the topology of the network.

RRC sub-layer: The RRC sub-layer performs the following functions: broadcasting of cell system information necessary for all user equipments (UEs) in a cell; control of paging message transmission; management (setup/maintenance/release) of an RRC connection between a UE and a E-UTRAN; mobility management (handover); UE context transfer between eNodeBs during a handover; UE measurement reporting and control thereof; UE capability management; temporary assignment of a cell ID to a UE; security management including key management; and RRC message encryption.

PDCP sub-layer: The PDCP sub-layer performs the following functions: compression of an IP packet header according to a compression method such as robust header compression (ROHC); encryption of control messages and user data (ciphering); data integrity; and data loss prevention during a handover.

RLC sub-layer: The RLC sub-layer performs the following functions: data transmission by adjusting the size of a packet from the upper PDCP layer to be allowed for the MAC layer through packet segmentation/concatenation; improvement of data transmission reliability by managing transmission errors and retransmission; checking of the order of received data; rearrangement; and redundancy check.

MAC sub-layer: The MAC sub-layer performs the following functions: a function that controls the occurrence of collision/contention between nodes and matches a packet transmitted from an upper layer to a physical layer frame format in order to allow to multiple nodes to share a medium; assignment and identification of transmitter/receiver addresses; carrier detection; collision detection; and detection of obstacles on a physical medium.

MCO sub-layer: The MCO sub-layer uses a plurality of frequency channels to effectively provide various services. The main function of the MCO sub-layer is to effectively distribute traffic load in a specific frequency channel to other channels, thereby minimizing collision/contention of communication information between vehicles on each frequency channel.

Physical Layer

The physical layer is the lowest layer in the ITS layer structure. The physical layer performs the following functions: definition of an interface between a node and a transmission medium; modulation, coding, and mapping of a transport channel to a physical channel for bit transfer between data link layer entities; notifying the MAC sublayer whether a wireless medium is in use (busy or idle) through carrier sensing, clear channel assessment (CCA), etc.

Main Features of IEEE 802.11p MAC Sub-Layer/PHY Layer

FIG. 14 illustrates the structure of main features of a MAC sub-layer and a PHY layer of IEEE 802.11p. The structure of FIG. 14 includes channel coordination in which channel access is defined; channel routing that defines an operation process for a management frame and overall data between PHY-MAC layer; enhanced dedicated channel access (EDCA) that determines and defines priorities of transmission frames; and data buffers (or queues) that store a frame received from an upper layer. Hereinafter, each part will be described.

Channel coordination: The channel coordination is divided into a control channel (CCH) and a service channel (SCH) so that channel access may be defined.

Data buffers (queues): The data buffers store frames input from upper layers based on defined access categories (ACs). As shown in FIG. 14, each AC has its own data buffer.

Channel routing: The channel routing transfers data input from an upper layer to the data buffer (queue). In addition, the channel routing calls transmission operation parameters such as channel coordination, channel number for frame transmission, transmit power, and data rate in response to a transmission request from the upper layer.

EDCA: FIG. 15 illustrates an EDCA operation structure. The EDCA is a contention based medium access approach in which traffic is categorized into fours 4 ACs according to the types of traffic, a different priority is given to each category, and a different parameter is allocated for each AC so that more transmission opportunities are given to high-priority traffic in order to guarantee QoS in the conventional IEEE 802.11e MAC layer. To transmit data including a priority, the EDCA assigns 8 priorities from 0 to 7, maps data arriving at the MAC layer to four ACs according to priorities. Every AC has its own transmission queue and AC parameter, and the difference between the priorities of ACs is determined based on different AC parameter values. If there occurs a collision between stations during frame transmission, a new backoff counter is created. As shown in FIG. 15, four transmission queues per AC defined in IEEE 802.11e MAC compete with each other to access a wireless medium within one station. Since each AC has an independent backoff counter, a virtual collision may occur. If two or more ACs complete backoff at the same time, data is first transmitted to the AC with the highest priority, and the other ACs update their backoff counters again by increasing CW values. Such a contention resolution procedure is called a virtual contention handling procedure. The EDCA also allows access to a channel for data transmission through a transmission opportunity (TXOP). If one frame is too long so that the frame is incapable of being transmitted during one TXOP, it may be divided into small frames and then transmitted.

FIG. 16 illustrates a transmitter structure of a physical layer. Specifically, FIG. 16 shows a signal processing block diagram of a physical layer on the assumption of IEEE 802.11p orthogonal frequency division multiplexing (OFDM). The physical layer may include a PLCP sub-layer baseband signal processing part composed of scrambling, forward error correction (FEC), an interleaver, a mapper, pilot insertion, an inverse fast Fourier transform (IFFT), guard insertion, preamble insertion, etc. and a PMD sub-layer RF band signal processing part composed of wave shaping (including In-phase/quadrature-phase modulation), a digital analog converter (DAC), etc. Each block will be described below.

The scrambler block perform randomization by XOR of an input bit stream with a pseudo random binary sequence (PRBS). The block may be omitted or replaced by another block having a similar or identical function.

In a forward error coding (FEC) process, redundancy is added to the scrambler output bit stream so that the receiver is allowed to correct errors on a transport channel. The block may be omitted or replaced by another block having a similar or identical function.

The (bit) interleaver block interleaves an input bit stream according to interleaving rules to be robust against burst errors, which may occur on a transport channel. When deep fading or erasure is applied to QAM symbols, interleaved bits are mapped to each QAM symbol. Thus, it is possible to prevent an error from occurring in consecutive bits among all codeword bits. The block may be omitted or replaced by another block having a similar or identical function.

The constellation mapper block allocates an input bit word to one constellation. The block may be omitted or replaced by another block having a similar or identical function.

The pilot insertion block inserts reference signals at predetermined positions for each signal block. The pilot insertion block is used to allow the receiver to estimate channels and channel distortions such as a frequency offset and a timing offset. The block may be omitted or replaced by another block having a similar or identical function.

The inverse waveform transform block transforms and outputs an input signal in such a way that transmission efficiency and flexibility are improved in consideration of the characteristics of a transport channel and the system structure. In an embodiment, a method of converting a frequency-domain signal into a time-domain signal based on inverse FFT operation may be used in OFDM systems. The inverse waveform transform block may not be used in single carrier systems. The block may be omitted or replaced by another block having a similar or identical function.

The guard sequence insertion block provides a guard interval between adjacent signal blocks to minimize the effect of delay spread of a transport channel and, if necessary, inserts a specific sequence to facilitate synchronization or channel estimation of the receiver. In an embodiment, a method of inserting a cyclic prefix into the guard interval of an OFDM symbol may be used in OFDM systems. The block may be omitted or replaced by another block having a similar or identical function.

The preamble insertion block inserts a known type of signal determined between the transmitter and receiver into a transmission signal so that the receiver is capable of detecting a target system signal quickly and efficiently. In an embodiment, a method of defining a transmission frame composed of several OFDM symbols and inserting a preamble symbol at the beginning of each transmission frame may be used in OFDM systems. The block may be omitted or replaced by another block having a similar or identical function.

The waveform processing block performs waveform processing on an input baseband signal to match the transmission characteristics of a channel. In an embodiment, a method of performing square-root-raised cosine (SRRC) filtering to obtain out-of-band emission standards of a transmission signal may be used. The waveform processing block may not be used in multi-carrier systems. The block may be omitted or replaced by another block having a similar or identical function.

Finally, the DAC block converts an input digital signal into an analog signal and then outputs the analog signal. The DAC output signal is transmitted to an output antenna (in this embodiment). The block may be omitted or replaced by another block having a similar or identical function.

Main Features of LTE-V2X PHY/MAC Layer

Hereinafter, details of device-to-device (D2D) communication, which is the major feature of cellular-V2X (LTE-V2X or NR-V2X) communication, will be described.

FIG. 17 illustrates a data flow between MAC and PHY layers in cellular-V2X.

In FIG. 17, "H" denotes a header and a sub-header. A radio bearer is a path between a UE and a BS used when user data or signaling passes through a network. In other words, the radio bearer is a pipe that carries user data or signaling between the UE and BS. Radio bearers are classified into data radio bearers (DRBs) for user plane data and signaling radio bearers (SRBs) for control plane data. For example, SRBs are used to transmit only RRC and NAS messages, and DRBs are used to carry user data.

When the UE is the transmitter, packets including user data generated by the application(s) of the UE are provided to layer 2 (i.e., L2) of the NR. The UE may be an MTC device, an M2M device, a D2D device, an IoT device, a vehicle, a robot, or an AI module. In implementations of the present disclosure, a packet including data generated by the application of the UE may be an Internet protocol (IP) packet, an address resolution protocol (ARP) packet(s), or a non-IP packet.

Layer 2 of the NR may be divided into the following sublayers: MAC; RLC; PDCP and service data adaptation protocol (SDAP). The SDAP, which is a protocol layer not existing in the LTE system, provides QoS flows to NGC. For example, the SDAP supports mapping between QoS flows and data radio bearers. In the LTE system, an IP PDU including an IP packet may be a PDCP SDU in the PDCP layer. In implementations of the present disclosure, the PDCP may support efficient transport of IP, ARP, and/or non-IP packets to/from a wireless link. The RLC generates an RLC PDU and provides the RLC PDU to the MAC. The MAC layer is located between the RLC layer and the physical layer (PHY layer), which is layer 1 (i.e., L1). The MAC layer is connected to the RLC layer through logical channels and connected to the PHY layer through transport channels. The MAC generates a MAC PDU and provides the MAC PDU to the PHY, and the MAC PDU corresponds to a transport block in the PHY layer. The transport block is transmitted over a physical channel during the signal processing process.

In the receiver, a transport block obtained by performing signal processing on data received over a physical channel is transferred from the PHY layer to layer 2. The receiver may be the UE or BS. The transport block is a MAC PDU in the MAC layer of layer 2. The MAC PDU is provided to the application layer through layer 2 based on an IP, ARP or non-IP protocol.

The radio protocol stack of the 3GPP system is largely divided into a protocol stack for a user plane and a protocol stack for a control plane. The user plane, also called the data plane, is used to carry user traffic (i.e., user data). The user plane handles user data such as voice and data. In contrast, the control plane handles control signaling rather than user data between UEs or between a UE and a network node. In the LTE system, the protocol stack for the user plane includes PDCP, RLC, MAC and PHY, and in the NR system, the protocol stack for the user plane includes SDAP, PDCP, RLC, MAC and PHY. In the LTE and NR systems, the protocol stack for the control plane includes PDCP, RLC and MAC terminated at the BS in the network. In addition, the protocol stack for the control plane includes RRC, which is a higher layer of the PDCP, and a non-access stratum (NAS) control protocol, which is a higher layer of the RRC. The NAS protocol is terminated by an access and mobility management function (AMF) of the core network in the network and performs mobility management and bearer management. The RRC supports transfer of NAS signaling and performs efficient management of radio resources and functions required therefor. For example, the RRC supports the following functions: broadcasting of system information; establishment, maintenance, and release of an RRC connection between the UE and BS; establishment, establishment, maintenance, and release of radio bearers; UE measurement reporting and control of reporting; detection and recovery of radio link failure; NAS message transfer to/from the NAS of the UE.

In the present disclosure, RRC messages/signaling by or from the BS may mean RRC messages/signaling transmitted from the RRC layer of the BS to the RRC layer of the UE. The UE is configured with or operates based on an information element (IE) that is parameter(s) or a set of parameter(s) included in the RRC messages/signaling from the BS.

FIG. 18 illustrates an example of processing for uplink transmission.

Each block illustrated in FIG. 18 may be implemented in each module in a physical layer block of a transmitter. Specifically, the uplink signal processing of FIG. 18 may be performed by the processor of the UE/BS described in the present disclosure. Referring to FIG. 18, uplink physical channel processing includes scrambling, modulation mapping, layer mapping, transform precoding, precoding, and resource element mapping, and SC-FDMA signal generation. Each of the above processes may be performed separately or together in each module of the transmitter. The transform precoding spreads UL data in a special way that reduces the peak-to-average power ratio (PAPR) of a waveform and is a kind of discrete Fourier transform (DFT). OFDM using a CP with transform precoding that performs DFT spreading is called DFT-s-OFDM, and OFDM using a CP without DFT spreading is called CP-OFDM. When uplink (UL) is enabled in the NR system, transform precoding may be optionally applied. That is, the NR system supports two options for UL waveforms, one of which is CP-OFDM and the other is DFT-s-OFDM. The BS informs the UE whether the UE needs to use CP-OFDM or DFT-s-OFDM as a UL transmission waveform by RRC parameters. FIG. 18 is a conceptual diagram illustrating UL physical channel processing for DFT-s-OFDM, and in the case of CP-OFDM, the transform precoding among the processes of FIG. 18 is omitted.

Each of the above processes will be described in detail. For one codeword, the transmitter may scramble coded bits in the codeword by a scrambling module and then transmit the scrambled coded bits on a physical channel. The codeword is obtained by encoding a transport block. The scrambled bits are modulated into a complex-valued modulation symbol by a modulation mapping module. The modulation mapping module may modulate the scrambled bits according to a predetermined modulation scheme and arrange the scrambled bits as the complex-valued modulation symbol representing positions on a signal constellation. Pi/2-binary phase shift keying (pi/2-BPSK), m-phase shift keying (m-PSK), or m-quadrature amplitude modulation (m-QAM) may be used to modulate the encoded data. The complex-valued modulation symbol may be mapped to one or more transport layers by a layer mapping module. The complex-valued modulation symbol on each layer may be precoded by a precoding module for transmission on an antenna port. When transform precoding is enabled, the precoding module may perform precoding after performing transform precoding on the complex-valued modulation symbol as illustrated in FIG. 18. The precoding module may process complex-valued modulation symbols in MIMO according to multiple transmission antennas to output antenna-specific symbols and distribute the antenna-specific symbols to a resource element mapping module. An output z of the precoding module may be obtained by multiplying an output y of the layer mapping module by a precoding matrix W of N×M. where N is the number of antenna ports, and M is the number of layers. The resource element mapping module maps the complex-valued modulation symbols for each antenna port to appropriate resource elements in a resource block allocated for transmission. The resource element mapping module may map the complex-valued modulation symbols to appropriate subcarriers and perform multiplexing according to users. An SC-FDMA signal generation module (or a CP-OFDM signal generation module when transform precoding is disabled) modulates the complex-valued modulation symbols according to a specific modulation scheme, for example, an OFDM scheme in order to generate a complex-valued time domain OFDM symbol signal. The signal generation module may perform the IFFT on the antenna-specific symbols, and a CP may be inserted into the time-domain symbols on which the IFFT is performed. After applying digital-to-analog conversion and frequency upconversion to the OFDM symbols, the OFDM symbols are transmitted to the receiver on each transmission antenna. The signal generation module may include an IFFT module, a CP inserter, a digital-to-analog converter (DAC), a frequency upconverter, and so on.

4. C-V2X

A wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, and a multi-carrier frequency division multiple access (MC-FDMA) system.

Sidelink (SL) refers to a communication scheme in which UEs establish a direct link therebetween and then directly exchange voice or data without intervention of a BS. The SL is considered as one method for solving the burden of the BS caused by a rapid increase in data traffic.

V2X is a communication technology in which a vehicle exchanges information with other vehicles, pedestrians, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As many communication devices demand greater communication capacity, there is a need for mobile broadband communication enhanced over the current radio access technology (RAT). Accordingly, a communication system is being discussed in consideration of services or UEs sensitive to reliability and latency. A next-generation radio access technology in consideration of enhanced mobile broadband communication, massive MTC, and ultra-reliable and low-latency communication (URLLC) may be referred to as a new RAT or new radio (NR). The V2X communication may also be supported in the NR.

The following technologies may be applied to various wireless communication systems including the CDMA system, FDMA system, TDMA system, OFDMA system, SC-FDMA system, etc. CDMA may be implemented with a radio technology such as universal terrestrial radio access (UTRA) or CDMA2000. TDMA may be implemented with a radio technology such as global system for mobile communications (GSM), general packet radio service (GPRS), enhanced data rates for GSM evolution (EDGE), and so on. OFDMA may be implemented with a wireless technology such as Institute of Electrical and Electronics Engineers (IEEE) 802.11 (Wi-Fi), IEEE 802.16 (WiMAX), IEEE 802-20, and evolved UTRA (E-UTRA). IEEE 802.16m is an evolution of IEEE 802.16e and provides backward compatibility with systems based on IEEE 802.16e. UTRA is a part of the universal mobile telecommunications system (UMTS). 3rd generation partnership project (3GPP) LTE is a part of evolved UMTS (E-UMTS) that uses evolved-UMTS terrestrial radio access (E-UTRA). In 3GPP LTE, OFDMA is adopted for DL, and SC-FDMA is adopted for UL. LTE-A (advanced) is an evolution of 3GPP LTE.

5G NR is a technology beyond LTE-A. Specifically, 5G NR is a new clean slate type of mobile communication system with the following characteristics: high performance, low latency, and high availability. 5G NR may utilize all available spectrum resources including low frequency bands below 1 GHz, intermediate frequency bands from 1 GHz to 10 GHz, and high frequency (millimeter wave) bands above 24 GHz.

For clarity of description, the present disclosure will be mainly described based on LTE-A or 5G NR, but the technical idea of examples or implementation examples of the present disclosure is not limited thereto.

FIG. 19 illustrates the structure of an LTE system to which embodiment(s) are applicable. This system may be referred to as an evolved-UMTS terrestrial radio access network (E-UTRAN) or long-term evolution (LTE)/LTE-advanced (LTE-A) system.

Referring to FIG. 19, the E-UTRAN includes a base station 20 that provides a control plane and a user plan to a user equipment (UE) 10. The UE 10 may be fixed or mobile. The UE 10 may be referred to by another term, such as a mobile station (MS), a user terminal (UT), a subscriber station (SS), a mobile terminal (MT), a wireless device, etc. The BS 20 refers to a fixed station that communicates with the UE 10. The BS 20 may be referred to by another term, such as an evolved-NodeB (eNB), a base transceiver system (BTS), an access point, etc.

BSs 20 may be connected to each other through an X2 interface. The BS 20 is connected to an evolved packet core (EPC) 30 through an S1 interface, more specifically, to a mobility management entity (MME) through S1-MME and to a serving gateway (S-GW) through S1-U.

The EPC 30 includes the MME, the S-GW, and a packet data network (PDN) gateway (P-GW). The MME has access information of the UE or capability information of the UE, and such information is generally used for mobility management of the UE. The S-GW is a gateway having the E-UTRAN as an end point. The P-GW is a gateway having the PDN as an end point.

Layers of a radio interface protocol between the UE and the network may be classified into a first layer (L1), a second layer (L2), and a third layer (L3) based on the lower three layers of the open system interconnection (OSI) reference model that is well-known in a communication system. Thereamong, a physical layer belonging to the first layer provides an information transfer service using a physical channel, and a radio resource control (RRC) layer belonging to the third layer serves to control a radio resource between the UE and the network. For this, the RRC layer exchanges an RRC message between the UE and the BS.

FIG. 20 illustrates a radio protocol architecture for a user plane to which embodiment(s) are applicable.

FIG. 21 illustrates a radio protocol architecture for a control plane to which embodiment(s) are applicable. The user plane is a protocol stack for user data transmission. The control plane is a protocol stack for control signal transmission.

Referring to FIGS. 20 and 21, a physical layer provides an upper layer with an information transfer service through a physical channel. The physical layer is connected to a media access control (MAC) layer, which is an upper layer of the physical layer, through a transport channel. Data is transferred between the MAC layer and the physical layer through the transport channel. The transport channel is classified according to how and with which characteristics data is transferred through a radio interface.

Data is moved between different physical layers, i.e., between the physical layers of a transmitter and a receiver, through a physical channel. The physical channel may be modulated according to an orthogonal frequency division multiplexing (OFDM) scheme and use time and frequency as radio resources.

The MAC layer provides a service to a radio link control (RLC) layer, which is an upper layer, through a logical channel. The MAC layer provides a mapping function from a plurality of logical channels to a plurality of transport channels. The MAC layer also provides a logical channel multiplexing function caused by mapping from a plurality of logical channels to a single transport channel. A MAC sub-layer provides data transfer services on logical channels.

The RLC layer performs concatenation, segmentation, and reassembly of an RLC service data unit (SDU). In order to guarantee various types of quality of service (QoS) required by a radio bearer (RB), the RLC layer provides three operation modes: transparent mode (TM), unacknowledged mode (UM), and acknowledged mode (AM). AM RLC provides error correction through an automatic repeat request (ARQ).

The RRC layer is defined only in the control plane. The RRC layer is related to the configuration, reconfiguration, and release of RBs to serve to control logical channels, transport channels, and physical channels. The RB means a logical path provided by the first layer (physical layer) and the second layer (MAC layer, RLC layer, or PDCP layer) in order to transfer data between a UE and a network.

A function of a packet data convergence protocol (PDCP) layer in the user plane includes transfer, header compression, and ciphering of user data. A function of the PDCP layer in the control plane includes transfer and encryption/integrity protection of control plane data.

The configuration of the RB means a process of defining the characteristics of a radio protocol layer and channels in order to provide specific service and configuring each detailed parameter and operating method. The RB may be divided into two types of a signaling RB (SRB) and a data RB (DRB). The SRB is used as a passage through which an RRC message is transported in the control plane, and the DRB is used as a passage through which user data is transported in the user plane.

If RRC connection is established between the RRC layer of UE and the RRC layer of the E-UTRAN, the UE is in an RRC connected (RRC_CONNECTED) state and if not, the UE is in an RRC idle (RRC_IDLE) state. In NR, an RRC inactive (RRC_INACTIVE) state has been further defined. The UE of RRC_INACTIVE state may release connection to the BS while maintaining connection to a core network.

A downlink transport channel through which data is transmitted from the network to the UE includes a broadcast channel (BCH) through which system information is transmitted and a downlink shared channel (SCH) through which user traffic or control messages are transmitted. Traffic or a control message for a downlink multicast or broadcast service may be transmitted through the downlink SCH or may be transmitted through a separate downlink multicast channel (MCH). Meanwhile, an uplink transport channel through which data is transmitted from the UE to the network includes a random access channel (RACH) through which an initial control message is transmitted and an uplink shared channel (SCH) through which user traffic or a control message is transmitted.

Logical channels that are placed over the transport channel and mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. A resource block is a resources allocation unit and includes a plurality of OFDM symbols and a plurality of subcarriers. Each subframe may use specific subcarriers of specific OFDM symbols (e.g., the first OFDM symbol) of a corresponding subframe for a physical downlink control channel (PDCCH), that is, an L1/L2 control channel. A transmission time interval (TTI) is a unit time for subframe transmission.

FIG. 22 illustrates the structure of an NR system to which embodiment(s) are applicable.

Referring to FIG. 22, a next generation radio access network (NG-RAN) may include a gNB and/or an eNB that provides user plane and control plane protocol terminations to a UE. FIG. 10 illustrates the case of including only gNBs. The gNB and the eNB are connected through an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

FIG. 23 illustrates functional split between an NG-RAN and a 5GC to which embodiment(s) are applicable.

Referring to FIG. 23, a gNB may provide functions, such as intercell radio resource management (RRM), RB control, connection mobility control, radio admission control, measurement configuration and provision, dynamic resource allocation, etc. An AMF may provide functions, such as NAS security, idle state mobility handling, etc. A UPF may provide functions, such as mobility anchoring, protocol data unit (PDU) handling, etc. A session management function (SMF) may provide functions, such as UE IP address allocation, PDU session control.

FIG. 24 illustrates the structure of an NR radio frame to which embodiment(s) are applicable.

Referring to FIG. 24, a radio frame may be used for uplink and downlink transmission in NR. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP).

When a normal CP is used, each slot may include 14 symbols. When an extended CP is used, each slot may include 12 symbols. Here, a symbol may include an OFDM symbol (or CP-OFDM symbol) or an SC-FDMA symbol (or DFT-s-OFDM symbol).

Table 1 below shows the number of symbols, $N^{slot}_{symb}$, per slot, the number of slots, $N^{frame,u}_{slot}$, per frame, and the number of slots, $N^{subframe,u}_{slot}$, per subframe according to SCS configuration μ when the normal CP is used.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols per slot, the number of slots per frame, and the number of slots per subframe according to SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, different OFDM(A) numerologies (e.g., SCSs and CP lengths) may be configured in a plurality of cells aggregated for one UE. Then, an (absolute time) duration of a time resource (e.g., a subframe, a slot, or a TTI) consisting of the same number of symbols (for convenience, referred to as a time unit (TU)) may be differently configured in the aggregated cells.

FIG. 25 illustrates the structure of a slot of an NR frame to which embodiment(s) are applicable.

Referring to FIG. 25, a slot includes a plurality of symbols in the time domain. For example, one slot may include 14 symbols in the case of a normal CP and 12 symbols in the case of an extended CP. Alternatively, one slot may include 7 symbols in the case of the normal CP and 6 symbols in the case of the extended CP.

A carrier includes a plurality of subcarriers in the frequency domain. A resource block (RB) may be defined as a plurality of consecutive subcarriers (e.g., 12 subcarriers) in the frequency domain. A bandwidth part (BWP) may be defined as a plurality of consecutive (P)RB s in the frequency domain and correspond to one numerology (e.g., SCS or CP length). The carrier may include a maximum of N (e.g., 5) BWPs. Data communication may be performed through activated BWPs. Each element may be referred to as a resource element (RS) in a resource grid and one complex symbol may be mapped thereto.

As illustrated in FIG. 26, a scheme of reserving a transmission resource of a subsequent packet may be used for transmission resource selection.

FIG. 26 illustrates an example of selecting a transmission resource to which embodiments(s) are applicable.

In V2X communication, two transmissions may be performed per MAC PDU.

For example, referring to FIG. 26, during resource selection for initial transmission, a resource for retransmission may be reserved with a predetermined time gap. A UE may discern transmission resources reserved by other UEs or resources that are being used by other UEs through sensing within a sensing window and randomly select a resource having less interference from among resources that remain after excluding the resources that are reserved or being used by other UEs within a selection window.

For example, the UE may decode a physical sidelink control channel (PSCCH) including information about periodicity of the reserved resources within the sensing window and measure physical sidelink shared channel (PSSCH) reference signal received power (RSRP) on periodically determined resources based on the PSCCH. The UE may exclude resources on which PSSCH RSRP exceeds a threshold from resources that are selectable in the selection window. Next, the UE may randomly select a sidelink resource from among resources that remain within the selection window.

Alternatively, the UE may measure a received signal strength indicator (RSSI) of periodic resources within the sensing window to determine resources having less interference (e.g., resources having low interference corresponding to 20% or less). Then, the UE may randomly select a sidelink resource from resources included in the selection window among the periodic resources. For example, upon failing to decode the PSCCH, the UE may use this method.

FIG. 27 illustrates an example of transmitting a PSCCH in sidelink transmission mode 3 or 4 to which embodiment(s) are applicable.

In V2X communication, i.e., in sidelink transmission mode 3 or 4, a PSCCH and a PSSCH are transmitted through frequency division multiplexing (FDM) as opposed to sidelink communication. In V2X communication, since it is important to reduce latency in consideration of characteristics of vehicle communication, the PSCCH and the PSSCH may be transmitted through FDM on different frequency resources of the same time resource in order to reduce latency. Referring to FIG. 27, the PSCCH and the PSSCH may be non-adjacent as illustrated in (a) of FIG. 15 or may be adjacent as illustrated in (b) of FIG. 27. A basic unit of such transmission is a subchannel. The subchannel may be a resource unit having one or more RBs in size on the frequency axis on a predetermined time resource (e.g., time resource unit). The number of RBs included in the subchannel (i.e., the size of the subchannel and a start position of the subchannel on the frequency axis) may be indicated through higher layer signaling. An embodiment of FIG. 27 may also be applied to NR sidelink resource allocation mode 1 or 2.

Hereinafter, a cooperative awareness message (CAM) and a decentralized environmental notification message (DENM) will be described.

In V2V communication, a CAM of a periodic message type and a DENM of an event triggered message type may be transmitted. The CAM may include basic vehicle information, including vehicle dynamic state information such as direction and speed, vehicle static data such as dimension, an external light state, and a path history. The size of the CAM may be 50 to 300 bytes. The CAM may be broadcast and latency should be less than 100 ms. The DENM may be a message generated during an unexpected situation such as breakdown or accident of a vehicle. The size of the DENM may be shorter than 3000 bytes and all vehicles in the range of message transmission may receive the DENM. The DENM may have a higher priority than the CAM.

Hereinafter, carrier reselection will be described.

Carrier reselection for V2X/sidelink communication may be performed in a MAC layer based on a channel busy ratio (CBR) of configured carriers and a ProSe-per-packet priority (PPPP) of a V2X message to be transmitted.

The CBR may mean the portion of subchannels in a resource pool, sidelink RSSI (S-RSSI) of which measured by a UE is sensed as exceeding a preset threshold. There may be PPPP related to each logical channel. The value of PPPP should be set in consideration of latency required by both a UE and a BS. During carrier reselection, the UE may select one or more carriers from among candidate carriers in ascending order from the lowest CBR.

Hereinafter, physical layer processing will be described.

A data unit to which embodiment(s) are applicable may be a target of physical layer processing in a transmitting side before the data unit is transmitted through a radio interface. A radio signal carrying the data unit to which embodiment(s) are applicable may be a target of physical layer processing at a receiving side.

FIG. 28 illustrates an example of physical processing at a transmitting side to which embodiment(s) are applicable.

Table 3 shows a mapping relationship between an uplink transport channel and a physical channel and Table 4 shows a mapping relationship between uplink control channel information and a physical channel.

TABLE 3

| Transport Channel | Physical Channel |
| --- | --- |
| UL-SCH | PUSCH |
| RACH | PRACH |

TABLE 4

| Control Information | Physical Channel |
| --- | --- |
| UCI | PUCCH, PUSCH |

Table 5 shows a mapping relationship between a downlink transport channel and a physical channel and Table 6 shows a mapping relationship between downlink control channel information and a physical channel.

TABLE 5

| Transport Channel | Physical Channel |
| --- | --- |
| DL-SCH | PDSCH |
| BCH | PBCH |
| PCH | PDSCH |

TABLE 6

| Control Information | Physical Channel |
| --- | --- |
| DCI | PDCCH |

Table 7 shows a mapping relationship between a sidelink transport channel and a physical channel and Table 8 shows a mapping relationship between sidelink control channel information and a physical channel.

TABLE 7

| Transport Channel | Physical Channel |
| --- | --- |
| SL-SCH | PSSCH |
| SL-BCH | PSBCH |

TABLE 8

| Control Information | Physical Channel |
| --- | --- |
| SCI | PSCCH |

Referring to FIG. 28, the transmitting side may perform encoding on a transport block (TB) in step S100. Data and a control stream from a MAC layer may be encoded to provide transport and control services through a radio transmission link in a physical layer. For example, the TB from the MAC layer may be encoded to a codeword at the transmitting side. A channel coding scheme may be a combination of error detection, error correction, rate matching, interleaving, and control information or a transport channel separated from the physical channel. Alternatively, the channel coding scheme may be a combination of error detection, error correction, rate matching, interleaving, and control information or a transport channel mapped to the physical channel. In an NR LTE system, the following channel coding scheme may be used for different types of transport channels and different types of control information. For example, the channel coding scheme for each transport channel type may be listed in Table 9. For example, the channel coding scheme for each control information type may be listed in Table 10.

TABLE 9

| Transport Channel | Channel Coding Scheme |
| --- | --- |
| UL-SCH | LDPC (Low Density Parity Check) |
| DL-SCH | |
| SL-SCH | |
| PCH | |
| BCH | Polar code |
| SL-BCH | |

TABLE 10

| Control Information | Channel Coding Scheme |
| --- | --- |
| DCI | Polar code |
| SCI | |
| UCI | Block code, Polar code |

For transmission of the TB (e.g., MAC PDU), the transmitting side may attach a cyclic redundancy check (CRC) sequence to the TB. Therefore, the transmitting side may provide error detection to the receiving side. In sidelink communication, the transmitting side may be a transmitting UE and the receiving side may be a receiving UE. In the NR system, a communication device may use an LDPC code to encode/decode an uplink (UL)-SCH and a downlink (DL)-SCH. The NR system may support two LDPC base graphs (i.e., two LDPC base matrices). The two LDPC base graphs may be LDPC base graph 1 optimized for a small TB and LDPC base graph 2 optimized for a large TB. The transmitting side may select LDPC base graph 1 or 2 based on the size of the TB and a code rate R. The code rate may be indicated by a modulation and coding scheme (MCS) index I_MCS. The MCS index may be dynamically provided to the UE by a PDCCH that schedules a PUSCH or a PDSCH. Alternatively, the MCS index may be dynamically provided to the UE by a PDCCH that (re)initializes or activates UL configured grant 2 or DL semi-persistent scheduling (SPS). The MCS index may be provided to the UE by RRC signaling related to UL configured grant type 1. If the TB to which the CRC is attached is greater than a maximum code block size for the selected LDPC base graph, the transmitting side may segment the TB to which the CRC is attached into a plurality of code blocks. The transmitting side may attach an additional CRC sequence to each code block. A maximum code block size for LDPC base graph 1 and a maximum code block size for LDPC base graph 2 may be 8448 bits and 3480 bits, respectively. If the TB to which the CRC is attached is not greater than the maximum code block size for the selected LDPC base graph, the transmitting side may encode the TB to which the CRC is attached using the selected LDPC base graph. The transmitting side may encode each code block of the TB using the selected LDPC base graph. LDPC coded blocks may be individually rate-matched. Code block concatenation may be performed to generate a codeword for transmission on the PDSCH or the PUSCH. For the PDSCH, a maximum of two codewords (i.e., a maximum of two TBs) may be simultaneously transmitted on the PDSCH. The PUSCH may be used to transmit UL-SCH data and layer 1 and/or 2 control information. Although not illustrated in FIG. 28, the layer 1 and/or 2 control information may be multiplexed with a codeword for the UL-SCH data. In steps S101 and S102, the transmitting side may perform scrambling and modulation for the codeword. Bits of the codeword may be scrambled and modulated to generate a block of complex-valued modulation symbols.

In step S103, the transmitting side may perform layer mapping. The complex-valued modulation symbols of the codeword may be mapped to one or more multiple input multiple output (MIMO) layers. The codeword may be mapped to a maximum of 4 layers. The PDSCH may carry two codewords and thus the PDSCH may support up to 8-layer transmission. The PUSCH may support a single codeword and thus the PUSCH may support up to 4-layer transmission.

In step S104, the transmitting side may perform transform precoding. A DL transmission waveform may be a normal CP-OFDM waveform. Transform precoding (i.e., discrete Fourier transform (DFT)) may not be applied to DL.

A UL transmission waveform may be legacy OFDM using a CP having a transform precoding function performing DFT spreading, which may be disabled or enabled. In the NR system, if the transform precoding function is enabled on UL, transform precoding may be selectively applied. Transform precoding may spread UL data in a special manner in order to reduce a peak-to-average power ratio (PAPR) of a waveform. Transform precoding may be one type of DFT. That is, the NR system may support two options for a UL waveform. One option may be CP-OFDM (which is the same as a DL waveform) and the other option may be DFT spread OFDM (DFT-s-OFDM). Whether the UE should use CP-OFDM or DFT-s-OFDM may be determined by the BS through an RRC parameter.

In step S105, the transmitting side may perform subcarrier mapping. A layer may be mapped to an antenna port. On DL, transparent manner (non-codebook-based) mapping may be supported for layer-to-antenna port mapping. How beamforming or MIMO precoding is performed may be transparent to the UE. On UL, both non-codebook-based mapping and codebook-based mapping may be supported for antenna port mapping.

For each antenna port (i.e., layer) used for transmission of a physical channel (e.g., a PDSCH, a PUSCH, or a PSSCH), the transmitting side may map complex-valued modulation symbols to subcarriers in an RB allocated to the physical channel.

In step S106, the transmitting side may perform OFDM modulation. A communication device of the transmitting side may generate a subcarrier spacing configuration u for a time-continuous OFDM baseband signal on an antenna port p and an OFDM symbol 1 in a TTI for the physical channel by adding the CP and performing inverse fast Fourier transform (IFFT). For example, the communication device of the transmitting side may perform IFFT on a complex-valued modulation symbol mapped to an RB of a corresponding OFDM symbol with respect to each OFDM symbol. The communication device of the transmitting side may add the CP to an IFFT signal in order to generate the OFDM baseband signal.

In step S107, the transmitting side may perform up-conversion. The communication device of the transmitting side may perform up-conversion on the OFDM baseband signal for the antenna port p, the subcarrier spacing configuration u, and the OFDM symbol into a carrier frequency f0 of a cell to which the physical channel is allocated.

Processors 9011 and 9021 of FIG. 38 may be configured to perform encoding, scrambling, modulation, layer mapping, transform precoding (on UL), subcarrier mapping, and OFDM modulation.

FIG. 29 illustrates an example of physical layer processing at a receiving side to which embodiment(s) are applicable.

Physical layer processing at the receiving side may be basically the reverse of physical layer processing at the transmitting side.

In step S110, the receiving side may perform frequency down-conversion. A communication device of the receiving side may receive an RF signal of a carrier frequency through an antenna. Transceivers 9013 and 9023 for receiving the RF signal in the carrier frequency may down-convert the carrier frequency of the RF signal into a baseband signal in order to obtain an OFDM baseband signal.

In step S111, the receiving side may perform OFDM demodulation. The communication device of the receiving side may acquire a complex-valued modulation symbol through CP detachment and FFT. For example, the communication device of the receiving side may detach a CP from the OFDM baseband signal with respect to each OFDM symbol. The communication device of the receiving side may perform FFT on the CP-detached OFDM baseband signal in order to acquire the complex-valued modulation symbol for an antenna port p, a subcarrier spacing u, and an OFDM symbol 1.

In step S112, the receiving side may perform subcarrier demapping. Subcarrier demapping may be performed on the complex-valued modulation symbol in order to acquire a complex-valued modulation symbol of a corresponding physical channel. For example, the processor of the UE may acquire a complex-valued modulation symbol mapped to a subcarrier belonging to a PDSCH among complex-valued modulation symbols received in a bandwidth part (BWP).

In step S113, the receiving side may perform transform deprecoding. If transform precoding is enabled with respect to a UL physical channel, transform deprecoding (e.g., inverse discrete Fourier transform (IDFT)) may be performed on a complex-valued modulation symbol of the UL physical channel. Transform deprecoding may not be performed on a DL physical channel and a UL physical channel for which transform precoding is disabled.

In step S114, the receiving side may perform layer demapping. A complex-valued modulation symbol may be demapped to one or two codewords.

In steps S115 and S116, the receiving side may perform demodulation and descrambling, respectively. A complex-valued modulation symbol of a codeword may be demodulated and may be descrambled to a bit of the codeword.

In step S117, the receiving side may perform decoding. A codeword may be decoded to a TB. For a UL-SCH and a DL-SCH, LDPC base graph 1 or 2 may be selected based on the size of a TB and a code rate R. The codeword may include one or multiple coded blocks. Each coded block may be decoded to a code block to which a CRC is attached or a TB to which the CRC is attached using the selected LDPC base graph. If the transmitting side performs code block segmentation on the TB to which the CRC is attached, a CRC sequence may be eliminated from each of code blocks to which the CRC is attached and code blocks may be acquired. A code block may be concatenated to the TB to which the CRC is attached. A TB CRC sequence may be detached from the TB to which the CRC is attached and then the TB may be acquired. The TB may be transmitted to a MAC layer.

The processors 102 and 202 of FIG. 38 may be configured to perform OFDM demodulation, subcarrier demapping, layer demapping, demodulation, descrambling, and decoding.

In physical layer processing at the transmitting/receiving side described above, time and frequency domain resource related to subcarrier mapping (e.g., an OFDM symbol, a subcarrier, or a carrier frequency), and OFDM modulation and frequency up/down-conversion may be determined based on resource allocation (e.g., UL grant or DL allocation).

Hereinafter, synchronization acquisition of a sidelink UE will be described.

In a time division multiple access (TDMA) and frequency division multiples access (FDMA) system, accurate time and frequency synchronization is essential. If time and frequency synchronization is not accurately established, system performance may be deteriorated due to inter-symbol interference (ISI) and inter-carrier interference (ICI). This is equally applied even to V2X. For time/frequency synchronization in V2X, a sidelink synchronization signal (SLSS) may be used in a physical layer and master information block-sidelink-V2X (MIB-SL-V2X) may be used in a radio link control (RLC) layer.

FIG. 30 illustrates a synchronization source or synchronization reference in V2X to which embodiment(s) are applicable.

Referring to FIG. 30, in V2X, a UE may be directly synchronized with a global navigation satellite system (GNSS) or may be indirectly synchronized with the GNSS through the UE (in network coverage or out of network coverage) that is directly synchronized with the GNSS. If the GNSS is configured as a synchronization source, the UE may calculate a direct frame number (DFN) and a subframe number using coordinated universal time (UTC) and a (pre)configured DFN offset.

Alternatively, the UE may be directly synchronized with a BS or may be synchronized with another UE that is synchronized in time/frequency with the BS. For example, the BS may be an eNB or a gNB. For example, when the UE is in network coverage, the UE may receive synchronization information provided by the BS and may be directly synchronized with the BS. Next, the UE may provide the synchronization information to adjacent another UE. If a timing of the BS is configured as the synchronization reference, the UE may conform to a cell related to a corresponding frequency (when the UE is in cell coverage in the frequency) or a primary cell or a serving cell (when the UE is out of cell coverage in the frequency), for synchronization and DL measurement.

The BS (e.g., serving cell) may provide a synchronization configuration for a carrier used for V2X/sidelink communication. In this case, the UE may conform to the synchronization configuration received from the BS. If the UE fails to detect any cell in the carrier used for V2X/sidelink communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference degree may be preconfigured for the UE. Alternatively, the synchronization source and the preference degree may be configured through a control message provided by the BS.

The sidelink synchronization source may be associated with a synchronization priority level. For example, a relationship between the synchronization source and the synchronization priority level may be defined as shown in Table 11. Table 11 is purely exemplary and the relationship between the synchronization source and the synchronization priority level may be defined in various manners.

TABLE 11

| Priority Level | GNSS-based Synchronization | eNB/gNB-based Synchronization |
| --- | --- | --- |
| P0 | GNSS | eNB/gNB |
| P1 | All UEs directly synchronized with GNSS | All UEs directly synchronized with eNB/gNB |
| P2 | All UEs indirectly synchronized with GNSS | All UEs indirectly synchronized with eNB/gNB |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or eNB/gNB-based synchronization may be (pre)configured. In a single-carrier operation, the UE may derive a transmission timing thereof from an available synchronization reference having the highest priority.

Hereinafter, a BWP and a resource pool will be described.

When bandwidth adaptation (BA) is used, the reception bandwidth and transmission bandwidth of the UE need not be as large as the bandwidth of a cell, and the reception bandwidth and transmission bandwidth of the UE may be adjusted. For example, the network/BS may inform the UE of bandwidth adjustment. For example, the UE may receive information/configurations about the bandwidth adjustment from the network/BS. In this case, the UE may perform the bandwidth adjustment based on the received information/configurations. For example, the bandwidth adjustment may include a decrease/increase in the bandwidth, a change in the position of the bandwidth, or a change in the SCS of the bandwidth.

For example, the bandwidth may be reduced during a time period of low activity to save power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to provide different services. A subset of the total cell bandwidth of a cell may be referred to as a BWP. BA may be performed as follows: the BS/network configures BWPs for the UE and then informs the UE of the currently active BWP among the configured BWPs.

FIG. 31 illustrates an exemplary scenario of configuring BWPs to which an example or implementation example is applicable.

Referring to FIG. 31, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and the SL BWP may have configuration signaling different from the Uu BWP. For example, a UE may receive the configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/SL reception. From the perspective of a UE, time-domain resources in the resource pool may not be contiguous. A plurality of resource pools may be (pre)configured for the UE in one carrier.

1. Method of Providing Safety Service According to Conventional Technology

Conventional V2X technology provides safety services through communication between devices capable of V2X communication. Referring to FIG. 32, for example, devices included in a V2X network 100 provide or receive safety services and convenience services therebetween through communication. Specifically, appropriate services are provided through communication connection such as V2V (110-120) communication between vehicles, V2P (120-130) communication between a vehicle and a vulnerable road user (VRU), and V2I (110-140) communication between a road side unit (RSU) and a vehicle.

However, there is a problem that a vehicle or a pedestrian that is not provided with a V2X device cannot receive a traffic safety service. In FIG. 32, a non-V2X vehicle 210 does not receive a forward collision warning (FCW) signal even when a preceding vehicle 110 abruptly stops. In addition, a non-V2X vehicle 220 does not recognize the state of a pedestrian 230 without a V2X device.

2. Proposed System

The present disclosure relates to a method of providing a safety service to a non-V2X vehicle and a VRU that cannot receive a safety service through a V2X device, and a vehicle for the same. A vehicle can promote the safety thereof by providing a V2X service to non-V2X vehicles using an image output device. According to an example or an implementation of the present disclosure, it is possible to provide a safety service especially at the time of crossing a crosswalk, pedestrian jaywalking, and entering and exiting a vehicle, during which many accidents occur. In the following description, a V2X vehicle according to an example or an implementation of the present disclosure may be referred to as a host vehicle (HV). In addition, a vehicle (a V2X vehicle or a non-V2X vehicle) provided with a safety service from the HV may be referred to as a remote vehicle (RV). Further, a non-V2X vehicle may mean a vehicle that does not support V2X communication, such as C-V2X or DSRC.

2.1. System Configuration

FIG. 33 and FIG. 34 show a vehicle in which an image output device is implemented. In FIG. 33 and FIG. 34, a vehicle 100 may be a V2X vehicle. For the proposed system, the vehicle 100 may include image output devices 310 and 320 in front and rear of the vehicle 100. The image output device 310 may output an image toward the front of the vehicle. The image output device 320 may output an image toward the rear of the vehicle. Referring to FIG. 34, the vehicle 100 may output a forward image 311 and a rearward image 321 to the front and rear of the vehicle through the image output devices. Meanwhile, the vehicle may include a sensor 400 for recognizing an object such as a non-V2X VRU. The sensor 400 may be configured as a device capable of detecting an object around the vehicle 100, such as a stereo camera, radar, or lidar.

FIG. 35 shows a V2X module including an image output device. The V2X vehicle 100 supporting image output devices may include the V2X module or a V2X device 200 shown in FIG. 35. The V2X module 200 may include an RF antenna 210 for V2X communication such as C-V2X or DSRC, a radio modem 220 for processing corresponding signals, a GNSS antenna 230 for obtaining position information, and a GNSS receiver 240 for signal processing. A received V2X signal and GPS information may be transmitted to a processor 250 of the V2X module 200. The processor 250 may obtain position information thereof through a satellite and decode a V2X message to obtain a message. Meanwhile, in order to acquire external information, the sensor 400 may be connected to an application ECU 260 through the sensor interface 270. The sensor 400 may be configured as a radar, a lidar, a stereo camera, or the like for recognizing or detecting a non-V2X object (e.g., a non-V2X vehicle, a VRU, and the like). Meanwhile, detected information is transmitted to the application ECU 260 through the sensor interface 270, and a safety service for non-V2X objects may be provided. The application ECU 260 may determine V2X safety information received through the V2X modem and the states of non-V2X objects collected through the sensor and provide a safety service to a non-V2X vehicle through an external image output device. On the other hand, a device for outputting an image may be composed of a beam projector 300 and an exterior interface 280 connecting the same.

FIG. 36 shows an example of an image displayed on a road through an image output device. An output image 400 may include area indicator lines 411, 412, 413, and 414 indicating area lines and warning lines. The area indicator lines may be used as lines to assist pedestrians in walking or may be used to induce safe driving of nearby non-V2X vehicles. A text output part 421 for describing a situation and an icon output part 422 for outputting an icon may be disposed inside the area indicator lines.

2.2 Safety Services at Crosswalks 2.2.1 Crosswalk Safety Service Configuration

In general, pedestrians cross a crosswalk when a pedestrian signal is turned on. Accordingly, vehicles that are traveling stop in front of the crosswalk and following vehicles sequentially recognize the signal or preceding vehicles and stop. On the other hand, when a V2X system is applied, a traffic light 200 may transmit a radio signal (e.g., SPaT message) regarding a signal type (e.g., straight, stop, or left turn) of the traffic light and a signal change period to a V2X vehicle. In addition, when the V2X vehicle 100 stops according to a traffic light signal, it may reduce the speed and transmit a CAM indicating that the vehicle will stop. Further, the V2X vehicle 100 may identify a walking VRU using an object detection device (e.g., an ADAS sensor) and provide the identified information to neighboring V2X vehicles through a cooperative perception message (CPM).

However, not all vehicles and VRUs are equipped with a V2X device. In addition, since some pedestrians may ignore traffic light signals and cross a crosswalk late, there is a problem that V2X safety service alone cannot provide a perfect safety system. In order to solve this problem, an example or an implementation of the present disclosure proposes a traffic light pedestrian safety service using an image output device. When the vehicle 100 equipped with an image output device approaches a traffic light, the vehicle 100 obtains traffic light information from the surrounding traffic light (RSU) 200 through the V2X module, compares the speed and time based on the traffic light information, and stops. Thereafter, the vehicle equipped with the image output device outputs traffic light state information received from the traffic light 200 to a road on which a pedestrian 300 is walking through the image output device such that the pedestrian can safely cross the road according to the traffic signal. A forward image may be configured as shown in (a)

of FIG. 37. The forward image not only informs the VRU of the traffic light state through the text output area 111 but also displays the traffic light state as an icon through the icon output area 112 to clearly provide a safety service to pedestrians.

In addition, V2X vehicles can properly stop based on traffic light information, but in the case of non-V2X vehicles, drivers determine whether to stop by looking at traffic lights. In particular, in a section where a signal changes, each driver has a different driving strategy. Referring to (b) of FIG. 37, when the V2X vehicle 100 stops suddenly in anticipation of signal change (e.g., when the V2X vehicle rapidly decelerates at a preset speed or higher), the V2X vehicle 100 may output text information representing that it will stop and a traffic light state to the text output area 121 and the icon output area 122 through the image output device. Accordingly, a non-V2X vehicle following the V2X vehicle 100 may recognize that the V2X vehicle 100 will stop. In addition, the V2X vehicle 100 may output an area indicator line 123 to display a line on which it will stop. In particular, in case of abrupt deceleration (for example, in case of deceleration at a preset speed or higher), the area indicator line 123 may be displayed far away from the V2X vehicle 100, and in case of slow deceleration (for example, in case of deceleration at a preset speed or lower), the area indicator line 123 may be displayed close to the V2X vehicle 100.

A method of providing a safety service when a vehicle driving while ignoring a pedestrian signal at a crosswalk is detected will be described with reference to FIG. 38. The vehicle driving at a pedestrian signal may be i) an emergency vehicle such as an ambulance, ii) a vehicle driving in violation of a signal, or iii) a vehicle turning right at a pedestrian signal. If both a VRU 300 and a vehicle 400 that is traveling have a V2X module, a risk can be recognized through communication. However, if any of the VRU 300 and the vehicle 400 does not have a V2X module, an accident may occur. To solve this, the vehicle 100 equipped with an image output device may warn the VRU 300 and the vehicle 400 through the image output device.

For example, the HV 100 may detect a vehicle that is traveling in violation of a signal through a CAM, DENM, or CPS message, and then output a forward image 110 as shown in (a) of FIG. 38 to warn the VRU 300 that does not have a V2X module. Furthermore, the HV 100 may adjust the position of an area indicator line 113 displayed on the forward image 110 such that it corresponds to a direction in which the vehicle 400 is detected (or a relative position of the HV 100 with respect to the vehicle 400). For example, since the vehicle 400 is traveling on the right side of the HV 100 in (a) of FIG. 38, the HV 100 may aid the VRU 300 in recognizing the vehicle 400 more effectively by displaying the area indicator line 113 on the right side of the forward image 110.

On the other hand, the vehicle 400 that is not equipped with a V2X module may not recognize the VRU 300 because of the HV 100. In this case, the HV 100 may warn the vehicle 400 through the rear image output device. (b) of FIG. 38 is a diagram showing rearward image output. The HV 100 may display a risk of collision of a pedestrian through the text output area 121 and the icon output area 122.

A method of providing a safety service when i) a pedestrian crosses a road in violation of a signal at a crosswalk or ii) a pedestrian has not yet crossed the crosswalk after signal change will be described with reference to FIG. 39. The HV 100 i) not only informs the VRU 300 that the pedestrian signal is a red light through the front image output device ii) but also outputs the area indicator line 113 in the direction in which the pedestrian is walking such that surrounding vehicles recognize the presence of the pedestrian at the crosswalk. In addition, it is possible to reduce a risk of rear collision by transmitting a signal representing that the HV 100 will abruptly stop to the vehicle 400 following the HV 100.

2.2.2 Operation Procedure of Crosswalk Safety Device

In order to provide a pedestrian safety service at a crosswalk, a V2X vehicle equipped with an image output device may perform i) V2X communication and ii) external image output according to a procedure shown in FIG. 40. An HV receives a signal phase and timing (SPaT) message from a traffic light (e.g., RSU). When the HV decelerates to stop based on the SPaT message, the HV may transmit the intention to stop to a vehicle equipped with a V2X device through a CAM. The HV may warn a non-V2X user (e.g., VRU or RV1) through a rear image output device and may transmit a forward collision warning (FCW) signal to the following vehicle. When the HV has stopped in front of a crosswalk, the HV may detect a pedestrian using the object detection device described with reference to FIG. 2 and transmit VRU information to a V2X vehicle (e.g., RV1) through CAM extension or CPM to induce safe driving. Meanwhile, the HV may provide traffic light information to a non-V2X VRU through the front image output device and inform a non-V2X vehicle that the VRU is crossing the crosswalk through the rear image output device.

Meanwhile, when an emergency situation occurs while a pedestrian safety service at a crosswalk is provided, a V2X vehicle equipped with an image output device may perform i) V2X communication and ii) external image output according to procedures shown in FIG. 41 and FIG. 42.

FIG. 41 is a diagram illustrating an HV operation when a vehicle driving while ignoring a pedestrian signal is recognized. When the HV stops in front of a crosswalk, it can recognize states of surrounding vehicles through various methods. For example, the HV may indirectly recognize the state of RV2 (i.e., non-V2X vehicle) detected by RV1 (i.e., V2X vehicle) through a CPM transmitted by RV1. Alternatively, the HV may directly recognize the state of RV2 through an ADAS sensor. If it is determined that RV2 violates a signal and crosses the crosswalk, the HV may i) output "stop warning" indicating that caution is required in spite of a green light to the VRU and ii) output "VRU crash warning" indicating the state of the VRU to RV2, thereby preventing accidents at the crosswalk.

FIG. 42 is a diagram illustrating an HV operation when a VRU crossing a crosswalk while ignoring a crosswalk signal is recognized. The HV receives crosswalk information from an RSU through SPaT. Upon detection of a pedestrian who violates a signal (e.g., a pedestrian jaywalking at a red light) through the object detection device, the HV may abruptly decelerate and transmit a CPM or DENM to surrounding V2X vehicles through the V2X modem to notify the surrounding V2X vehicles of the state of the VRU. To protect non-V2X users, the HV may inform the VRU of a danger signal through the front image output device to induce rapid passage and may transmit a walking guide signal such that surrounding non-V2X vehicles recognize the VRU. In addition, the HV may issue a warning that the VRU is crossing the road through the rear video output device.

2.2.3 Operation Flowchart of Crosswalk Safety Device

For the pedestrian safety service at crosswalks, a V2X vehicle including an image output device may operate according to the procedure shown in FIG. 43. When the system starts, the V2X vehicle prepares to start the V2X system and the communication module through system initialization. Thereafter, the V2X vehicle receives and analyzes an SPaT signal transmitted from a traffic light using the V2X modem.

When the pedestrian signal is a green light, the V2X vehicle stops. Then, the V2X vehicle may display the traffic light state and the remaining time of the traffic light on the road using a front image output device in order to aid a VRU crossing a crosswalk. Thereafter, the V2X vehicle may transmit a VRU protection signal through a rear image output device in order to prevent a collision with a following vehicle. If a vehicle traveling while ignoring a crosswalk signal is detected through a V2X message or an ADAS sensor while the V2X vehicle stops, the V2X vehicle may notify the VRU walking at the crosswalk of the state of the vehicle violating the signal through the front video output device. In addition, the V2X vehicle may also notify the vehicle violating the signal of the presence of the VRU through the rear image output device.

When the pedestrian signal is a red light, the V2X vehicle detects a pedestrian violating the signal. If there are no pedestrians violating the signal, the V2X vehicle continues to travel. On the other hand, when a pedestrian violating the signal is detected, the V2X vehicle may call the attention of the VRU by outputting a warning image in the direction of the VRU through the front image output device. In addition, the V2X vehicle may notify the following vehicle of the presence of the VRU violating the signal on the road through the rear image output device to prevent collision between the VRU and the vehicle.

2.3 Safety Service for Jaywalking Pedestrians 2.3.1 Configuration of Safety Service for Jaywalking Pedestrians There is a need for a safety service when pedestrians cross a road without a traffic light or a crosswalk, such as a non-crosswalk road or a dark rural road. A safety service provided according to an example or an implementation of the present disclosure when a pedestrian crosses a road without a crosswalk will be described with reference to FIG. 44. The HV 100 may inform a VRU 300 of information indicating that the HV 100 will stop such that the VRU can cross the road through the front image output device. In order to inform surrounding vehicles that the pedestrian is crossing the road, the HV 100 displays area indicator lines 111 and 112 in the direction of the pedestrian such that the surrounding vehicles can recognize that the pedestrian is still on the crosswalk. It is possible to reduce a risk of a rear-end collision by sending a signal indicating that the HV 100 will abruptly stop to a vehicle 400 following the HV 100.

2.3.2 Operation Procedure of Jaywalking Pedestrian Safety Device

The operation of a V2X vehicle (or an HV) having an image output device for a jaywalking pedestrian protection service will be described with reference to FIG. 45. The HV may detect jaywalking of a VRU while traveling on the road. Specifically, the HV may i) directly receive a VRU message from the VRU if the VRU is capable of V2X communication, or ii) indirectly detect jaywalking of the VRU through a CPS message of RV1 or directly detect jaywalking of the VRU through an object detection device (e.g., an ADAS sensor).

Upon detection of jaywalking of the VRU, the HV may notify V2X users that the HV is decelerating through a CAM message. In addition, the HV may also inform non-V2X users that the HV is urgently braking through a rearward image. When the HV stops, the HV may output a predetermined image (e.g., a temporary crosswalk) in the direction of the VRU through the front image output device to call the attention of the surrounding vehicles as well as the VRU. In addition, the HV may notify the following vehicle of abrupt stop due to the jaywalking VRU through a DENM to prevent a collision. Furthermore, the HV may notify the following vehicle of abrupt stop due to the VRU through a rearward image.

2.3.3 Operation Flowchart of Jaywalking Pedestrian Safety Device

The operation of a V2X vehicle equipped with an image output device to provide a service for protecting jaywalking pedestrians will be described with reference to FIG. 46. When the system is started, the V2X vehicle prepares to start the V2X system and the communication module through system initialization. The V2X vehicle detects a pedestrian on a road through an ADAS sensor and V2X message analysis. If no pedestrian is detected, the V2X vehicle continues to travel. When a pedestrian is detected, the V2X vehicle can urgently stop. The V2X vehicle may output a VRU walking guideline forward through a front image output device such that the VRU can recognize the V2X vehicle and surrounding vehicles can recognize the VRU. In addition, in order to prevent the following vehicle from colliding with the V2X vehicle that abruptly stops, the V2X vehicle may output an FCW and a VRU walking warning rearward thereof. The V2X vehicle may continuously detect the state of the following vehicle through V2X messages and the ADAS sensor. If the following vehicle is traveling while ignoring a stop signal, the V2X vehicle may warn the jaywalking VRU to be aware of the vehicle that is traveling through the front image output device.

2.4 Safe Passenger Alighting Support Device 2.4.1 Configuration of Safe Passenger Alighting Service When a passenger (e.g., a VRU) of a vehicle alights at the side of a road, a safety service for preventing collision between the passenger and a following vehicle is required. A safe passenger alighting service using an image output device according to an example or an implementation of the present disclosure will be described with reference to FIG. 47.

When a passenger intends to alight from the vehicle 100 having an image output device, the vehicle 100 may output an image through the image output device in the direction of the following vehicle to inform the following vehicle that the vehicle 100 will decelerate and stop. For example, (a) of FIG. 47 shows the configuration of rearward image output before the passenger alights. When the vehicle 100 reduces the speed before the passenger 200 alights therefrom, the vehicle 100 may notify the following vehicle that the vehicle 100 will stop through the text output area 121 of the rearward output image and notify the following vehicle of alighting of the passenger through the icon output area 122.

Further, (b) of FIG. 47 shows configuration of rearward image output when the passenger alights. When the vehicle 100 stops and the passenger alights therefrom, the vehicle 100 may output a rearward image representing presence of the VRU 200. The vehicle 100 may display the state of the VRU through the text output area 121 and may output a VRU icon through the icon output area 122 to provide the safety service to following non-V2X vehicles 300 and 400.

2.4.2 Operation Flowchart of Safe Passenger Alighting Support Device

A V2X vehicle having an image output device for safe passenger alighting service may operate according to a flowchart shown in FIG. 48.

When the system is started, the V2X vehicle prepares to start the V2X system and the communication module through system initialization. Then, the V2X vehicle detects a passenger who is alighting. Alighting of a passenger may be detected based on i) bell ringing in the case of a bus and ii) comparison between a destination and a current location in the case of a taxi or a ride-sharing service. The V2X vehicle may indicate that it will stop such that the passenger alights therefrom through a CAM. In addition, the V2X vehicle including the image output device may output an FCW image through the rear image output device such that non-V2X vehicles can also pay attention behind the V2X vehicle. The V2X vehicle may attempt to stop by reducing speed. The V2X vehicle may recognize whether alighting of passengers is safe by continuously detecting the rearward situation. When sufficient safety for passengers to alight is secured, the V2X vehicle may stop and notify following vehicles of alighting of passengers through the image output device. When a vehicle approaches behind the V2X vehicle, the V2X vehicle may warn passengers of a danger and continue to detect the rearward situation until it becomes safe. If the V2X vehicle continues to operate the system, the system can return to the passenger alighting recognition stage and prepare for the next transmission. When a system shutdown command is received, the V2X vehicle can shut down the system.

3. Method of Providing Safety Service by Host Vehicle According to Example or Embodiment of Present Disclosure and Host Vehicle Therefor A method of providing a safety service by a host vehicle in a wireless communication system may include detecting an object outside the host vehicle through an object detecting device, transmitting a first message for notifying of detection of the object through a transceiver, and outputting an image for providing the safety service to the object to a predetermined area outside the host vehicle through an image output device.

Further, the method of providing a safety service may further include receiving a second message including signal information from a network node through the transceiver. Further, the predetermined area may include i) a first area in which the signal information is displayed and ii) a second area in which information related to braking of the host vehicle is displayed.

Further, the second area may be displayed rearward of the host vehicle, and a first indicator for guiding a remote vehicle following the host vehicle to stop may be further displayed in the second area. In addition, the position at which the first indicator is displayed may be determined based on a deceleration amount of the host vehicle.

Further, the method of providing a safety service may further include receiving, through the transceiver, a third message including i) state information of the remote vehicle or ii) state information of the object. In addition, the predetermined area may include i) a third area in which the state information of the remote vehicle is displayed or ii) a fourth area in which the state information of the object is displayed.

Further, a second indicator for guiding the object to stop may be further displayed in the third area. In addition, the position at which the second indicator is displayed may be determined based on relative positions of the host vehicle and the remote vehicle.

Further, the method of providing a safety service may include detecting the stop of the host vehicle and alighting of a passenger from the host vehicle, and transmitting, through the transceiver, a fourth message indicating the stop of the host vehicle and alighting of the passenger from the host vehicle. Further, the image for providing the safety service may include an image of a passenger alighting from the host vehicle.

Further, the first message may be transmitted through a PC5 interface based on a 3rd Generation Partnership Project (3GPP).

A host vehicle providing a safety service in a wireless communication system may include i) an object detecting device, ii) a transceiver, and iii) a processor connected to the object detecting device and the transceiver. The processor may detect an object outside the host vehicle through the object detecting device, transmit a first message indicating detection of the object through the transceiver, and output an image for providing the safety service to the object through an image output device to a predetermined area outside the host vehicle.

Further, the processor may further receive a second message including signal information from a network node through the transceiver. In addition, the predetermined area may include i) a first area in which the signal information is displayed and ii) a second area in which information related to braking of the host vehicle is displayed.

Further, the second area may be displayed rearward of the host vehicle, and a first indicator for guiding a remote vehicle following the host vehicle to stop may be further displayed in the second area. In addition, the position at which the first indicator is displayed may be determined based on a deceleration amount of the host vehicle.

Further, the processor may further receive, through the transceiver, a third message including i) state information of the remote vehicle or ii) state information of the object. In addition, the predetermined region area may include i) a third area in which the state information of the remote vehicle is displayed or ii) a fourth area in which the state information of the object is displayed.

Further, a second indicator for guiding the object to stop may be further displayed in the third area. In addition, the position at which the second indicator is displayed may be determined based on relative positions of the host vehicle and the remote vehicle.

Further, the processor may further detect stop of the host vehicle and alighting of a passenger from the host vehicle, and further transmit a fourth message indicating stop of the host vehicle and alighting of the passenger from the host vehicle through the transceiver. In addition, the image for providing the safety service may include an image of a passenger alighting from the host vehicle.

Further, the processor may transmit the first message through a PC5 interface based on a 3rd Generation Partnership Project (3GPP).

Hereinafter, devices to which examples or implementation examples are applicable will be described.

FIG. 49 illustrates wireless devices applicable to the present disclosure. Referring to FIG. 49, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 56.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 50 illustrates another example of a wireless device applied to the present disclosure. The wireless device may be implemented in various forms according to a use case/service.

Referring to FIG. 50, wireless devices 100 and 200 may correspond to the wireless devices 100 and 200 of FIG. 49 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 52. For example, the transceiver(s) 114 may include the one or more transceivers 106 and 206 and/or the one or more antennas 108 and 208 of FIG. 55. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 62), the vehicles (100b-1 and 100b-2 of FIG. 62), the XR device (100c of FIG. 62), the hand-held device (100d of FIG. 62), the home appliance (100e of FIG. 62), the IoT device (100f of FIG. 62), a digital broadcast terminal, a hologram device, a public safety device, an MTC device, a medicine device, a fintech device (or a finance device), a security device, a climate/environment device, the AI server/device (400 of FIG. 62), the BSs (200 of FIG. 62), a network node, etc. The wireless device may be used in a mobile or fixed place according to a use-example/service.

In FIG. 50, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 51 illustrates a transceiver of a wireless communication device according to an embodiment. For example, FIG. 51 may illustrate an example of a transceiver that may be implemented in a frequency division duplex (FDD) system.

On a transmission path, at least one processor, such as the processor described with reference to FIGS. 49 and 50, may process data to be transmitted and transmit a signal such as an analog output signal to a transmitter 9210.

In the above example, in the transmitter 9210, the analog output signal may be filtered by a low-pass filter (LPF) 9211 in order to eliminate noise caused by, for example, previous digital-to-analog conversion (ADC), up-converted into an RF signal from a baseband signal by an up-converter (e.g., a mixer) 9212, and then amplified by an amplifier such as a variable gain amplifier (VGA) 9213. The amplified signal may be filtered by a filter 9214, amplified by a power amplifier (PA) 9215, routed by a duplexer 9250/antenna switches 9260, and then transmitted through an antenna 9270.

On a reception path, the antenna 9270 may receive a signal in a wireless environment. The received signal may be routed by the antenna switches 9260/duplexer 9250 and then transmitted to a receiver 9220.

In the above example, in the receiver 9220, the received signal may be amplified by an amplifier such as a low-noise amplifier (LNA) 9223, filtered by a band-pass filter (BPF) 9224, and then down-converted into the baseband signal from the RF signal by a down-converter (e.g., a mixer) 9225.

The down-converted signal may be filtered by an LPF 9226 and amplified by an amplifier such as a VGA 9227 in order to obtain an analog input signal. The analog input signal may be provided to one or more processors.

Furthermore, a local oscillator (LO) 9240 may generate an LO signal for transmission and reception and transmit the LO signal to the up-converter 9212 and the down-converter 9224.

In some implementations, a phase-locked loop (PLL) 9230 may receive control information from the processor and transmit control signals to the LO 9240 so that the LO 9240 may generate LO signals for transmission and reception at an appropriate frequency.

Implementations are not limited to a specific arrangement illustrated in FIG. 51 and various components and circuits may be arranged differently from the example illustrated in FIG. 51.

FIG. 52 illustrates a transceiver of a wireless communication device according to an embodiment. For example, FIG. 52 may illustrate an example of a transceiver that may be implemented in a time division duplex (TDD) system.

In some implementations, a transmitter 9310 and a receiver 9320 of the transceiver of the TDD system may have one or more features similar to the transmitter and receiver of the transceiver of the FDD system. Hereinafter, the structure of the transceiver of the TDD system will be described.

On a transmission path, a signal amplified by a PA 9315 of the transmitter may be routed through a band select switch 9350, a BPF 9360, and antenna switch(s) 9370 and then transmitted through an antenna 9380.

On a reception path, the antenna 9380 receives a signal in a wireless environment. The received signal may be routed through the antenna switch(s) 9370, the BPF 9360, and the band select switch 9350 and then provided to the receiver 9320.

FIG. 53 illustrates an operation of a wireless device related to sidelink communication, according to an embodiment. The operation of the wireless device related to sidelink described in FIG. 53 is purely exemplary and sidelink operations using various techniques may be performed by the wireless device. Sidelink may be a UE-to-UE interface for sidelink communication and/or sidelink discovery. Sidelink may correspond to a PC5 interface. In a broad sense, a sidelink operation may be transmission and reception of information between UEs. Sidelink may carry various types of information.

Referring to FIG. 53, in step S9410, the wireless device may acquire information related to sidelink. The information related to sidelink may be one or more resource configurations. The information related to sidelink may be obtained from other wireless devices or network nodes.

After acquiring the information related to sidelink, the wireless device may decode the information related to the sidelink in step S9420.

After decoding the information related to the sidelink, the wireless device may perform one or more sidelink operations based on the information related to the sidelink in step S9430. The sidelink operation(s) performed by the wireless device may include the one or more operations described in the present specification.

FIG. 54 illustrates an operation of a network node related to sidelink according to an embodiment. The operation of the network node related to sidelink described in FIG. 54 is purely exemplary and sidelink operations using various techniques may be performed by the network node Referring to FIG. 54, in step S9510, the network node may receive information about sidelink from a wireless device. For example, the information about sidelink may be sidelink UE information used to inform the network node of sidelink information.

After receiving the information, in step S9520, the network node may determine whether to transmit one or more commands related to sidelink based on the received information.

According to the determination of the network node to transmit the command(s), the network node may transmit the command(s) related to sidelink to the wireless device in step S9530. In some implementations, after receiving the command(s) transmitted by the network node, the wireless device may perform one or more sidelink operations based on the received command(s).

FIG. 55 illustrates implementation of a wireless device and a network node according to one embodiment. The network node may be replaced with a wireless device or a UE.

Referring to FIG. 55, a wireless device 9610 may include a communication interface 9611 to communicate with one or more other wireless devices, network nodes, and/or other elements in a network. The communication interface 9611 may include one or more transmitters, one or more receivers, and/or one or more communication interfaces. The wireless device 9610 may include a processing circuit 9612. The processing circuit 9612 may include one or more processors such as a processor 9613, and one or more memories such as a memory 9614.

The processing circuit 9612 may be configured to control the arbitrary methods and/or processes described in the present specification and/or to allow, for example, the wireless device 9610 to perform such methods and/or processes. The processor 9613 may correspond to one or more processors for performing the wireless device functions described in the present specification. The wireless device 9610 may include the memory 9614 configured to store data, program software code, and/or other information described in the present specification.

In some implementations, the memory 9614 may be configured to store software code 9615 including instructions for causing the processor 9613 to perform a part or all of the above-described processes according to the present disclosure when one or more processors, such as the processor 9613, are executed.

For example, one or more processors, such as the processor 9613, that control one or more transceivers, such as a transceiver 2223, for transmitting and receiving information may perform one or more processes related to transmission and reception of information.

A network node 9620 may include a communication interface 9621 to communicate with one or more other network nodes, wireless devices, and/or other elements on a network. Here, the communication interface 9621 may include one or more transmitters, one or more receivers, and/or one or more communication interfaces. The network node 9620 may include a processing circuit 9622. Here, the processing circuit 9622 may include a processor 9623 and a memory 9624.

In some implementations, the memory 9624 may be configured to store software code 9625 including instructions for causing the processor 9623 to perform a part or all of the above-described processes according to the present disclosure when one or more processors, such as the processor 9623, are executed.

For example, one or more processors, such as processor 9623, that control one or more transceivers, such as a transceiver 2213, for transmitting and receiving information may perform one or more processes related to transmission and reception of information.

FIG. 56 illustrates a communication system applied to the present disclosure.

Referring to FIG. 56 a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

The aforementioned implementations are achieved by combinations of structural elements and features in various manners. Each of the structural elements or features may be considered selective unless specified otherwise. Each of the structural elements or features may be carried out without being combined with other structural elements or features. In addition, some structural elements and/or features may be combined with one another to constitute implementations. Operation orders described in implementations may be rearranged. Some structural elements or features of one implementation may be included in another embodiment or may be replaced with corresponding structural elements or features of another implementation.

The implementations of the present disclosure may be embodied through various techniques, for example, hardware, firmware, software, or combinations thereof. In a hardware configuration, a method according to the implementations may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessors, etc.

In a firmware or software configuration, the implementations may be embodied as a module, a procedure, or a function. Software code may be stored in a memory and executed by a processor. The memory is located at the interior or exterior of the processor and may transmit and receive data to and from the processor by various methods.

It is apparent that ordinary persons skilled in the art may perform various modifications and variations that can be made in the present disclosure without departing from the spirit or scope of the disclosure. While the present disclosure has been described with reference to an example applied to a 3GPP LTE/LTE-A system or a 5G system (or NR system), the present disclosure is applicable to various other wireless communication systems.

INDUSTRIAL APPLICABILITY

Although the method of detecting downlink control information and a terminal therefor have been described above focusing on examples applied to the 3GPP LTE system, it is possible to apply the method and the terminal to various wireless communication systems in addition to the 3GPP LTE system.

What is claimed is:

1. A method of providing a safety service by a host vehicle in a wireless communication system, the method comprising:
   detecting an object outside the host vehicle through an object detecting device;
   transmitting, to a second object supporting vehicle to everything (V2X) communication, a first V2X message indicating detection of the object through a transceiver;
   determining whether or not the object supports the V2X communication; and
   outputting an image for providing the safety service to the object to a predetermined area outside the host vehicle through an image output device, wherein the image output is performed based on a determination that the object does not support the V2X communication.

2. The method of claim 1, further comprising receiving a second message including signal information from a network node through the transceiver,
wherein the predetermined area includes i) a first area in which the signal information is displayed and ii) a second area in which information related to braking of the host vehicle is displayed.

3. The method of claim 2, wherein the second area is displayed rearward of the host vehicle, and a first indicator for guiding a remote vehicle following the host vehicle to stop is further displayed in the second area,
wherein the position at which the first indicator is displayed is determined based on a deceleration amount of the host vehicle.

4. The method of claim 1, further comprising receiving, through the transceiver, a third message including i) state information of the remote vehicle or ii) state information of the object,
wherein the predetermined area includes i) a third area in which the state information of the remote vehicle is displayed or ii) a fourth area in which the state information of the object is displayed.

5. The method of claim 4, wherein a second indicator for guiding the object to stop is further displayed in the third area,
wherein the position at which the second indicator is displayed is determined based on relative positions of the host vehicle and the remote vehicle.

6. The method of claim 1, further comprising:
detecting a stop of the host vehicle and alighting of a passenger from the host vehicle; and
transmitting, through the transceiver, a fourth message indicating the stop of the host vehicle and alighting of the passenger from the host vehicle,
wherein the image for providing the safety service includes an image for displaying passenger alighting from the host vehicle.

7. The method of claim 1, wherein the first V2X message is transmitted through a PC5 interface based on 3rd Generation Partnership Project (3GPP).

8. A host vehicle providing a safety service in a wireless communication system, the host vehicle comprising:
an object detecting device;
a transceiver; and
a processor connected to the object detecting device and the transceiver,
wherein the processor is configured to:
detect an object outside the host vehicle through the object detecting device;
transmit, to a second object supporting vehicle to everything (V2X) communication, a first V2X message indicating detection of the object through the transceiver;
determine whether or not the object supports the V2X communication; and
output an image for providing the safety service to the object through an image output device to a predetermined area outside the host vehicle,
wherein the image output is performed based on that the object does not support the V2X communication.

9. The host vehicle of claim 8, wherein the processor further receives a second message including signal information from a network node through the transceiver,
wherein the predetermined area includes i) a first area in which the signal information is displayed and ii) a second area in which information related to braking of the host vehicle is displayed.

10. The host vehicle of claim 9, wherein the second area is displayed rearward of the host vehicle, and a first indicator for guiding a remote vehicle following the host vehicle to stop is further displayed in the second area,
wherein the position at which the first indicator is displayed is determined based on a deceleration amount of the host vehicle.

11. The host vehicle of claim 8, wherein the processor further receives, through the transceiver, a third message including i) state information of the remote vehicle or ii) state information of the object,
wherein the predetermined region area includes i) a third area in which the state information of the remote vehicle is displayed or ii) a fourth area in which the state information of the object is displayed.

12. The host vehicle of claim 11, wherein a second indicator for guiding the object to stop is further displayed in the third area,
wherein the position at which the second indicator is displayed is determined based on relative positions of the host vehicle and the remote vehicle.

13. The host vehicle of claim 8, wherein the processor further detects stoppage of the host vehicle and alighting of a passenger from the host vehicle, and further transmits a fourth message indicating stoppage of the host vehicle and alighting of the passenger from the host vehicle through the transceiver,
wherein the image for providing the safety service includes an image for displaying passenger alighting from the host vehicle.

14. The host vehicle of claim 8, wherein the processor transmits the first V2X message through a PC5 interface based on 3rd Generation Partnership Project (3GPP).

* * * * *